(12) United States Patent
Hossain et al.

(10) Patent No.: US 8,700,549 B2
(45) Date of Patent: Apr. 15, 2014

(54) METHOD OF PREDICTING GAS COMPOSITION

(75) Inventors: Muhammad Imtiaz Hossain, Dhahran (SA); Tarek Ahmed Helmy El-Basuny, Dhahran (SA); Abdulazeez Abdulraheem, Dhahran (SA); Moustafa Elshafei, Dhahran (SA); Lahouari Ghouti, Dhahran (SA); Amar Khoukhi, Dhahran (SA); Syed Masiur Rahman, Dhahran (SA); Md. Rafiul Hassan, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 135 days.

(21) Appl. No.: 13/479,025

(22) Filed: May 23, 2012

(65) Prior Publication Data

US 2013/0318016 A1 Nov. 28, 2013

(51) Int. Cl.
*G06N 5/00* (2006.01)
(52) U.S. Cl.
USPC .................................................. 706/13; 706/5
(58) Field of Classification Search
USPC .................................................. 706/13, 45
See application file for complete search history.

(56) References Cited

U.S. PATENT DOCUMENTS

| | | | |
|---|---|---|---|
| 7,280,987 B2 | 10/2007 | Chen et al. | |
| 7,389,277 B2 | 6/2008 | Chen et al. | |
| 7,813,986 B2 | 10/2010 | Gardner et al. | |
| 2009/0182693 A1 | 7/2009 | Fulton et al. | |
| 2011/0167024 A1 | 7/2011 | Diaz et al. | |

FOREIGN PATENT DOCUMENTS

| | | |
|---|---|---|
| WO | WO 9744741 A1 | 11/1997 |
| WO | WO 2004063831 A2 | 7/2004 |
| WO | WO 2005098647 A2 | 10/2005 |
| WO | WO 2006013514 A1 | 2/2006 |
| WO | WO 2010079402 A1 | 7/2010 |

OTHER PUBLICATIONS

Chaudhuri, Fundamentals of Petroleum and Petrochemical Engineering, CRC Press, 2011, pp. 1-406.*
Yi Hong, Sam Kwong, "To combine steady-state genetic algorithm and ensemble learning for data clustering", *Pattern Recognition Letters*, vol. 29, Issue 9, Jul. 1, 2008, pp. 1416-1423.

* cited by examiner

*Primary Examiner* — Wilbert L Starks
(74) *Attorney, Agent, or Firm* — Richard C Litman

(57) ABSTRACT

The method of predicting gas composition in a multistage separator includes solutions to the regression problem of gas composition prediction that are developed using an ensemble of hybrid computational intelligence (CI) models. Three separate homogeneous and one heterogeneous ensemble of hybrid computational intelligence (EHCI) models are developed using a parallel scheme. The homogeneous models have the same types of CI models used as base learners, and the heterogeneous model has of different types of CI models used as base learners. Various popular CI models, including multi-layer perceptron (MLP), support vector regression (SVR) and adaptive neuro-fuzzy inference system (ANFIS), are used as base learners of ensemble models.

4 Claims, 61 Drawing Sheets

Table 6: Performance of CI Models on Training Data

| Training | CP | | MLP | | | SVR | | | ANFIS | | |
|---|---|---|---|---|---|---|---|---|---|---|---|
| Component | CC | RMSE | CC | P-value | RMSE | CC | P-value | RMSE | CC | P-value | RMSE |
| N2 | 0.8008 | 1.1383 | 0.9233 | 0.0000 | 0.8834 | 0.8142 | 0.0000 | 1.2879 | 0.9426 | 0.0000 | 0.5110 |
| CO2 | 0.9978 | 0.2926 | 0.9910 | 0.0000 | 0.6219 | 0.9865 | 0.0000 | 2.3149 | 0.9976 | 0.0000 | 0.2927 |
| H2S | 0.9947 | 0.5334 | 0.9908 | 0.0000 | 0.5512 | 0.9799 | 0.0000 | 2.9719 | 0.9944 | 0.0000 | 0.3241 |
| C1 | 0.9611 | 6.7795 | 0.9613 | 0.0000 | 6.3902 | 0.8810 | 0.0000 | 12.0963 | 0.9805 | 0.0000 | 4.4701 |
| C2 | 0.8063 | 3.9949 | 0.9190 | 0.0000 | 2.5136 | 0.8782 | 0.0000 | 3.5870 | 0.9236 | 0.0000 | 2.3067 |
| C3 | 0.9480 | 3.8902 | 0.9641 | 0.0000 | 3.0871 | 0.8832 | 0.0000 | 6.0333 | 0.9895 | 0.0000 | 1.5100 |

*Fig. 42*

Table 7: Performance of CI Models on Test Data

| Testing | CP | | MLP | | | SVR | | | ANFIS | | |
|---|---|---|---|---|---|---|---|---|---|---|---|
| Component | CC | RMSE | CC | P-value | RMSE | CC | P-value | RMSE | CC | P-value | RMSE |
| N2 | 0.9586 | 0.7402 | 0.9403 | 0.0001 | 1.5183 | 0.9843 | 0.0000 | 1.2947 | 0.9764 | 0.0000 | 0.6331 |
| CO2 | 0.9989 | 0.3114 | 0.9669 | 0.0000 | 1.2819 | 0.9419 | 0.0000 | 2.0379 | 0.9693 | 0.0000 | 1.1854 |
| H2S | 0.6800 | 2.0037 | 0.9016 | 0.0004 | 0.6673 | 0.9149 | 0.0002 | 2.8769 | 0.7828 | 0.0074 | 1.0078 |
| C1 | 0.9592 | 4.1464 | 0.9073 | 0.0003 | 4.3953 | 0.7058 | 0.0226 | 8.1564 | 0.9449 | 0.0000 | 3.7612 |
| C2 | 0.9719 | 0.8453 | 0.8166 | 0.0039 | 1.6302 | 0.8143 | 0.0041 | 2.5780 | 0.5389 | 0.1080 | 2.4759 |
| C3 | 0.9684 | 1.0511 | 0.6426 | 0.0451 | 1.8437 | 0.6319 | 0.0500 | 4.6158 | 0.4720 | 0.1684 | 2.2636 |

*Fig. 43*

Table 8: Performance of HCI Models on Training Data

| Training Component | CP CC | CP RMSE | GA+MLP P-value | GA+MLP RMSE | GA+MLP CC | GA+SVR P-value | GA+SVR RMSE | GA+SVR CC | GA+ANFIS P-value | GA+ANFIS RMSE |
|---|---|---|---|---|---|---|---|---|---|---|
| N2 | 0.8008 | 1.1383 | 0.9239 | 0.0000 | 0.6173 | 0.7954 | 0.0000 | 0.9110 | 0.8965 | 0.0000 | 0.6655 |
| CO2 | 0.9978 | 0.2926 | 0.9932 | 0.0000 | 0.5030 | 0.9890 | 0.0000 | 0.6285 | 0.9991 | 0.0000 | 0.1845 |
| H2S | 0.9947 | 0.5334 | 0.9786 | 0.0000 | 0.7012 | 0.9963 | 0.0000 | 0.2969 | 0.9990 | 0.0000 | 0.1388 |
| C1 | 0.9611 | 6.7795 | 0.9737 | 0.0000 | 5.3129 | 0.9716 | 0.0000 | 5.5233 | 0.9847 | 0.0000 | 3.9868 |
| C2 | 0.8063 | 3.9949 | 0.9496 | 0.0000 | 1.8938 | 0.8821 | 0.0000 | 2.8458 | 0.9694 | 0.0000 | 1.4813 |
| C3 | 0.9480 | 3.8902 | 0.9764 | 0.0000 | 2.3174 | 0.8912 | 0.0000 | 4.7318 | 0.9926 | 0.0000 | 1.2935 |

*Fig. 44*

Table 9: Performance of HCI Models on Test Data

| Testing Component | CP CC | CP RMSE | GA+MLP P-value | GA+MLP RMSE | GA+MLP CC | GA+SVR P-value | GA+SVR RMSE | GA+SVR CC | GA+ANFIS P-value | GA+ANFIS RMSE |
|---|---|---|---|---|---|---|---|---|---|---|
| N2 | 0.9586 | 0.7402 | 0.8953 | 0.0005 | 1.1926 | 0.9767 | 0.0000 | 0.7183 | 0.9795 | 0.0000 | 0.5851 |
| CO2 | 0.9989 | 0.3114 | 0.9920 | 0.0000 | 0.6492 | 0.9385 | 0.0001 | 1.6950 | 0.9827 | 0.0000 | 0.9162 |
| H2S | 0.6800 | 2.0037 | 0.8527 | 0.0017 | 0.9093 | 0.9119 | 0.0002 | 0.7088 | 0.8211 | 0.0036 | 0.9878 |
| C1 | 0.9592 | 4.1464 | 0.9346 | 0.0001 | 3.8597 | 0.8195 | 0.0037 | 7.6243 | 0.9242 | 0.0001 | 4.0493 |
| C2 | 0.9719 | 0.8453 | 0.7971 | 0.0058 | 3.0978 | 0.8779 | 0.0008 | 1.4300 | 0.8339 | 0.0027 | 1.4430 |
| C3 | 0.9684 | 1.0511 | 0.8950 | 0.0005 | 0.9948 | 0.6227 | 0.0545 | 4.5514 | 0.5898 | 0.0727 | 2.2791 |

*Fig. 45*

Table 10: Performance of EHCI Models of Heterogeneous and MLP on Training Data

| Training | CP | | EN_of_MLP+SVR+ANFIS | | | | EN_of_MLP | | |
|---|---|---|---|---|---|---|---|---|---|
| Component | CC | RMSE | CC | P-value | RMSE | Combiner | CC | P-value | RMSE | Combiner |
| N2 | 0.8008 | 1.1383 | 0.8404 | 0.0000 | 0.8733 | FCM | 0.8458 | 0.0000 | 0.8740 | FCM |
| CO2 | 0.9978 | 0.2926 | 0.9946 | 0.0000 | 0.4420 | Avg | 0.9734 | 0.0000 | 1.0653 | SVR |
| H2S | 0.9947 | 0.5334 | 0.9970 | 0.0000 | 0.2342 | Avg | 0.9983 | 0.0000 | 0.1756 | Subclust |
| C1 | 0.9611 | 6.7795 | 0.9940 | 0.0000 | 2.4706 | Subclust | 0.9850 | 0.0000 | 3.8961 | WT_Avg |
| C2 | 0.8063 | 3.9949 | 0.9849 | 0.0000 | 1.0394 | Subclust | 0.9476 | 0.0000 | 1.9194 | Subclust |
| C3 | 0.9480 | 3.8902 | 0.9574 | 0.0000 | 3.0316 | NN | 0.9854 | 0.0000 | 1.7741 | Subclust |

Fig. 46

Table 11: Performance of EHCI Models of Heterogeneous and MLP on Test Data

| Testing | CP | | EN_of_MLP+SVR+ANFIS | | | | EN_of_MLP | | |
|---|---|---|---|---|---|---|---|---|---|
| Component | CC | RMSE | CC | P-value | RMSE | Combiner | CC | P-value | RMSE | Combiner |
| N2 | 0.9586 | 0.7402 | 0.9445 | 0.0000 | 1.3335 | FCM | 0.9354 | 0.0001 | 0.9959 | FCM |
| CO2 | 0.9989 | 0.3114 | 0.9760 | 0.0000 | 1.1102 | Avg | 0.9921 | 0.0000 | 0.6455 | SVR |
| H2S | 0.6800 | 2.0037 | 0.8635 | 0.0013 | 0.8243 | Avg | 0.8254 | 0.0033 | 0.9471 | Subclust |
| C1 | 0.9592 | 4.1464 | 0.9724 | 0.0000 | 2.5963 | Subclust | 0.9754 | 0.0000 | 2.6864 | WT_Avg |
| C2 | 0.9719 | 0.8453 | 0.7901 | 0.0065 | 1.8677 | Subclust | 0.9579 | 0.0000 | 0.9375 | Subclust |
| C3 | 0.9684 | 1.0511 | 0.7165 | 0.0197 | 1.8074 | NN | 0.9626 | 0.0000 | 0.7051 | Subclust |

Fig. 47

Table 12: Performance of EHCI Models of SVR and ANFIS on Training Data

| Training Component | CP | | EN_of_SVR | | | | EN_of_ANFIS | | | |
|---|---|---|---|---|---|---|---|---|---|---|
| | CC | RMSE | CC | P-value | RMSE | Combiner | CC | P-value | RMSE | Combiner |
| N2 | 0.8008 | 1.1383 | 0.9152 | 0.0000 | 0.5971 | WT_Avg | 0.8604 | 0.0000 | 0.2509 | Subclust |
| CO2 | 0.9978 | 0.2926 | 0.9951 | 0.0000 | 0.4142 | Subclust | 0.9694 | 0.0000 | 1.1126 | SVR |
| H2S | 0.9947 | 0.5334 | 0.9975 | 0.0000 | 0.2155 | WT_Avg | 0.9984 | 0.0000 | 0.1904 | Avg |
| C1 | 0.9611 | 6.7795 | 0.9655 | 0.0000 | 6.8267 | FCM | 0.9975 | 0.0000 | 1.5971 | Subclust |
| C2 | 0.8063 | 3.9949 | 0.9216 | 0.0000 | 2.3371 | WT_Avg | 0.9790 | 0.0000 | 1.2252 | Subclust |
| C3 | 0.9480 | 3.8902 | 0.9835 | 0.0000 | 1.8862 | Subclust | 0.8759 | 0.0000 | 5.1539 | NN |

Fig. 48

Table 13: Performance of EHCI Models of SVR and ANFIS on Test Data

| Testing Component | CP | | EN_of_SVR | | | | EN_of_ANFIS | | | |
|---|---|---|---|---|---|---|---|---|---|---|
| | CC | RMSE | CC | P-value | RMSE | Combiner | CC | P-value | RMSE | Combiner |
| N2 | 0.9586 | 0.7402 | 0.9920 | 0.0000 | 0.5339 | WT_Avg | 0.9735 | 0.0000 | 0.5858 | Subclust |
| CO2 | 0.9989 | 0.3114 | 0.9539 | 0.0000 | 1.4027 | Subclust | 0.9253 | 0.0001 | 1.7695 | SVR |
| H2S | 0.6800 | 2.0037 | 0.8884 | 0.0006 | 0.8431 | WT_Avg | 0.9315 | 0.0001 | 0.6100 | Avg |
| C1 | 0.9592 | 4.1464 | 0.9005 | 0.0004 | 5.7066 | FCM | 0.9113 | 0.0002 | 4.2918 | Subclust |
| C2 | 0.9719 | 0.8453 | 0.9519 | 0.0000 | 0.7818 | WT_Avg | 0.8604 | 0.0014 | 1.2852 | Subclust |
| C3 | 0.9684 | 1.0511 | 0.8394 | 0.0024 | 1.3132 | Subclust | 0.4582 | 0.1830 | 2.2419 | NN |

Fig. 49

METHOD OF PREDICTING GAS COMPOSITION

BACKGROUND OF THE INVENTION

1. Field of the Invention

The present invention relates to predicting gas composition in a multistage separator, and particularly to the development of solutions to the regression problem of gas composition prediction using an ensemble of hybrid computational intelligence (CI) models.

2. Description of the Related Art

Non-hydrocarbon prediction in gas compositions is a challenging task due to the fact that the amounts of non-hydrocarbons are typically small and are treated as impurities in the gas. Further, the quantities vary by ranges as functions of temperature and pressure gradients. Further, there are no straightforward analytical solutions to predict their quantities. In recent years, computational intelligence techniques, such as artificial neural network (ANNs), have gained enormous popularity in predicting various petroleum reservoirs' properties, such as pressure-volume-temperature (PVT), porosity, permeability, viscosity and the like.

Although basic component prediction has been established, there is interest in the much more complex prediction of gas composition in multistage separators, particularly using computational intelligence techniques. Petroleum gas, or natural gas, is defined as a mixture of hydrocarbons and varying amounts of non-hydrocarbons that exist either in a gaseous phase or in solution with crude oil in underground reservoirs. Reservoirs are typically in the form of a sponge-like rock with interconnected open spaces between grains, typically found approximately a kilometer underground.

Capacity and efficiency of gas/liquid separation is of great concern in natural gas production. Oil resides in the reservoir at great temperatures and pressures, on the order of 5,000 psi and approximately 250° F. After the oil is extracted from the reservoir, it is collected in sequential multistage separator tanks at much lower temperatures and pressures, typically on the order of approximately 175 psi and 150° F. An exemplary multistage separator 100 is shown in FIG. 2. The reservoir oil initially resides within the reservoir R. In the first stage, the oil is extracted and held in the first-stage reactor, where gas is separated from the oil, and the extracted gas G1 is collected in a tank or the like. Moving through each stage, more gas is extracted from the oil as temperature and pressure are steadily decreased. In FIG. 2, once the gas G1 has been extracted, the oil is transferred to the second-stage reactor, where further separation is performed. Second-stage gas G2 is extracted at a pressure on the order of approximately 100 psi and a temperature of approximately 100° F. The oil is then passed to a third-stage reactor, where third-stage gas G3 is separated at a pressure on the order of approximately 14.7 psi and a temperature of approximately 60° F. Although a three-stage reactor is shown in FIG. 2, it should be understood that this is for exemplary purposes only, and that a multi-stage reactor may have many more intermediate stages.

A common complication that occurs in quantifying the behavior of such multiphase flows is that under high pressure, the properties of the mixture may differ considerably from those of the same mixture at atmospheric pressure, i.e., under pressure, the extracted gas may still contain liquid and solid constituents. The removal of these constituents forms the most important process step before delivery can take place. The liquids almost invariably consist of water and hydrocarbons that are gaseous under reservoir conditions, but which condense during production due to the decrease in gas pressure and temperature. Mixtures of non-hydrocarbons, such as $N_2$, $CO_2$ and $H_2S$, are not desirable in the remaining stock tank oil, and removal of such non-hydrocarbons requires a great deal of additional energy and effort. Thus, prediction of the quantities of the non-hydrocarbons would greatly facilitate the multi-stage separator process.

In the industry, the equation of state (EOS) and empirical correlations (EC) are used to predict oil and gas properties, along with basic artificial intelligence (AI). For example, the Chevron Phase Calculation Program (CPCP) is a typical program that is based on EOS and EC. CPCP is a program designed to help the engineer to calculate the phase compositions, densities, viscosities, thermal properties, and the interfacial tensions between phases for liquids and vapors in equilibrium. The program takes reservoir gas compositions, C7+ molecular weight and density, and separator stage temperature and pressure as input, and then predicts gas compositions of that stage as output using EOS and EC.

EOS is useful for a description of fluid properties, such as PVT, but there is no single EOS that accurately estimates the properties of all substances under all conditions. The EOS has adjustment issues against the phase behavior data of reservoir fluid of known composition, while the EC has only limited accuracy. In recent years, computational intelligence (CI) techniques, such as ANN, have gained popularity in solving various petroleum related problems, such as PVT, porosity, permeability, and viscosity prediction.

In one such prior art technique, a multi-layer perceptron (MLP) with one hidden layer and a sigmoid activation function was used for the establishment of a model capable of learning the complex relationship between the input and the output parameters to predict gas composition. The ANN is a machine learning approach inspired by the way in which the human brain performs a particular learning task. ANN is composed of simple elements operating in parallel. These elements are inspired by biological nervous systems.

MLP (illustrated in FIG. 3) is one of the most popular ANN types, at present. MLP has one input layer, one output layer, and one or more hidden layers of processing units. MLP has no feedback connections. The hidden layers sit between the input and output layers, and are thus hidden from the outside world, as shown in FIG. 3. The MLP can be trained to perform a particular function by adjusting the values of the connections (weights) between elements. Typically, MLP is adjusted, or trained, so that a particular input leads to a specific target output. The weights are adjusted, based on a comparison of the output and the target, until the network output matches the target. Typically, many such input/target pairs are needed to train a network.

FIG. 4 illustrates a neuron with a sigmoidal activation function, where $$a = \sum_{j=1}^{m} x_j(n)w_j(n) \text{ and } y = \sigma(a) = \frac{1}{(1+e^{-a})},$$

where $x_j$ represent the inputs, $w_j$ represent the weights for each of the n inputs, and y represents the output of the neuron. In the prior art technique for ANN component prediction noted above, each non-hydrocarbon is predicted separately. One hidden layer is used for each non-hydrocarbon. The configuration used for prediction of $N_2$, $CO_2$ and $H_2S$ is shown below in Table 1:

TABLE 1

MLP Structure for each component

| Gas | Hidden Layer Nodes | Hidden Layer Activation Function | Outer Layer Activation Function |
|---|---|---|---|
| $N_2$ | 37 | logsig | tansig |
| $CO_2$ | 37 | logsig | tansig |
| $H_2S$ | 80 | logsig | tansig |

The training algorithm "Levenberg-Marquardt" was used for predicting $N_2$ and $H_2S$, while "Resilient Back propagation" (Rprop) was used for predicting $CO_2$. The other parameters that were used for MLP were Epochs, which was 300, a learning rate of 0.001 and a goal set to 0.00001. The MLP structure for predicting $CO_2$ is shown in FIG. 5.

Petroleum deposits are naturally mixtures of organic compounds consisting mainly of non-hydrocarbons and hydrocarbons. The deposit that is found in the gaseous form is called "natural gas", and that found in the liquid form is called "crude oil". For the ANN prediction technique, the input parameter consists of a mole percent of non-hydrocarbons, such as $N_2$, $H_2S$ and $CO_2$, and hydrocarbons, such as methane (C1), ethane (C2), propane (C3), butane (C4 4), pentane (C5), hexane (C6), and heptanes and heavier hydrocarbons (C7+). The other input parameters are stock tank API, BPP, reservoir temperature, and separator pressure and temperature. In addition to the above, there are also isomers of C4 and C5. Above C7 components are considered as C7+. Molecular weight and density parameters of C7+ components are also given as input parameters. The non-hydrocarbons are of greater interest, as noted above. Thus, the output parameters consist of mole fractions of $N_2$, $CO_2$ and $H_2S$. To increase the number of training samples, the Stage 1 and Stage 2 oil compositions were calculated from the available data using the material balance method. 70% of samples taken were randomly chosen for training, and the remaining 30% of samples taken were used for validation and testing.

For such ANN methods, common techniques for performance evaluation include the correlation coefficient (CC) and the root mean squared error (RMSE). The CC measures the statistical correlation between the predicted and the actual values. This method is unique, in that it does not change with a scale in values. The value "1" means perfect statistical correlation and a value of "0" means no correlation at all. A higher number represents better results. This performance measure is only used for numerical input and output. The CC is calculated using the formula $$\frac{\sum (x - x')(y - y')}{\sqrt{\sum (x - x')^2 \sum (y - y')^2}},$$

where x and y are the actual and the predicted values, and x' and y' are the mean of the actual and predicted values, respectively.

The RMSE is one of the most commonly used measures of success for numeric prediction. This value is computed by taking the average of the squared differences between each predicted value $x_n$ and its corresponding actual value $y_n$. The RMSE is simply the square root of the mean squared error. The RMSE gives the error value with the same dimensionality as the actual and predicted values. It is calculated as $$\sqrt{\frac{(x_1 - y_1)^2 + (x_2 - y_2)^2 + \ldots + (x_n - y_n)^2}{n}},$$

where n is the size of the data.

The training and prediction time of the ANN prediction technique is simply (T2−T1), where T2 is the CPU time at the end of the prediction and T1 is the CPU time at the beginning of training. Training time is measured to observe how long the model requires for training, and the prediction time shows how fast the model can predict the test data. When compared against CPCP, the prior art MLP ANN method was found to achieve higher prediction accuracy with a lower RMSE and a higher CC value for $N_2$ and $H_2S$. CPCP was found to perform relatively well against the MLP ANN method for $CO_2$. Thus, it would be desirable to be able to improve the results of the ANN technique, particularly in $CO_2$ prediction. Further, the prior art MLP technique needs a very long time for training and takes a great deal of computational power and time. It would be desirable to be able to tune the MLP parameters, as well applying evolutionary techniques in order to better optimize parameters. Further, given the advantages of ensemble techniques with regard to the above, it would also be desirable to be able to adapt such an ANN technique for ensemble computing.

In statistics and machine learning, ensemble methods use multiple models to obtain better predictive performance than could be obtained from any of the constituent models. Unlike a statistical ensemble in statistical mechanics, which is usually infinite, a machine learning ensemble refers only to a concrete, finite set of alternative models. "Supervised learning algorithms" are commonly described as performing the task of searching through a hypothesis space to find a suitable hypothesis that will make good predictions with a particular problem. Even if the hypothesis space contains hypotheses that are very well-suited for a particular problem, it may be very difficult to find a good one. Ensembles combine multiple hypotheses to form a (hopefully) better hypothesis. In other words, an ensemble is a technique for combining many weak learners in an attempt to produce a strong learner. The term ensemble is usually reserved for methods that generate multiple hypotheses using the same base learner. The broader term of "multiple classifier systems" also covers hybridization of hypotheses that are not induced by the same base learner.

Evaluating the prediction of an ensemble typically requires more computation than evaluating the prediction of a single model, so ensembles may be thought of as a way to compensate for poor learning algorithms by performing a lot of extra computation. Fast algorithms, such as decision trees, are commonly used with ensembles, although slower algorithms can benefit from ensemble techniques as well.

An ensemble is itself a supervised learning algorithm, because it can be trained and then used to make predictions. The trained ensemble, therefore, represents a single hypothesis. This hypothesis, however, is not necessarily contained within the hypothesis space of the models from which it is built. Thus, ensembles can be shown to have more flexibility in the functions they can represent. This flexibility can, in theory, enable them to over-fit the training data more than a single model would, but in practice, some ensemble techniques (particularly "bagging") tend to reduce problems related to over-fitting of the training data.

Empirically, ensembles tend to yield better results when there is a significant diversity among the models. Many ensemble methods, therefore, seek to promote diversity among the models they combine. Although perhaps non-intuitive, more random algorithms (such as random decision trees) can be used to produce a stronger ensemble than very deliberate algorithms (such as entropy-reducing decision trees). Using a variety of strong learning algorithms, however, has been shown to be more effective than using techniques that attempt to dumb-down the models in order to promote diversity.

Bootstrap aggregating, often abbreviated as "bagging", involves having each model in the ensemble vote with equal weight. In order to promote model variance, bagging trains each model in the ensemble using a randomly-drawn subset of the training set. As an example, the random forest algorithm combines random decision trees with bagging to achieve very high classification accuracy. Given a standard training set D of size n, bagging generates in new training sets $D_i$, each of size n'>n, by sampling examples from D uniformly and with replacement. By sampling with replacement, it is likely that some examples will be repeated in each $D_i$. If n'=n, then for large n, the set $D_i$ is expected to have 63.2% of the unique examples of D, the rest being duplicates. This kind of sample is known as a bootstrap sample. The in models are fitted using the above in bootstrap samples and combined by averaging the output (for regression) or voting (for classification). Since the method averages several predictors, it is not useful for improving linear models. Similarly, bagging does not improve very stable models, like k nearest neighbors.

"Boosting" involves incrementally building an ensemble by training each new model instance to emphasize the training instances that previous models misclassified. In some cases, boosting has been shown to yield better accuracy than bagging, but it also tends to be more likely to over-fit the training data. By far, the most common implementation of boosting is AdaBoost, although some newer algorithms are reported to achieve better results.

While boosting is not algorithmically constrained, most boosting algorithms consist of iteratively learning weak classifiers with respect to a distribution and adding them to a final strong classifier. When they are added, they are typically weighted in some way that is usually related to the weak learners' accuracy. After a weak learner is added, the data is reweighted: examples that are misclassified gain weight, and examples that are classified correctly lose weight. Thus, future weak learners focus more on the examples that previous weak learners misclassified.

AdaBoost, short for Adaptive Boosting, is a machine learning algorithm, which is a meta-algorithm, and can be used in conjunction with many other learning algorithms to improve their performance. AdaBoost is adaptive in the sense that subsequent classifiers built are tweaked in favor of those instances misclassified by previous classifiers. AdaBoost is sensitive to noisy data and outliers. In some problems, however, it can be less susceptible to the overfitting problem than most learning algorithms. The classifiers it uses can be weak (i.e., display a substantial error rate), but as long as their performance is not random (resulting in an error rate of 0.5 for binary classification), they will improve the final model. Even classifiers with an error rate higher than would be expected from a random classifier will be useful, since they will have negative coefficients in the final linear combination of classifiers, and hence behave like their inverses.

AdaBoost generates and calls a new weak classifier in each of a series of rounds t=1, . . . , T. For each call, a distribution of weights $D_t$ is updated that indicates the importance of examples in the data set for the classification. On each round, the weights of each incorrectly classified example are increased, and the weights of each correctly classified example are decreased, so the new classifier focuses on the examples that have, so far, eluded correct classification.

Typically, an ensemble is constructed in two steps. First, a number of base learners are produced, which can be generated in a parallel style (Bagging) or in a sequential style (Boosting), where the generation of a base learner has influence on the generation of subsequent learners. Then, the base learners are combined for use in the application. The most popular combination schemes for classification and regression are majority voting and weighted averaging, respectively.

Thus, a method of predicting gas composition solving the aforementioned problems is desired.

SUMMARY OF THE INVENTION

The method of predicting gas composition relates to predicting gas composition in a multistage separator. Particularly, solutions to the regression problem of gas composition prediction are developed using an ensemble of hybrid computational intelligence (CI) models. Three separate homogeneous models and one heterogeneous ensemble of hybrid computational intelligence (EHCI) models are developed using a parallel scheme. The homogeneous models comprise the same types of CI models used as base learners, and the heterogeneous model comprises different types of CI models used as base learners. Various popular CI models, including multi-layer perceptron (MLP), support vector regression (SVR), and adaptive neuro-fuzzy inference system (ANFIS), are used as base learners of ensemble models.

The method combines genetic algorithms (GAs) with each base learner to form hybrid models. The GA optimizes the most crucial parameters of each CI model, the crucial parameters largely being responsible for accuracy. The method includes the steps of: (a) receiving a set of input parameters related to a fluid mixture of hydrocarbons and non-hydrocarbons fed into a multistage separator; (b) providing a training dataset; (c) randomly selecting a first set percentage of the training dataset; (d) establishing an ensemble of N empirical models, where N is an integer; (e) optimizing each empirical model with a genetic algorithm; (f) training each optimized empirical model with the selected first set percentage of the training dataset; (g) predicting a mole percentage of the non-hydrocarbons in the fluid mixture; (h) comparing the predicted mole percentage with the input parameters and selecting a second set percentage of badly predicted training datasets based upon a pre-set threshold error value; and (i) repeating the steps (e) through (g) N times on the second set percentage of badly predicted training datasets.

The final prediction of mole percentage, after the repetition of steps (e) through (g) N times, is the final output of the process, i.e., the final prediction of mole percentages of non-hydrocarbons in the fluid mixture. Preferably, the first set percentage and the second set percentage are equal. The empirical models may be multilayer perceptron, support vector regression, adaptive neuro-fuzzy inference system, or combinations thereof.

These and other features of the present invention will become readily apparent upon further review of the following specification and drawings.

BRIEF DESCRIPTION OF THE DRAWINGS

FIG. 42 is a table showing performance data of individual computational intelligence models on training data.

FIG. 43 is a table showing performance data of individual computational intelligence models on test data.

FIG. 44 is a table showing performance data of individual hybrid computational intelligence models on training data.

FIG. 45 is a table showing performance data of individual hybrid computational intelligence models on test data.

FIG. 46 is a table showing performance data of ensemble hybrid computational intelligence models on MLP training data.

FIG. 47 is a table showing performance data of ensemble hybrid computational intelligence models on MLP test data.

FIG. 48 is a table showing performance data of ensemble hybrid computational intelligence models on SVR and ANFIS training data.

FIG. 49 is a table showing performance data of ensemble hybrid computational intelligence models on SVR and ANFIS test data.

Similar reference characters denote corresponding features consistently throughout the attached drawings.

DETAILED DESCRIPTION OF THE PREFERRED EMBODIMENTS

Figure 1:
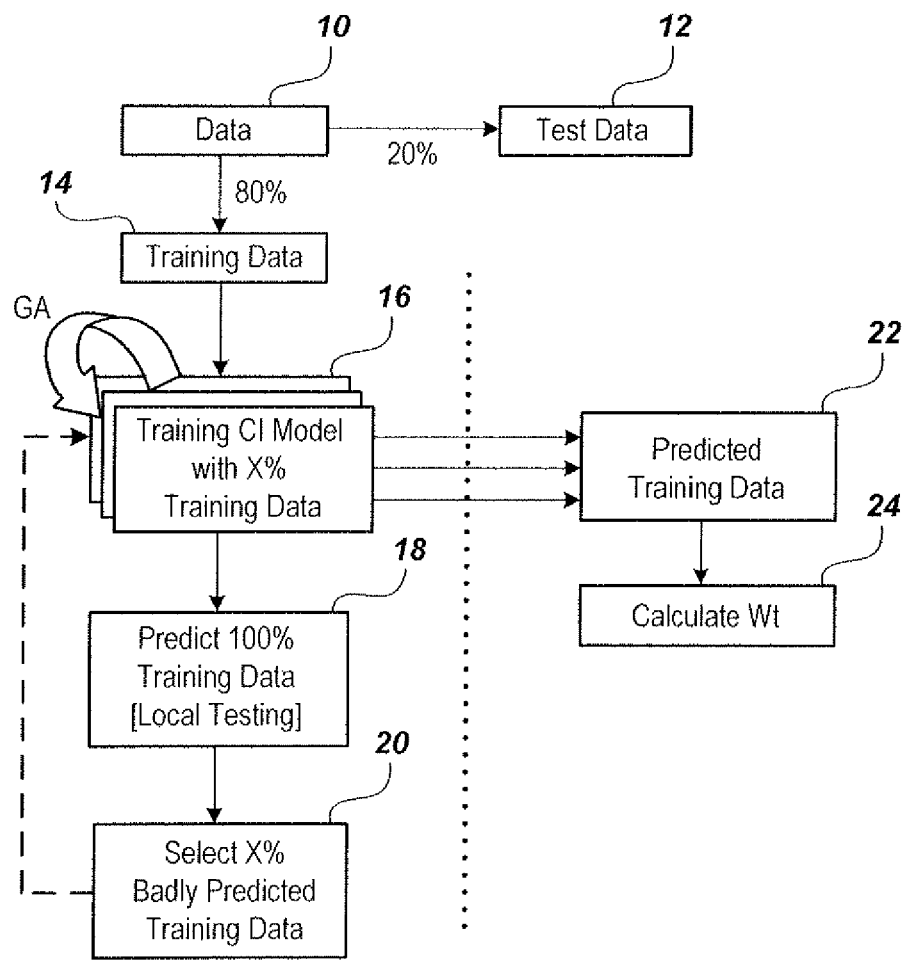
FIG. 1 is a flowchart illustrating a training phase in a method of predicting gas composition according to the present invention, in which the training phase utilizes a linear combiner.
Figure 2:
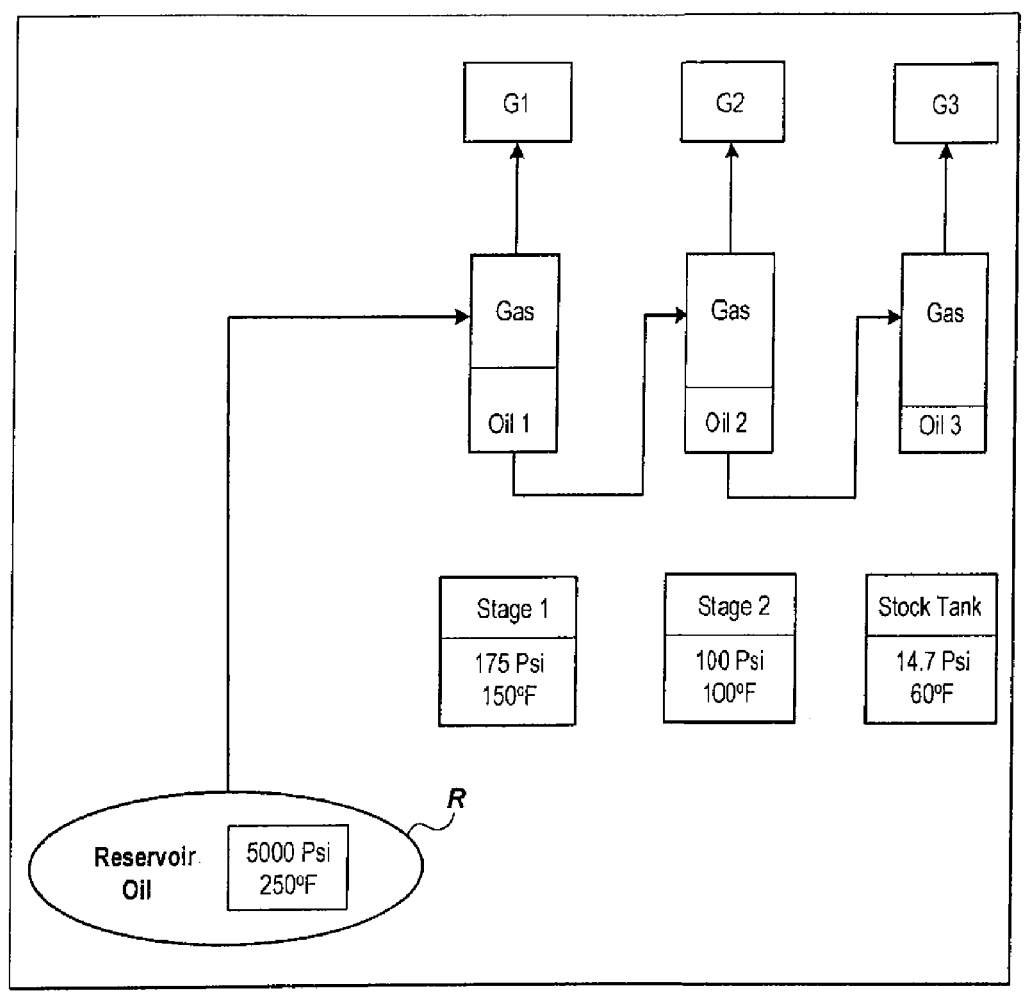
FIG. 2 is a block diagram illustrating a conventional prior art multi-stage gas-oil separator.
Figure 3:
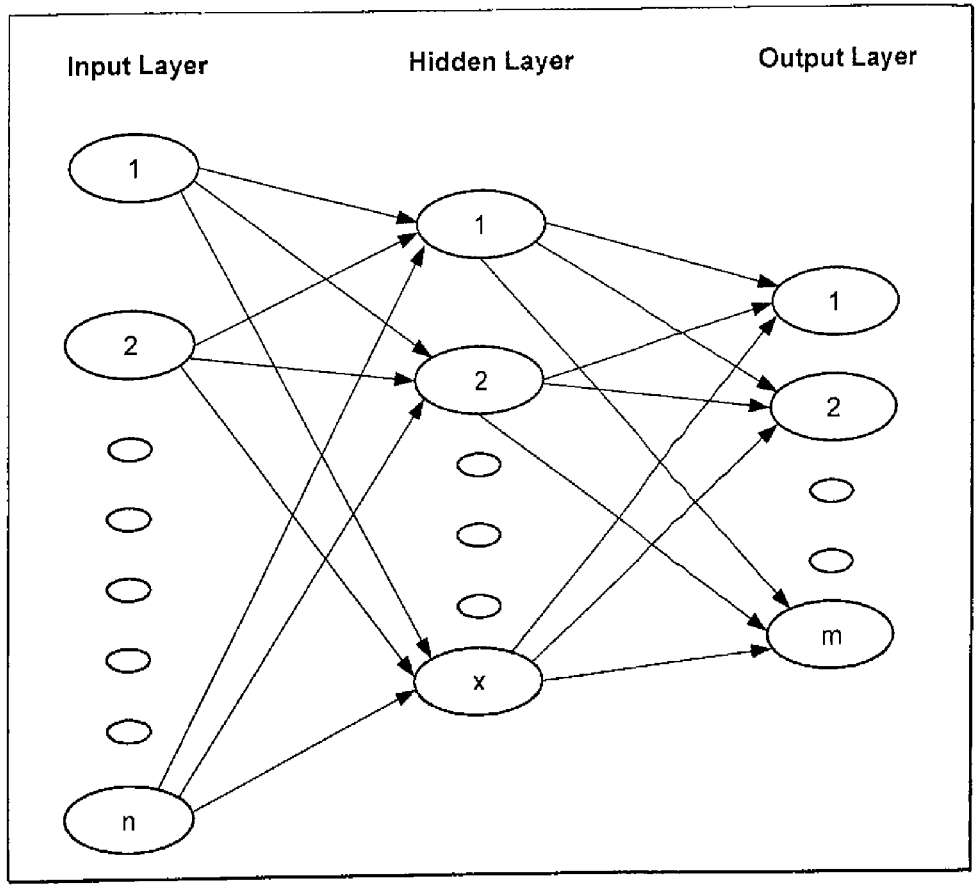
FIG. 3 is an entity relationship diagram illustrating operation of a conventional multi-layer perceptron (MLP) model.
Figure 4:
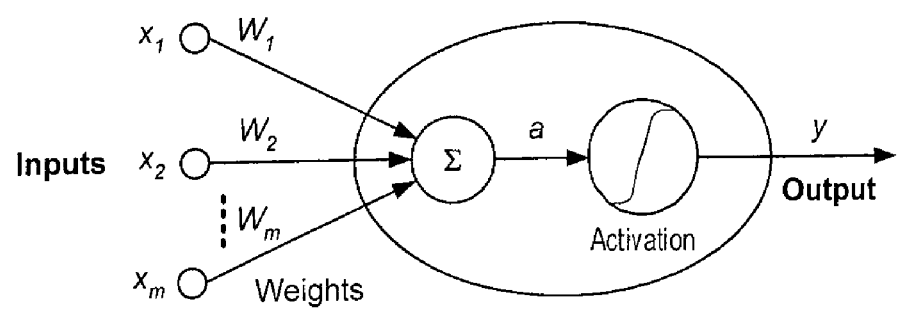
FIG. 4 is a block diagram illustrating a conventional neuron used in artificial neural networks (ANNs), the neuron having a sigmoid activation function.
Figure 5:
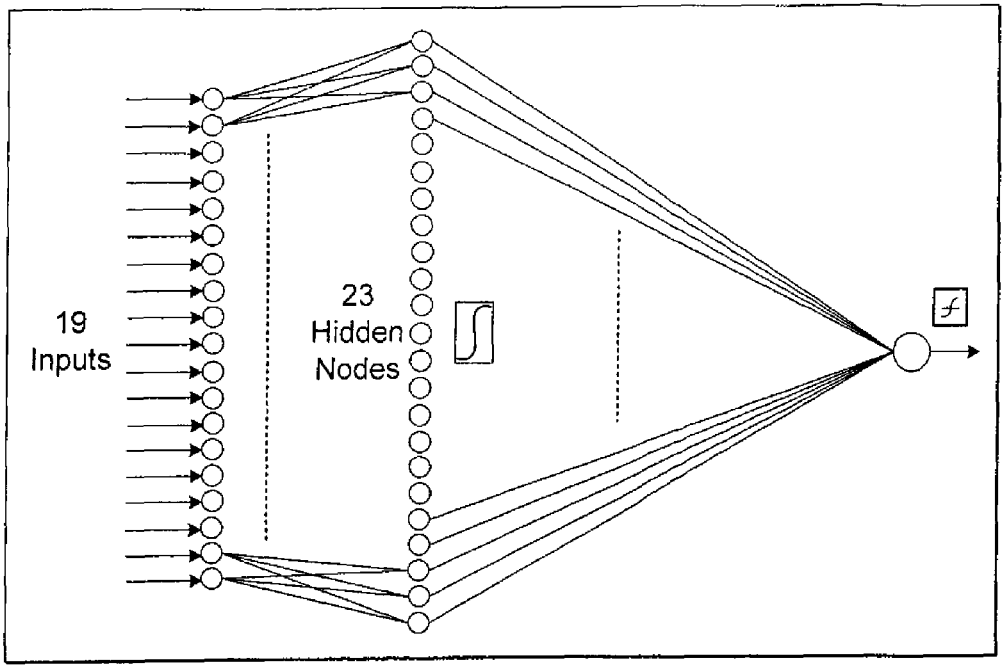
FIG. 5 is a block diagram illustrating a prior art multi-layer perceptron (MLP) prediction of a nitrogen ($N_2$) gas component in a mixture.

The method of predicting gas composition relates to predicting gas composition in a multistage separator. Particularly, solutions to the regression problem of gas composition prediction are developed using an ensemble of hybrid computational intelligence (CI) models. Three separate homogeneous models and one heterogeneous ensemble of hybrid computational intelligence (EHCI) models are developed using a parallel scheme. The homogeneous models comprise the same types of CI models used as base learners, and the heterogeneous model comprises different types of CI models used as base learners. Various popular CI models, including multi-layer perceptron (MLP), support vector regression (SVR), and adaptive neuro-fuzzy inference system (ANTIS), are used as base learners of the ensemble models.

The method combines genetic algorithms (GAs) with each base learner to form hybrid models. The GA optimizes the most crucial parameters of each CI model, the crucial parameters largely being responsible for accuracy. As will be seen below, in order to compare the performance of the EHCI models, results from the Chevron Phase Calculation Program (CPCP) are used as a benchmark. The EHCI models are found to have improved generalization ability when comparing CPCP and single HCI models.

The method includes the steps of: (a) receiving a set of input parameters related to a fluid mixture of hydrocarbons and non-hydrocarbons fed into a multistage separator; (b) providing a training dataset; (c) randomly selecting a first set percentage of the training dataset; (d) establishing an ensemble of N empirical models, where N is an integer; (e) optimizing each empirical model with a genetic algorithm; (0 training each optimized empirical model with the selected first set percentage of the training dataset; (g) predicting a mole percentage of the non-hydrocarbons in the fluid mixture; (h) comparing the predicted mole percentage with the input parameters and selecting a second set percentage of badly predicted training datasets based upon a pre-set threshold error value; and (i) repeating the steps (e) through (g) N times on the second set percentage of badly predicted training datasets.

The final prediction of mole percentage, after the repetition of steps (e) through (g) N times, is the final output of the process, i.e., the final prediction of mole percentages of non-hydrocarbons in the fluid mixture. Preferably, the first set percentage and the second set percentage are equal. The empirical models may be multilayer perceptron, support vector regression, adaptive neuro-fuzzy inference system, or combinations thereof.

Combining the output of several classifiers is useful only if they disagree on some inputs. Both theoretical and empirical work shows that an effective ensemble should consist of a set of networks that are not only highly correct, but ones that make their errors on different parts of the input space as well. Generally, the approaches for employing diversity while designing the networks can be broken into three groups: differences in ensemble members' structures; differences in training sets; and differences in training inputs.

With regard to the differences in the ensemble members' structures, diverse individuals can be obtained by adopting different model structures. In neural networks, different types of models can be obtained by having different network types, along with varying the number of neurons in hidden layers, variations in learning algorithms, and variations in the initial state in weight space. For support vector regression (SVR), variation may also take place through different kernel functions and kernel parameters, along with different SVR-specific parameter values. For adaptive neuro-fuzzy inference systems (ANFISs), the variation may be in the methodology of creating the initial FIS, along with different types of ANFIS structure.

Referring to the differences in training sets, diversity may be supported by training the ensemble of hybrid computational intelligence (EHCI) members on different training datasets, which can be achieved by bagging, boosting or cross validation. Both bagging and boosting generate a group of networks that are error uncorrelated directly. It has been experimentally found that varying the net type and the training data are the two best techniques for creating ensembles of networks making different errors. As for the difference in training inputs, different input parameters can be given to different base learners, thus providing a diverse knowledge over the entire problem domain. In this case, different base learners are expert in different portions of the solution space, and improve the generalization ability of the combined model. Another popular technique for providing diversity is to generate a large number of initial networks from which several uncorrelated networks are selected as a member of the ensemble.

In the following, the techniques of using differences in ensemble members' structures and differences in training sets have been utilized. Particularly, diversity is enforced in heterogeneous ensembles and homogeneous ensembles. Heterogeneous ensembles consist of members having multiple types of base learning algorithms. In this case, ensemble members can be different in their structures. As will be described in further detail below, a heterogeneous ensemble model is developed using genetic algorithm (GA) optimized computational intelligence (CI) models of combined type multilayer perceptron (MLP), SVR and ANFIS.

In the heterogeneous model, the input is first provided in the MLP. Badly predicted training data by the MLP is then selected and provided as input to train the SVR. Badly predicted training data by the SVR is then selected and provided to the ANFIS for training. In this way, the model becomes diverse by having training datasets and having one HCI model handling those cases that cannot be handled by the other HCI model.

The homogeneous ensemble consists of members having a single type of base learning algorithm. In this case, ensemble members may have different structures. Three homogeneous ensemble models have been developed, and each has three HCI models of the same type. Just as three types of HCI models are used, three heterogeneous EHCI models are generated in the same fashion.

To combine the outputs of the ensemble, both linear and non-linear approaches have been utilized. When the ensemble is used in classifying, voting is used for combining outputs, and when the ensemble is used in regression, simple average and weighted average techniques are used. In this way, the globally optimal generalization error on the basis of all of the available data can be reached by optimizing the training set sizes of the individual member. For ensembles of realistic size, optimizing the ensemble weights can yield substantially better generalization performance than an optimally chosen single network trained on all data with the same amount of training noise.

The outputs of the EHCI members go as input into CI models, and these models are trained after the training phase completion of the members of the EHCI. It has been found that the non-linear combiner performed well in some cases, while in other cases the linear combiner provided better results. Among the linear approaches used are simple average and weighted average methods to combine the outputs of EHCI members. A variety of non-linear approaches have also been used to combine the outputs. CI models include ANN, SVR, FIS created with Fuzzy C-means Clustering (FCM) and Subtractive Clustering (Subclust) as a combiner. For the ANN combiner, an MLP with one neuron in the hidden layer with a logsigmoidal activation function has been used. In the output layer, a tansigmoidal activation function and the Rprop training algorithm have been used. For SVR, a Gaussian type kernel with $\gamma$ value 5 is used. The other parameters for the SVR model include $C=0.5$, $\lambda=1\times10^{-7}$ and $\epsilon=0.0001$. For the FIS, a FCM with six clusters and radius of 0.3 for Subclust is used.

The Ensemble of Hybrid Computational Intelligence (EHCI) models building steps are as follows; (a) determine the CI models' parameters to be optimized by observing the models' accuracy and complexity; (b) develop the ensemble model. The ensemble model is developed by: (i) randomly choosing X % of the training datasets; (ii) optimizing the CI model by using GA; (iii) training the CI model on the selected X % of the training datasets; (iv) predicting 100% training datasets; (v) choosing X % of badly predicted training datasets; and (vi) repeating steps (ii), (iii) and (iv) N times on the data provided in step (v), where N represents the number of ensemble members.

In the above method, the datasets are first divided randomly into training and testing sets. About 80% of the datasets are used for training, and 20% are used for testing. In the homogeneous EHCI model, the same type of CI model with different fixed parameters is chosen in step (ii) of each run. Performing optimization by GA with different fixed parameters results in a completely different architecture of the CI model in each run. Consequently, although the homogeneous EHCI models have similar types of CI models, their architecture is completely different. Furthermore, the HCI members of the EHCI models are trained by different portions of the training datasets. Thus, the EHCI models have enforced diversity to a degree allowing for substantiation of better generalization.

For the heterogeneous EHCI model, a different CI model must be chosen at step (ii) in each run. The algorithm can be continued to N runs so as to have an ensemble of N members. The training and testing phases in the EHCI model building steps are described below.

To train the EHCI models, X % of the training data is randomly selected with replacement to perform training of the base CI model in the first run. In FIG. 1, the initial input or gathering of data is shown at step 10. In this example, 20% of the data is separated out as test data (step 12), and the remaining 80% of the data is selected as training data (step 14). It should be understood that the 80%/20% division is shown for exemplary purposes only, and that the percentages of training size may vary between 60% and 90% for different gas components in order to achieve better performance.

In the training phase (represented on the left side of the dashed vertical separator line in FIG. 1), the parameters of the CI models are first optimized using a selected genetic algorithm (GA), and then the training is performed (step 16). Then, the whole training set is predicted as a part of "local testing" (step 18), and X % of the badly predicted data is selected from the whole training set to perform training in the next run (step 20).

To perform combining of the EHCI members' output linearly, a simple average and weighted average method are utilized (steps 22 and 24). To assign weight Wt of the members of the ECHI model, the whole set of training data is predicted to measure each member's performance in terms of RMSE. The formula for the weighted average method is simply $$\frac{\sum_{i=1}^{n} w_i x_i}{\sum_{i=1}^{n} w_i},$$

where the weight is calculated as $$w_i = \frac{\sum_{i=1}^{n} RMSE_{i+1} - RMSE_i}{(n-1)\sum_{i=1}^{n} RMSE_i}.$$

The $x_i$ are the members of the dataset, which has a total of n such members in the set.

Figure 6:
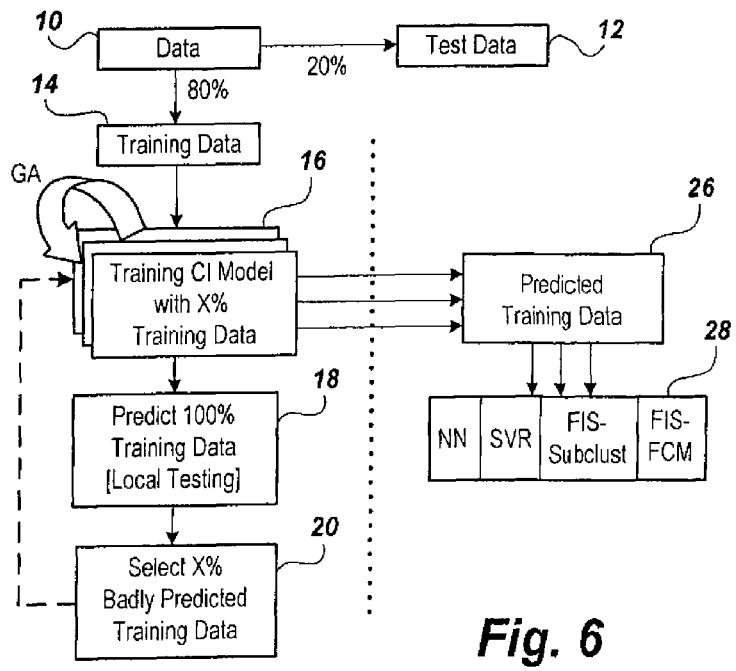
FIG. 6 is a flowchart illustrating an alternative embodiment of a training phase in a method of predicting gas composition that utilizes a nonlinear combiner.
Figure 7:
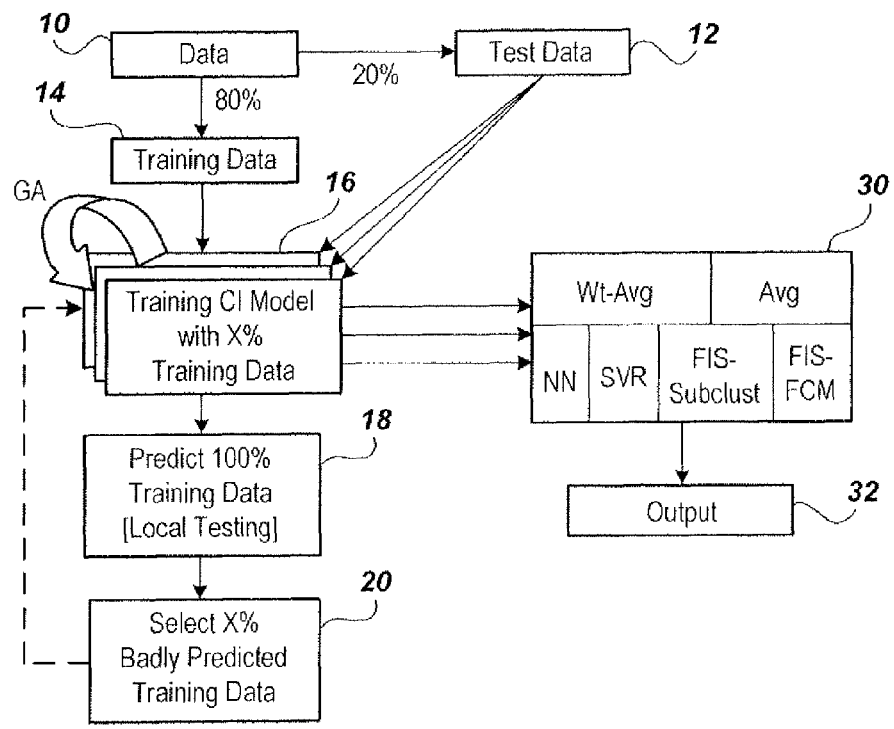
FIG. 7 is a flowchart illustrating a testing phase in a method of predicting gas composition according to the present invention.

FIG. 6 illustrates a similar training phase compared to that described above in reference to FIG. 1, but for a system using a non-linear combiner. In order to combine with a non-linear approach, the entire training data set is predicted, and this predicted output of the EHCI members are used as input (step 26) and the actual outputs are used as output of the non-linear models (step 28). NN, SVR, FIS-Subclust and FIS-FCM are used as the non-linear models for the non-linear combiner. The non-linear models are trained and used for prediction in the testing phase. FIG. 7 illustrates the testing phase, in which the test data is predicted using the EHIC members, and then the outputs are combined by both linear and non-linear models in step 30, yielding the ultimate output 32.

Figure 50:
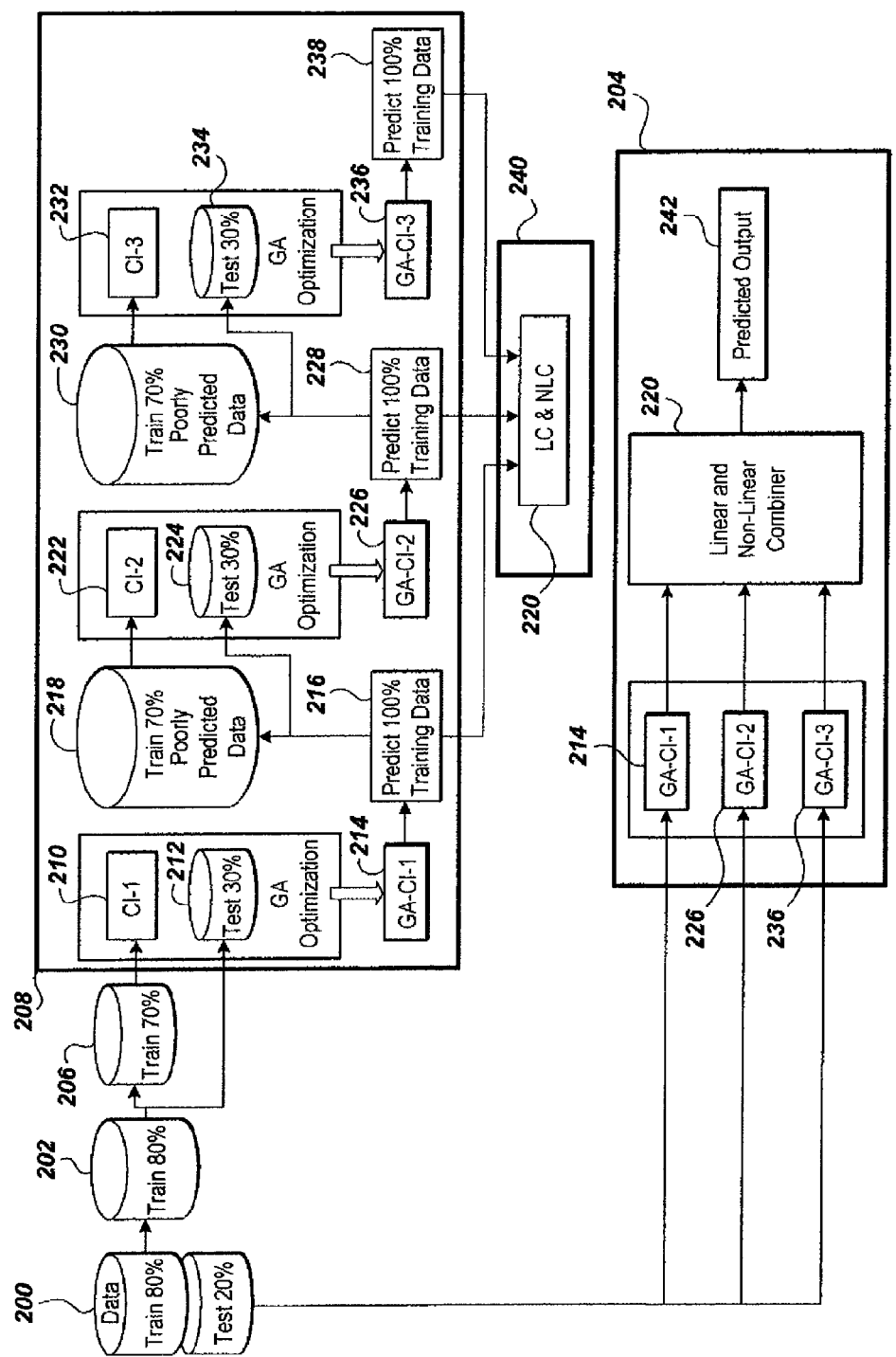
FIG. 50 is a flow chart showing method steps of model building for a homogeneous ensemble of hybrid computational intelligence models of the method of predicting gas composition.

FIG. 50 illustrates a more detailed description of the process steps for model building for the homogeneous ensemble of hybrids CI models. The initial data is input at step 200, where it is separated into training data and testing data. In this example, 80% of the data is used for training data (step 202) and 20% is transferred into the testing phase 204. At step 206, the training data is further divided before passing into the first step of the training phase 208. 70% of the training data is passed to the first CI technique 210 (labeled as CI-1 in FIG. 50), which may be selected from MLP, SVR, ANFIS, etc., as described above, and the remaining 30% of the training data 212 is then combined with the output of CI-1 for genetic algorithm optimization. The optimized result 214 is labeled as GA-CI-1 in FIG. 50, and is used for 100% prediction of training data at step 216.

The 70% of poorly predicted training data 218 from step 216 is then passed to further genetic algorithm optimization. The remainder is transferred to combined linear combiner (LC) and non-linear combiner (NLC) 220. The linear combiner determines the weight of the weighted average method and the non-linear combiner trains the non-linear combiners NN, SVR, and Fuzzy Inference System (FIS) using subtractive clustering. FIS is preferably performed using a fuzzy C-means (FCM) clustering algorithm. This process constitutes the second step of the training phase 240.

The 70% of poorly predicted training data 218 is input into the second CI technique 222 (labeled as CI-2 in FIG. 50), which may be selected from MLP, SVR, ANFIS, etc., as described above, and the remaining 30% of the training data 224 is then combined with the output of CI-2 for genetic algorithm optimization. The optimized result 226 is labeled as GA-CI-2 in FIG. 50, and is used for 100% prediction of training data at step 228.

Once again, the 70% of poorly predicted training data 230 from step 228 is then passed to further genetic algorithm optimization. The remainder is transferred to combined linear combiner and non-linear combiner 220. The 70% of poorly predicted training data 230 is input into the third CI technique 232 (labeled as CI-3 in FIG. 50), which may be selected from MLP, SVR, ANFIS, etc., as described above, and the remaining 30% of the training data 234 is then combined with the output of CI-3 for genetic algorithm optimization. The optimized result 236 is labeled as GA-CI-3 in FIG. 50, and is used for 100% prediction of training data at step 238, and is then passed to the combined linear combiner and non-linear combiner 220. In the testing phase 204, the tested data passed through GA-CI-1, GA-CI-2 and GA-CI-3, and then fed through linear and non-linear combiner 220, yields the predicted output data 242.

Figure 51:
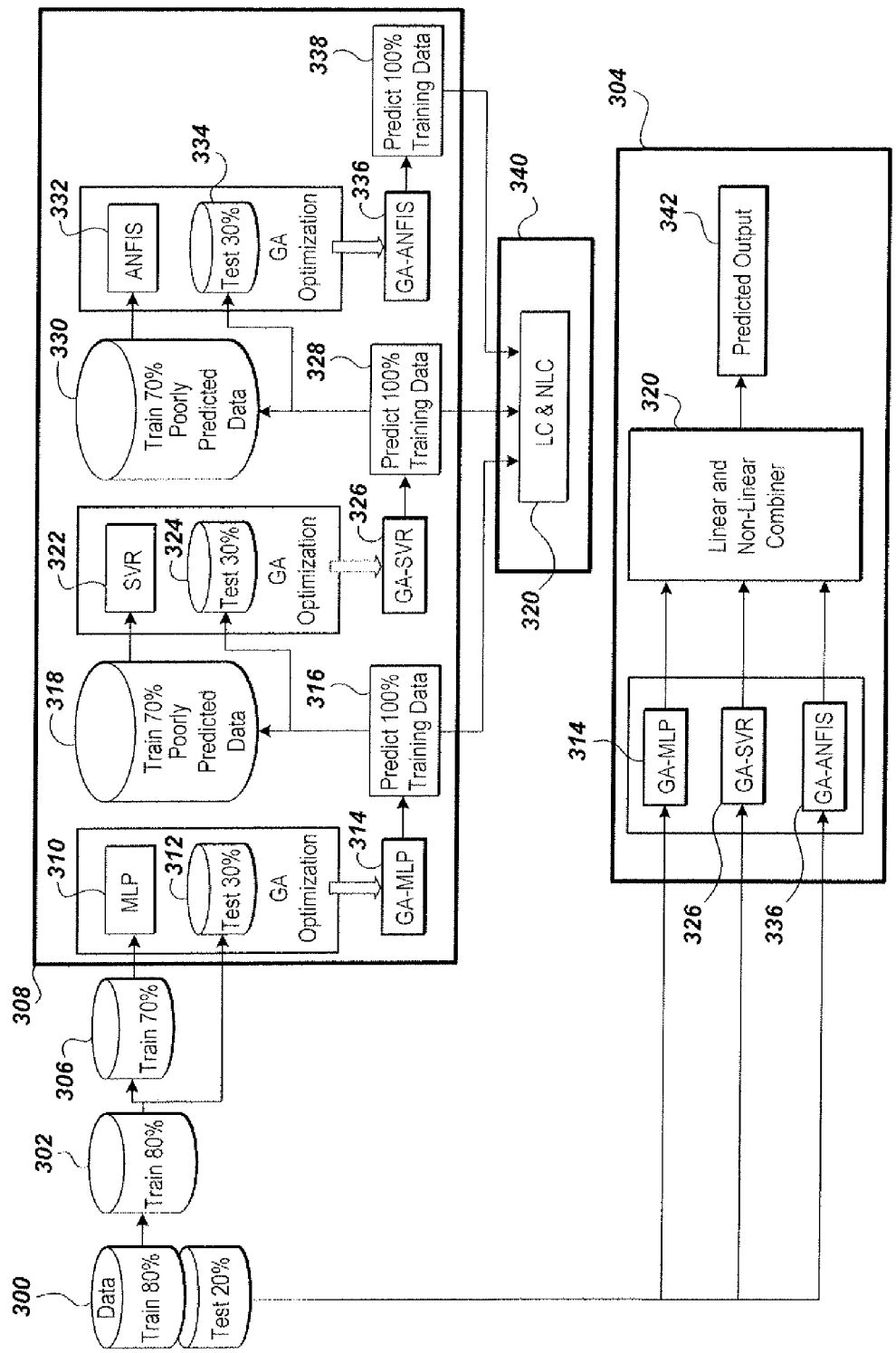
FIG. 51 is a flow chart showing method steps of model building for a heterogeneous ensemble of hybrid computational intelligence models of the method of predicting gas composition.

FIG. 51 illustrates a more detailed description of the process steps for model building for the heterogeneous ensemble of hybrids CI models. The initial data is input at step 300, where it is separated into training data and testing data. In this example, 80% of the data is used for training data (step 302) and 20% is transferred into the testing phase 304. At step 306, the training data is further divided before passing into the first step of the training phase 308. 70% of the training data is passed to the first CI technique 310, which is MLP in this example, and the remaining 30% of the training data 312 is then combined with the output of MLP 310 for genetic algorithm optimization. The optimized result 314 is labeled as GA-MLP in FIG. 51, and is used for 100% prediction of training data at step 316.

The 70% of poorly predicted training data 318 from step 316 is then passed to further genetic algorithm optimization. The remainder is transferred to combined linear combiner (LC) and non-linear combiner (NLC) 320. The linear combiner determines the weight of the weighted average method and the non-linear combiner trains the non-linear combiners NN, SVR, Fuzzy Inference System Subcluster (FIS-Subclust), and FIS-FCM. This process constitutes the second step of the training phase 340.

The 70% of poorly predicted training data 318 is input into the second CI technique 322, which is SVR in this example, and the remaining 30% of the training data 324 is then combined with the output of SVR 322 for genetic algorithm optimization. The optimized result 326 is labeled as GA-SVR in FIG. 51, and is used for 100% prediction of training data at step 328.

Once again, the 70% of poorly predicted training data 330 from step 328 is then passed to further genetic algorithm optimization. The remainder is transferred to combined linear combiner and non-linear combiner 320. The 70% of poorly predicted training data 330 is input into the third CI technique 332, which is ANFIS in this example, and the remaining 30% of the training data 334 is then combined with the output of ANFIS. 332 for genetic algorithm optimization. The optimized result 336 is labeled as GA-ANFIS in FIG. 51, and is used for 100% prediction of training data at step 338, and is then passed to the combined linear combiner and non-linear combiner 320. In the testing phase 304, the tested data passed through GA-MLP 314, GA-SVR 326 and GA-ANFIS. 336, and then fed through linear and non-linear combiner 220, yields the predicted output data 342.

Figure 8:
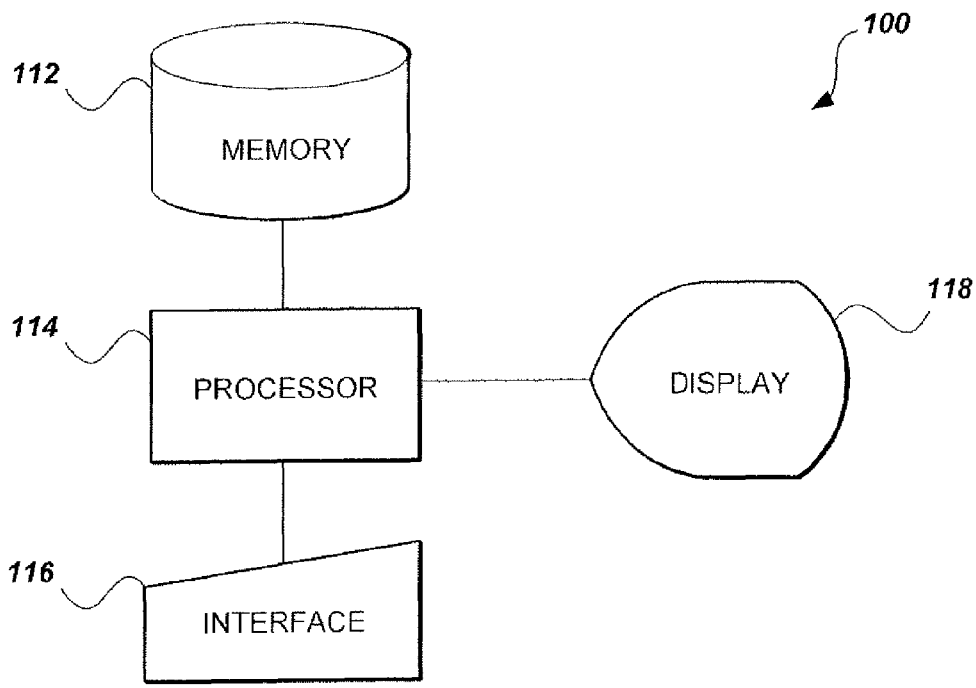
FIG. 8 is block diagram illustrating a basic system for implementing a method of predicting gas composition according to the present invention.

It should be understood that the calculations may be performed by any suitable computer system, such as that diagrammatically shown in FIG. 8. Data is fed into system 100 by any suitable type of user interface 116, and may be stored in memory 112, which may be any suitable type of computer readable and programmable memory. Calculations are performed by processor 114, which may be any suitable type of computer processor. The system 100 may also include a display for the user, which may be any suitable type of computer display 118.

The processor 114 may be associated with, or incorporated into, any suitable type of computing device, for example, a personal computer or a programmable logic controller. The processor 114, the memory 112, the display 118 and any associated computer readable recording media are in communication with one another by any suitable type of data bus, as is well known in the art.

Examples of computer-readable recording media include a magnetic recording apparatus, an optical disk, a magneto-optical disk, and/or a semiconductor memory (for example, RAM, ROM, etc.). Examples of magnetic recording apparatus that may be used in addition to memory 112, or in place of memory 112, include a hard disk device (HDD), a flexible disk (ED), and a magnetic tape (MT). Examples of the optical disk include a DVD (Digital Versatile Disc), a DVD-RAM, a CD-ROM (Compact Disc-Read Only Memory), and a CD-R (Recordable)/RW.

In order to evaluate performance of embodiments of the present method, the correlation coefficient (CC) and the root mean-squared error (RMSE) are used, along with comparisons of training time with predicted time. The embodiments of the present method are utilized for the prediction of mole fractions of gas compositions. Thus, the predicted values should not contain negative values. In the following performance evaluation, the frequency of negative values predicted by each HCI and EHCI model was counted and considered as a performance measure.

Figure 9A:
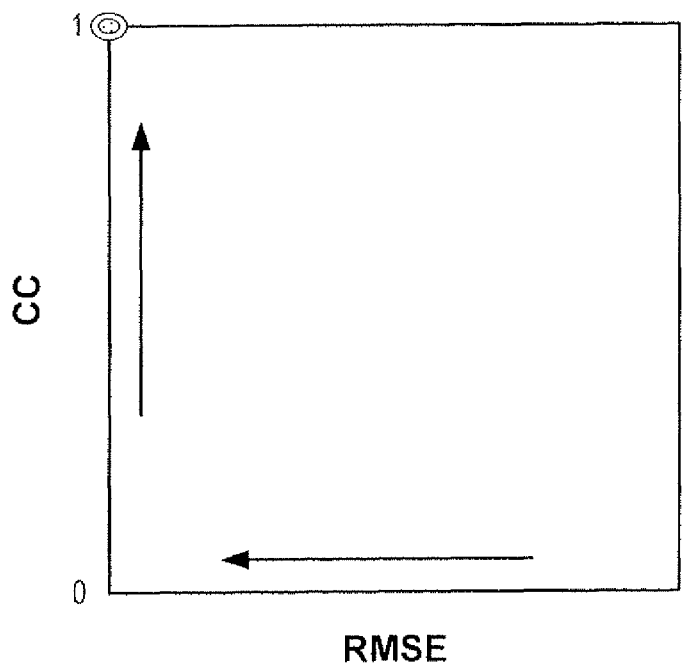
FIG. 9A is a graph illustrating optimal prediction in a comparison of CC against RMSE.
Figure 9B:
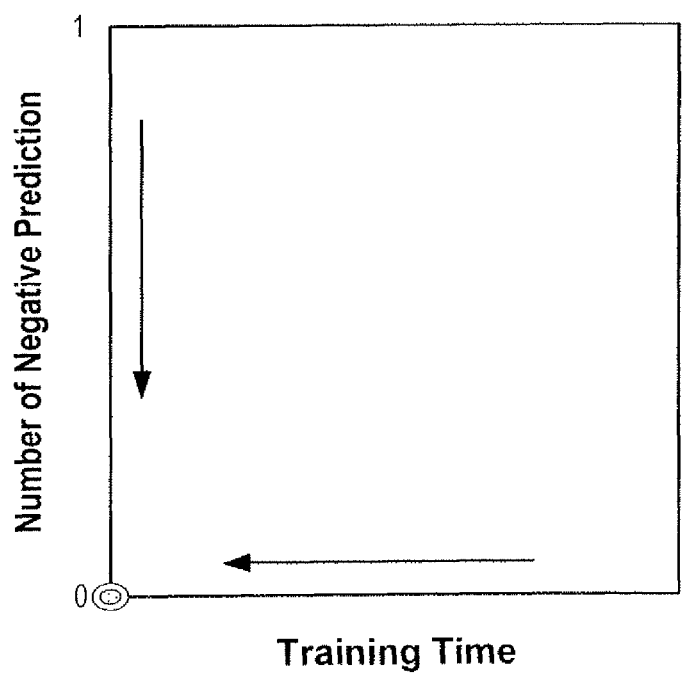
FIG. 9B is a graph illustrating optimal prediction in a comparison of the number of negative predictions against training time.

Two metrics have been used to represent the results in order to easily compare the outcomes of the models. The first metric consists of a CC vs. RMSE comparison, and the second metric is the number of negative predictions vs. training time. In the first metric, the upper left-most point indicates the best performance, as illustrated in FIG. 9A. The upper left-most point has zero RMSE errors at the highest possible CC value of one. The second metric is illustrated in FIG. 9B, where the lower left corner represents the highest performance, having the lowest training time with no negative predicted values.

In the following analysis, greater importance has been given to an error measure of a model that represents the RMSE values, as long as the model has an accepted CC value. In statistics, a CC value greater than 0.75 represents a strong correlation between the predicted output and the original values. Lesser importance has been given to training time, so long as a lower RMSE value exists, since once the model is trained, prediction requires a relatively insignificant amount of time.

The individual CI models used are MLP, SVR, and ANFIS. Thus, the hybrid CI models are genetic algorithms combined with each. In other words, the three hybrid CI models are GA+MLP, GA+SVR, and GA+ANFIS. For the present ensembles of hybrid CI models, the three homogenous EHCI models are an ensemble of three GA+MLP models; an ensemble of three GA+SVR models; and an ensemble of three GA+ANFIS models. For the single heterogeneous EHCI model, an ensemble of GA+MLP, GA+SVR and GA+ANFIS models is used.

Table 2 below shows the training data percentage that is randomly selected from the training set to train each model. The rest of the training data is shown in Tables 3 to 5, which show the optimized parameters for the CI models obtained by GA and the corresponding GA parameters.

TABLE 2

| | Training Data Percent (X %) from Training Dataset | | | | |
|---|---|---|---|---|---|
| Component | GA + CI | EN_of_NN + SVR + ANFIS | EN_of_MLP | EN_of_SVR | EN_of_ANFIS |
| $N_2$ | 80 | 70 | 70 | 70 | 70 |
| $CO_2$ | 90 | 70 | 70 | 70 | 70 |
| $H_2S$ | 80 | 80 | 80 | 80 | 80 |
| C1 | 70 | 80 | 80 | 80 | 80 |

TABLE 2-continued

Training Data Percent (X %) from Training Dataset

| Component | GA + CI | EN_of_NN + SVR + ANFIS | EN_of_MLP | EN_of_SVR | EN_of_ANFIS |
|---|---|---|---|---|---|
| C2 | 80 | 80 | 80 | 80 | 80 |
| C3 | 90 | 60 | 60 | 60 | 60 |

TABLE 3

Optimized Parameters for ANFIS

| Parameters Component | GA + ANFIS radius | # of Rules Generated | pop | gen | crfn |
|---|---|---|---|---|---|
| $N_2$ | 0.2998 | 65 | 10 | 5 | 0.65 |
| $CO_2$ | 0.6120 | 13 | 50 | 20 | 0.65 |
| $H_2S$ | 0.7959 | 9 | 50 | 20 | 0.65 |
| C1 | 0.6062 | 33 | 50 | 10 | 0.65 |
| C2 | 0.6141 | 32 | 50 | 20 | 0.5 |
| C3 | 0.5533 | 27 | 10 | 5 | 0.9 |

TABLE 4

Optimized Parameters for MLP

| Parameters Component | GA + MLP Hidden Nodes | HL Act Fn | OL Act Fn | Tr Alg | Epoche | Lr Rate | Error Goal | pop | gen | crfn |
|---|---|---|---|---|---|---|---|---|---|---|
| $N_2$ | 56 | logsig | tansig | trainlm | 10 | 0.001 | 0.00001 | 10 | 5 | 0.65 |
| $CO_2$ | 21 | tansig | tansig | trainlm | 9 | 0.001 | 0.00001 | 50 | 20 | 0.65 |
| $H_2S$ | 17 | logsig | tansig | trainlm | 10 | 0.001 | 0.00001 | 50 | 20 | 0.65 |
| C1 | 5 | tansig | tansig | trainlm | 13 | 0.001 | 0.00001 | 50 | 10 | 0.65 |
| C2 | 26 | logsig | tansig | trainlm | 14 | 0.001 | 0.00001 | 50 | 20 | 0.65 |
| C3 | 8 | logsig | tansig | trainlm | 15 | 0.001 | 0.00001 | 10 | 5 | 0.9 |

TABLE 5

Optimized Parameters for SVR

| Parameters Component | GA + SVR C | $\lambda$ | $\epsilon$ | # of SV | Kernel | Kernel Op | pop | gen | crfn |
|---|---|---|---|---|---|---|---|---|---|
| $N_2$ | 0.9763 | 0.000666782 | 0.1754 | 17 | poly | 0.5 | 10 | 5 | 0.65 |
| $CO_2$ | 6.2202 | 0.000503941 | 0.0352 | 54 | poly | 0.5 | 50 | 20 | 0.65 |
| $H_2S$ | 0.8796 | 0.000435202 | 0.0001 | 77 | poly | 0.5 | 50 | 20 | 0.65 |
| C1 | 1.2912 | 0.000788126 | 0.2410 | 33 | poly | 0.5 | 50 | 10 | 0.65 |
| C2 | 0.4764 | 1.95766E−06 | 0.0541 | 51 | poly | 0.5 | 50 | 20 | 0.65 |
| C3 | 1.9763 | 0.000666782 | 0.1912 | 48 | poly | 0.5 | 10 | 5 | 0.9 |

The non-hydrocarbons and the hydrocarbons that occupy most of the volume out of twelve in a multi-stage separator have been predicted. The non-hydrocarbons nitrogen ($N_2$), carbon dioxide ($CO_2$), hydrogen sulfide ($H_2S$) and the mostly dense hydrocarbons methane ($CH_4$) (labeled C1), ethane ($C_2H_6$) (labeled C2) and propane ($C_3H_8$) (labeled C3) have been predicted. The performance of each model is shown in FIGS. 10A-39B. The CPCP is used as the benchmark model for comparison.

Figure 10A:
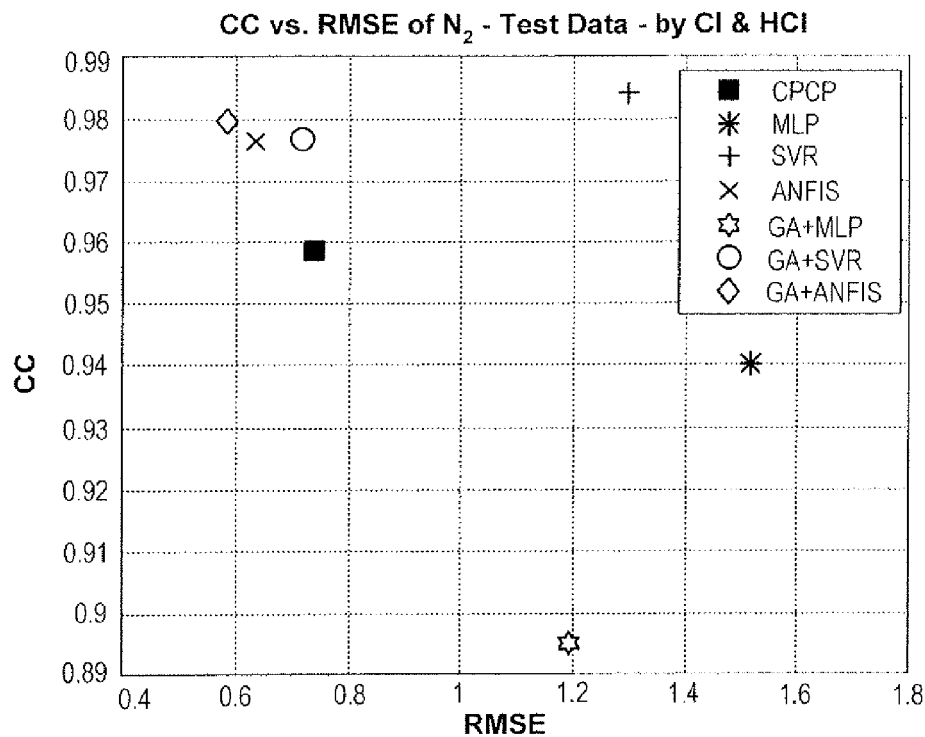
FIG. 10A is a plot of CC vs. RMSE for nitrogen prediction using the method of predicting gas composition for a variety of differing computational intelligence models.
Figure 10B:
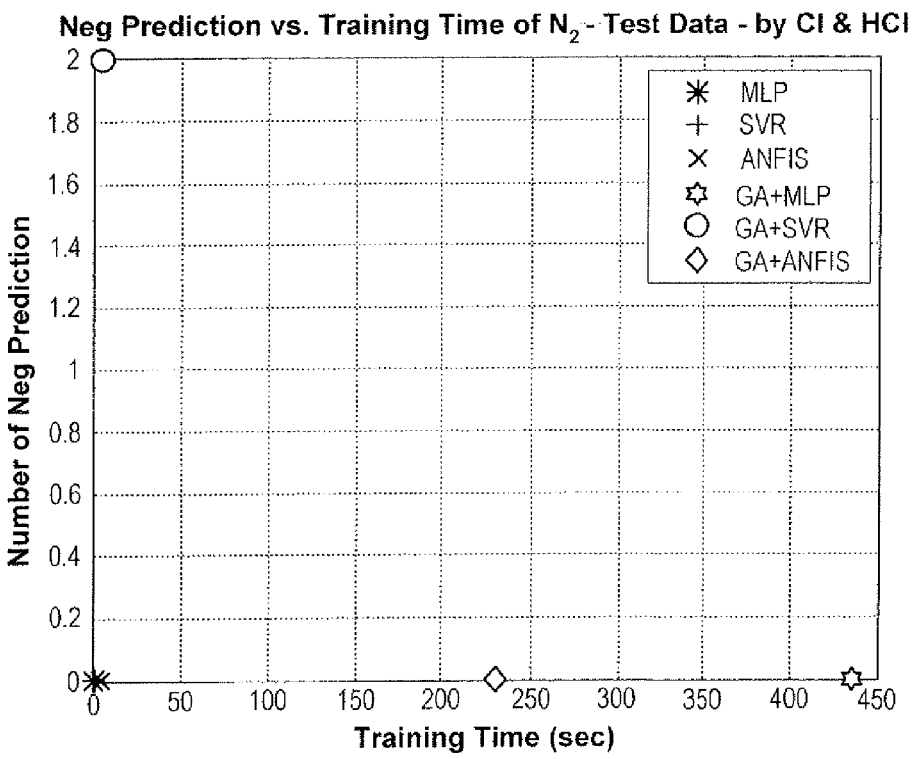
FIG. 10B is a plot of the number of negative predictions vs. training time for nitrogen prediction using the method of predicting gas composition for a variety of differing computational intelligence models.
Figure 10C:
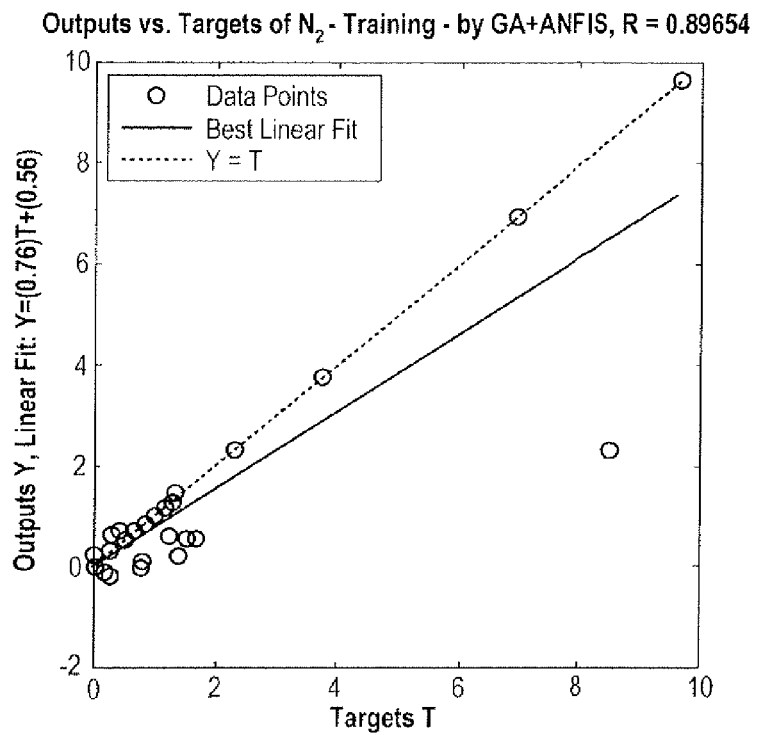
FIG. 10C is a graph of outputs vs. targets for nitrogen prediction using the method of predicting gas composition in the training phase.
Figure 10D:
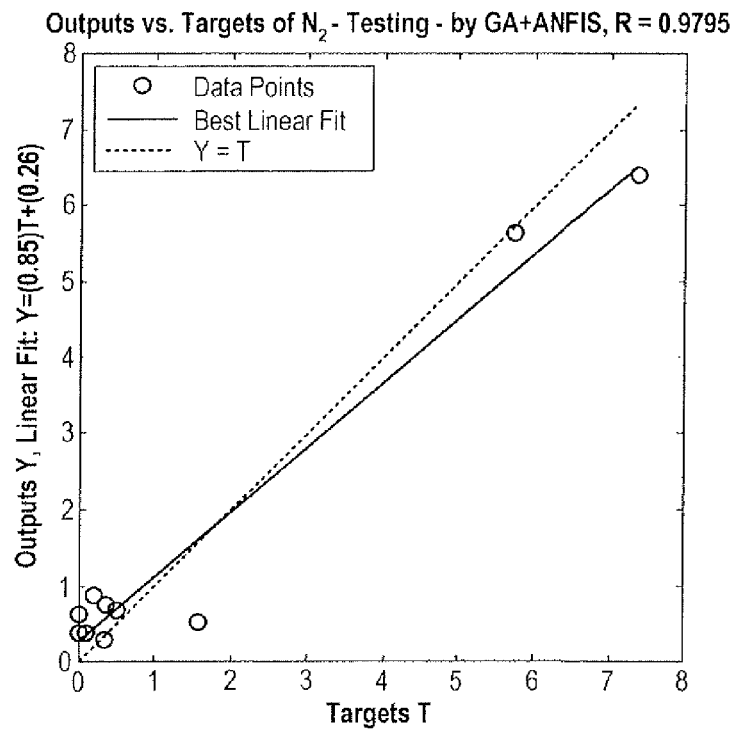
FIG. 10D is a graph of outputs vs. targets for nitrogen prediction using the method of predicting gas composition in the testing phase.

FIG. 10A shows that the performance of the HCI model GA+ANFIS outperforms other CI, HCI and CPCP models for $N_2$ prediction. It can be seen that the HCI models perform better than the corresponding CI models. FIG. 10B shows that GA+ANFIS took less time than GA+MLP and did not predict any negative values. The regression analysis of GA+ANFIS in FIGS. 10C and 10D on training and testing data shows that the prediction is strongly correlated with the original values.

Figure 11A:
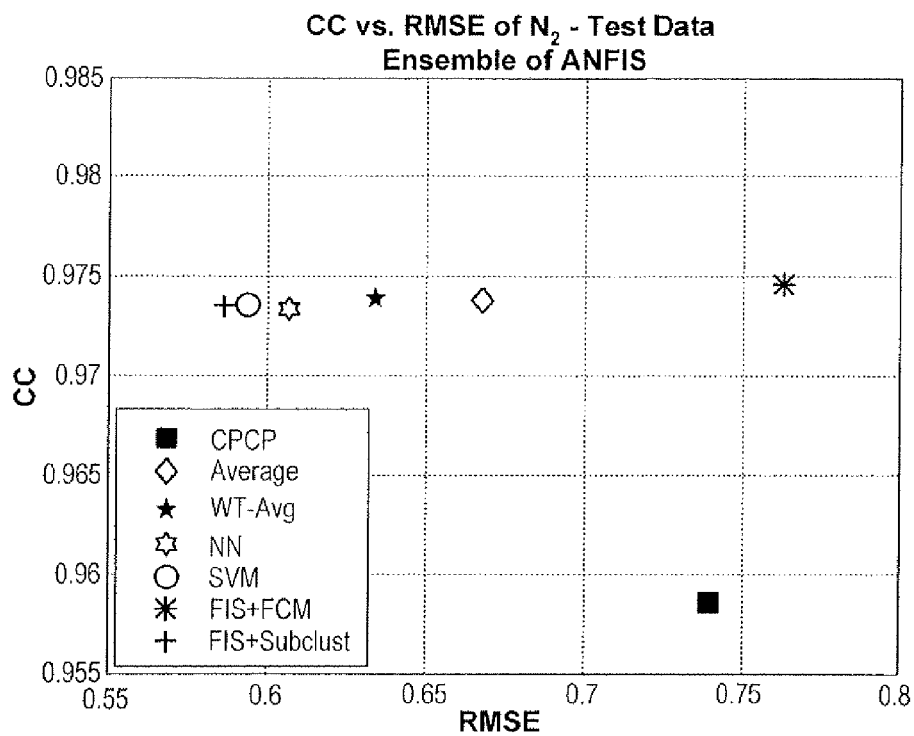
FIG. 11A is a plot of CC vs. RMSE for nitrogen prediction using the method of predicting gas composition for an ensemble of ANFIS models.
Figure 11B:
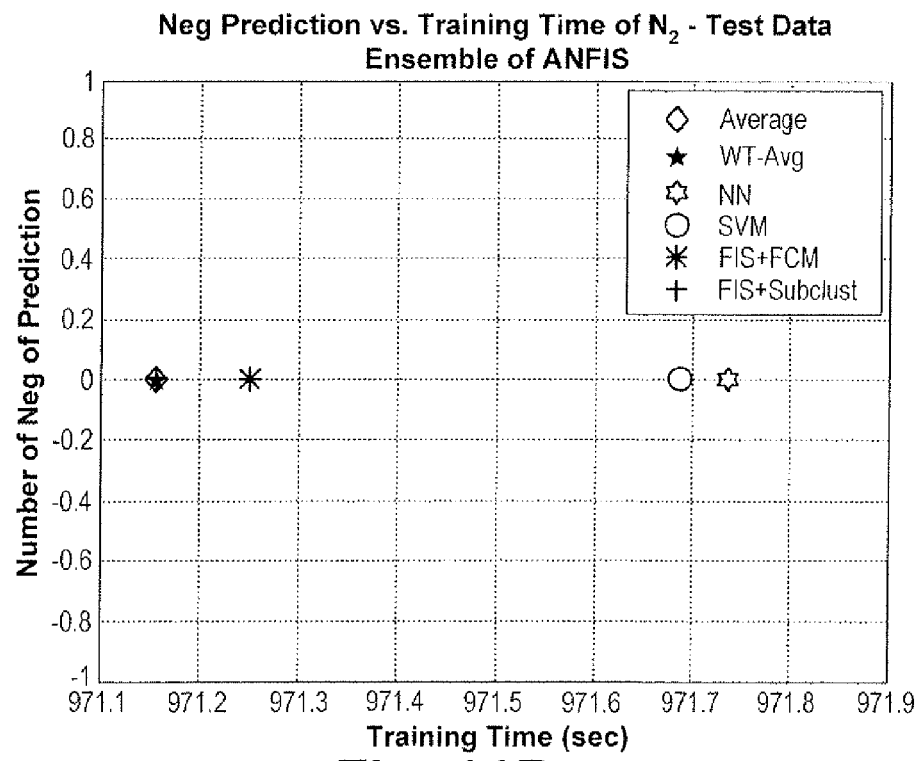
FIG. 11B is a plot of the number of negative predictions vs. training time for nitrogen prediction using the method of predicting gas composition for an ensemble of ANFIS models.
Figure 11C:
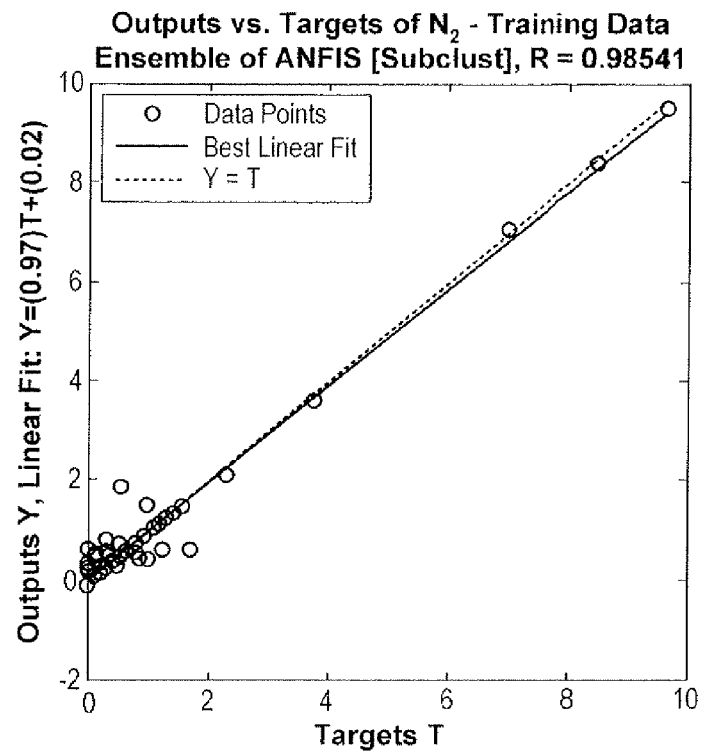
FIG. 11C is a graph of outputs vs. targets for nitrogen prediction using the method of predicting gas composition in the training phase for an ensemble of ANFIS models.
Figure 11D:
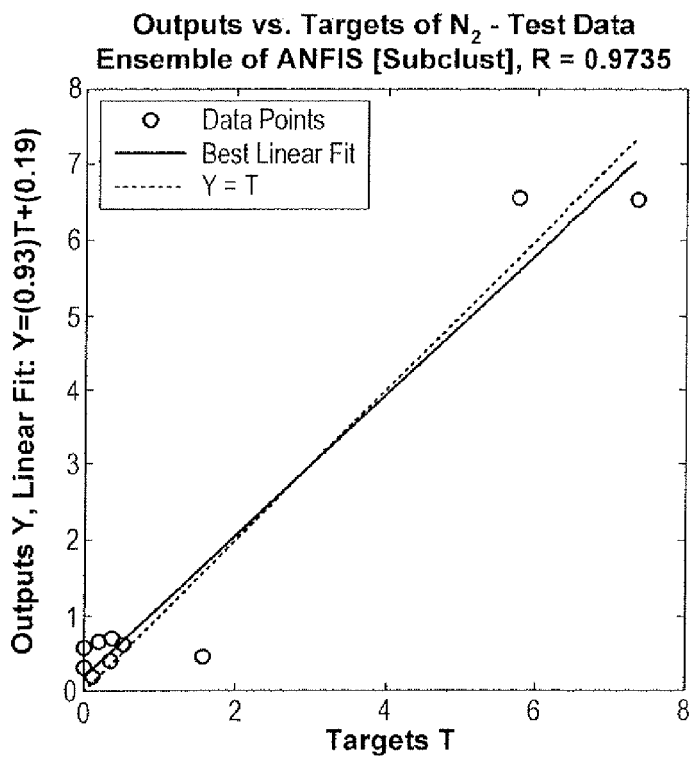
FIG. 11D is a graph of outputs vs. targets for nitrogen prediction using the method of predicting gas composition in the testing phase for an ensemble of ANFIS models.
Figure 12A:
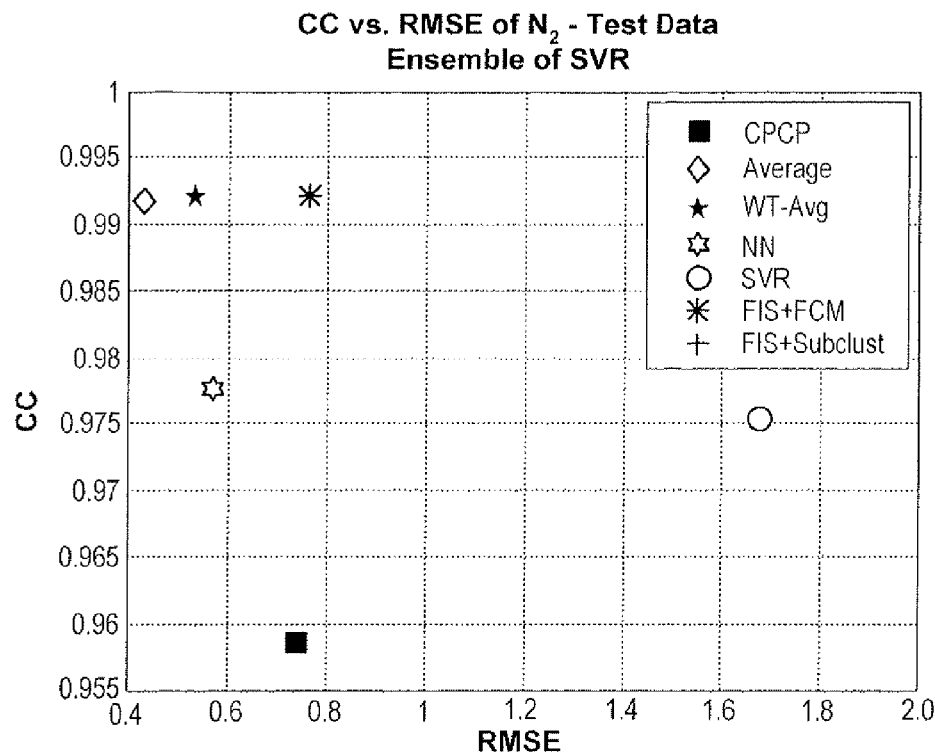
FIG. 12A is a plot of CC vs. RMSE for nitrogen prediction using the method of predicting gas composition for an ensemble of SVR models.
Figure 12B:
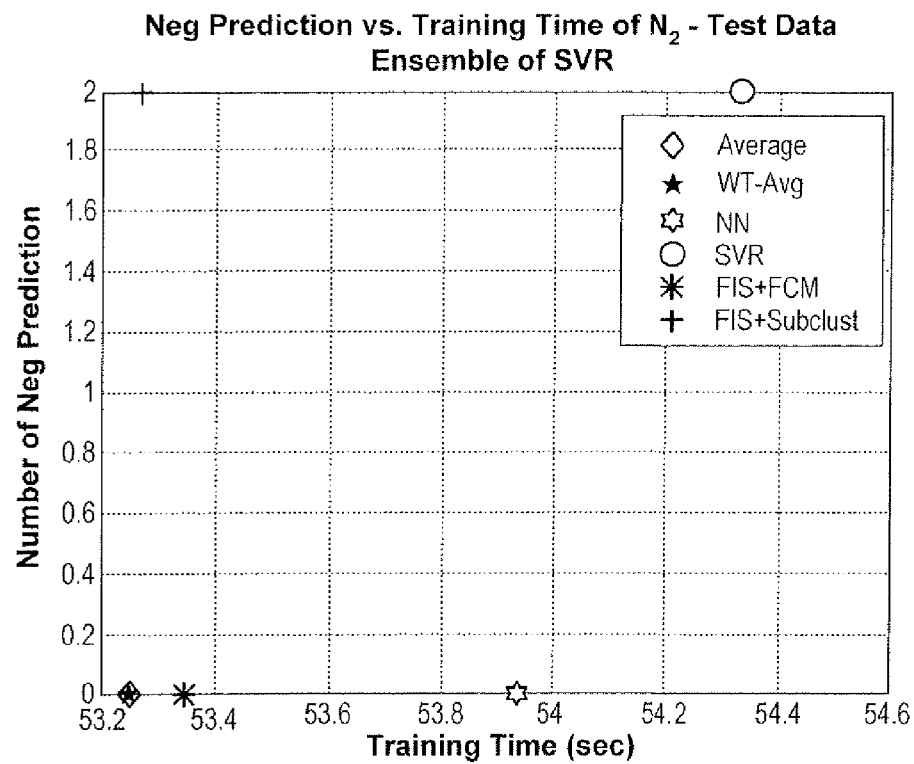
FIG. 12B is a plot of the number of negative predictions vs. training time for nitrogen prediction using the method of predicting gas composition for an ensemble of SVR models.
Figure 12C:
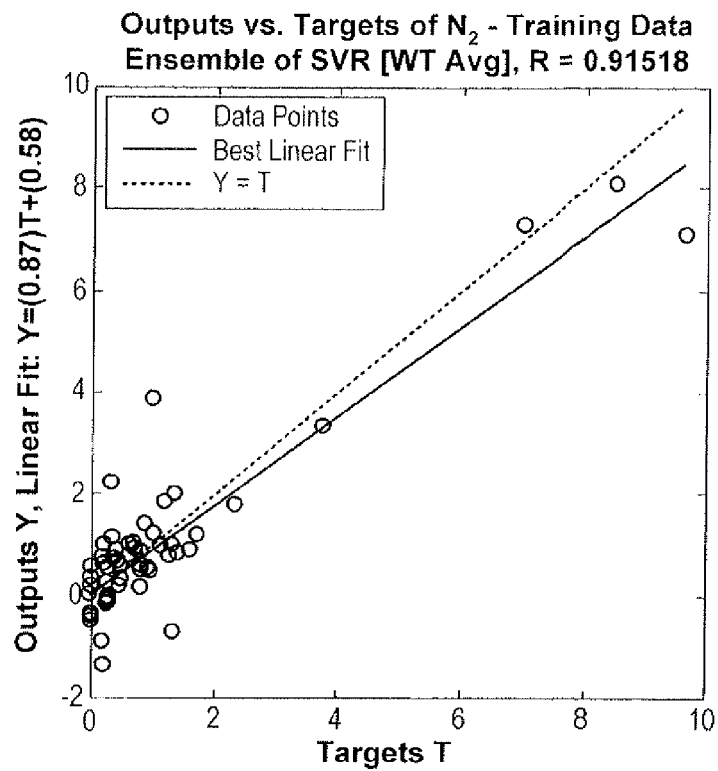
FIG. 12C is a graph of outputs vs. targets for nitrogen prediction using the method of predicting gas composition in the training phase for an ensemble of SVR models.
Figure 12D:
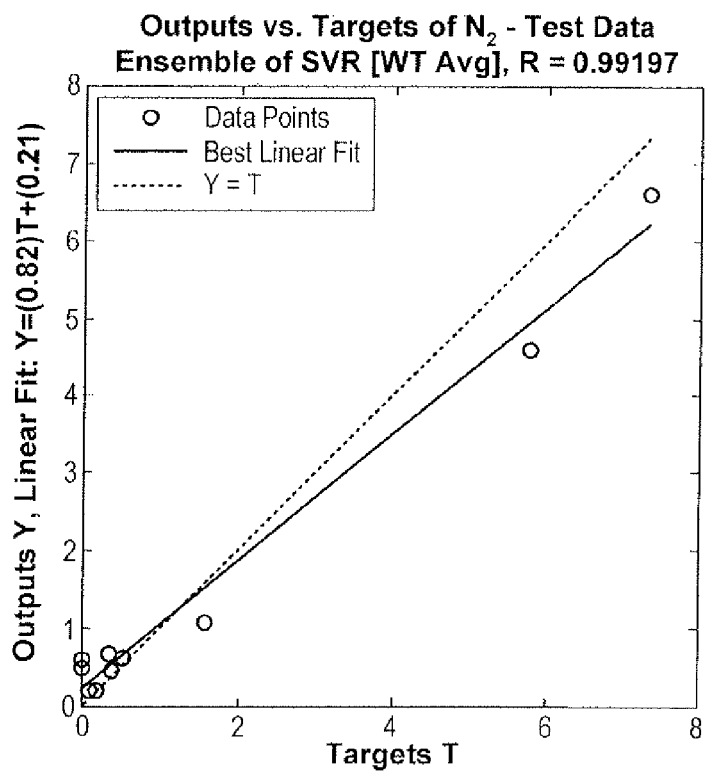
FIG. 12D is a graph of outputs vs. targets for nitrogen prediction using the method of predicting gas composition in the testing phase for an ensemble of SVR models.
Figure 13A:
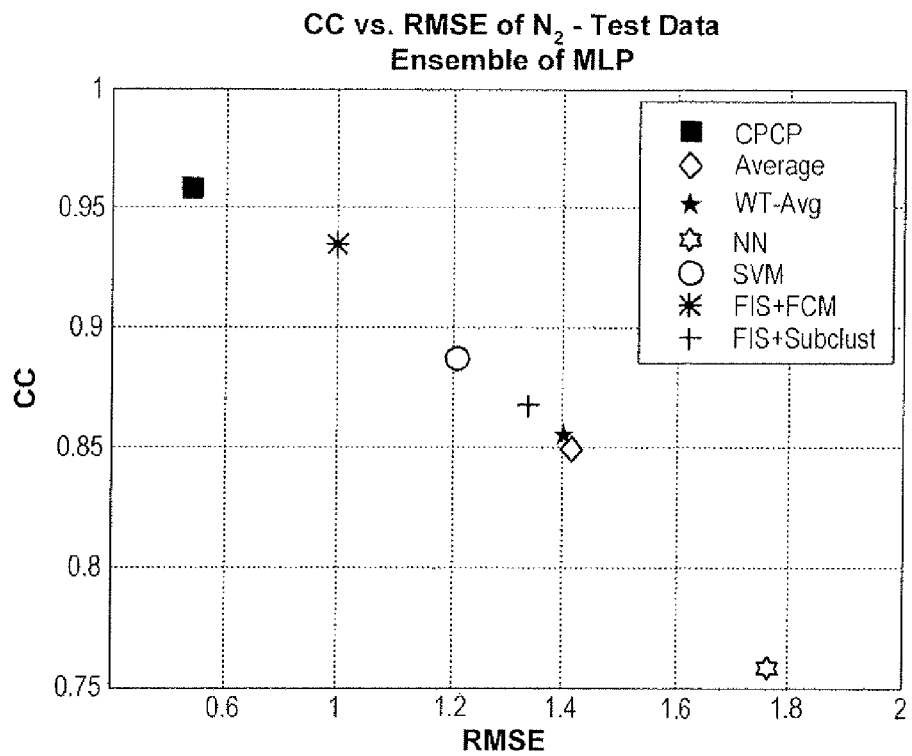
FIG. 13A is a plot of CC vs. RMSE for nitrogen prediction using the method of predicting gas composition for an ensemble of MLP models.
Figure 13B:
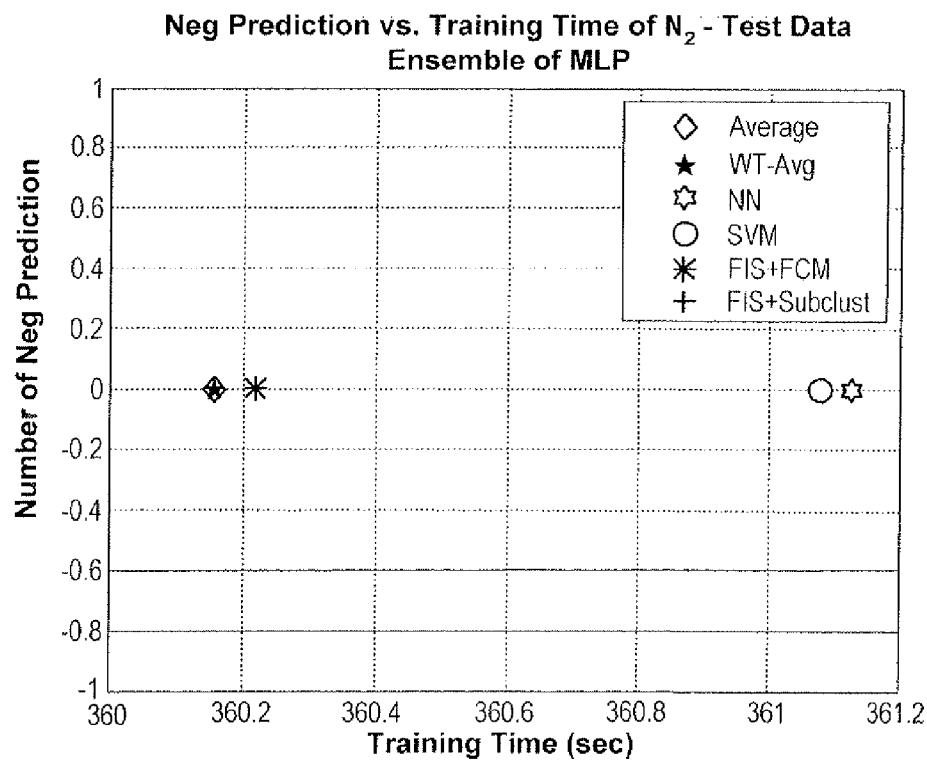
FIG. 13B is a plot of the number of negative predictions vs. training time for nitrogen prediction using the method of predicting gas composition for an ensemble of MLP models.
Figure 14A:
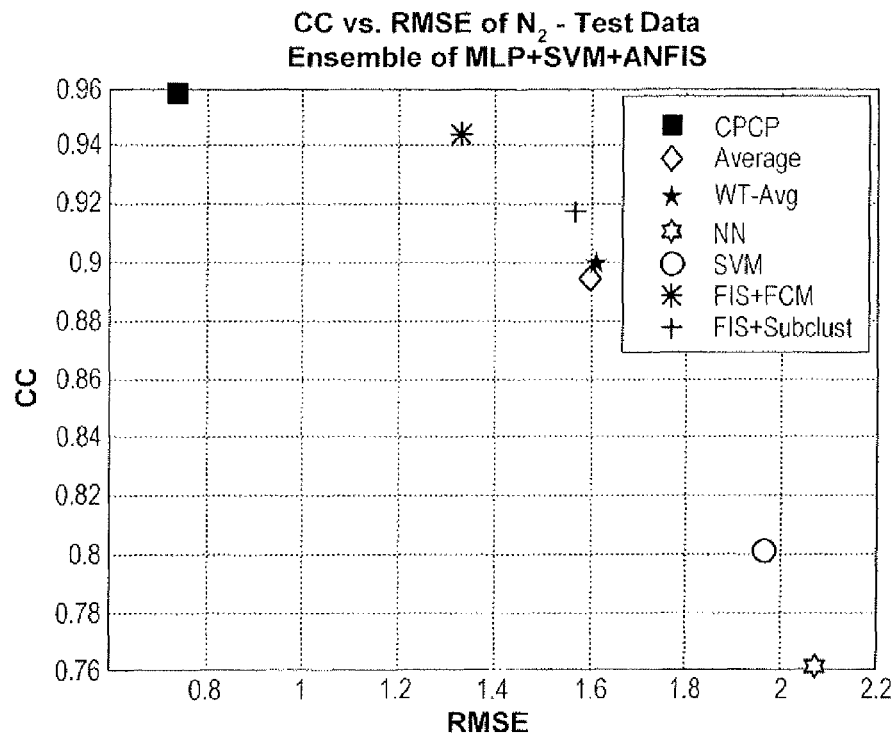
FIG. 14A is a graph of outputs vs. targets for nitrogen prediction using the method of predicting gas composition in the training phase for an ensemble of ANFIS, MLP and SVR models.
Figure 14B:
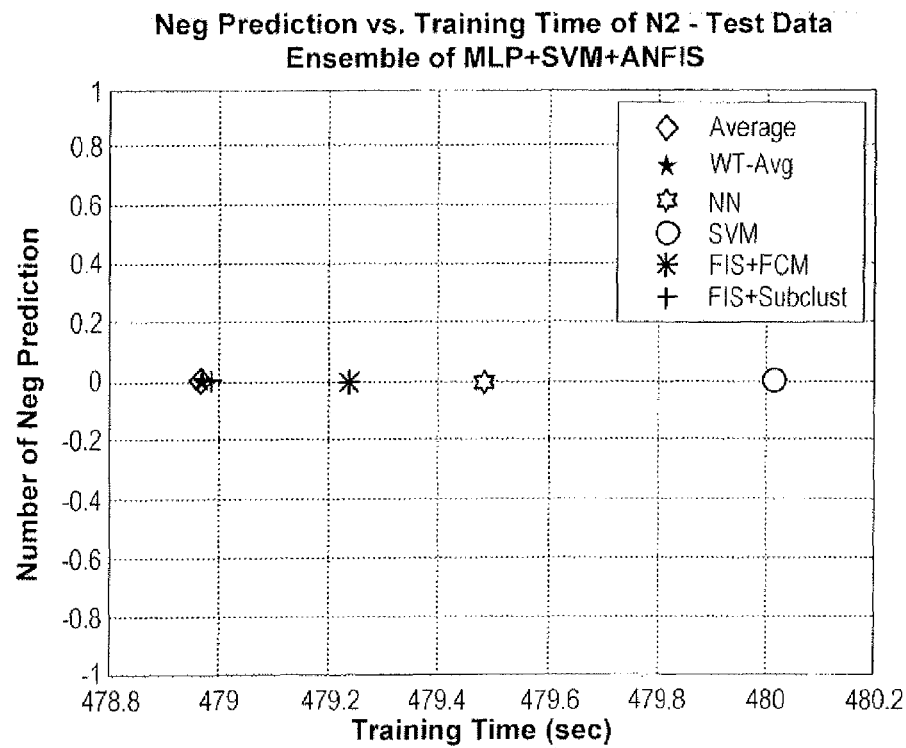
FIG. 14B is a graph of outputs vs. targets for nitrogen prediction using the method of predicting gas composition in the testing phase for an ensemble of ANFIS, MLP and SVR models.

FIG. 11A shows that the EHCI model of ANFIS combined with FIS-Subclust performed better than other combiners, as well as CPCP. The error RMSE value of the best model GA+ANFIS in FIG. 11A is near 0.6, whereas the EHCI model of ANFIS combined with FIS-Subclust is much lower than 0.6. Nevertheless, the HCI model of SVR with the average combining method, shown in FIG. 12A, shows that the RMSE value is near 0.4, which is much lower than in the previous models. FIGS. 13A, 13B, 14A and 14B show the other ECHI models' performance on predicting $N_2$ in separators gas compositions.

Figure 15A:
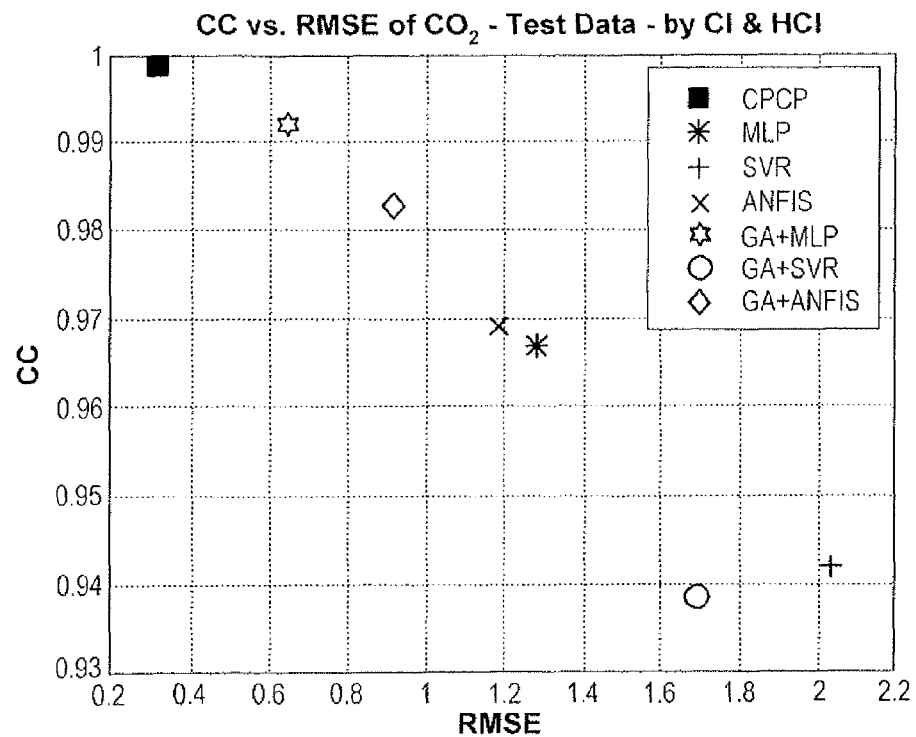
FIG. 15A is a plot of CC vs. RMSE for carbon dioxide prediction using the method of predicting gas composition for a variety of differing computational intelligence models.
Figure 15B:
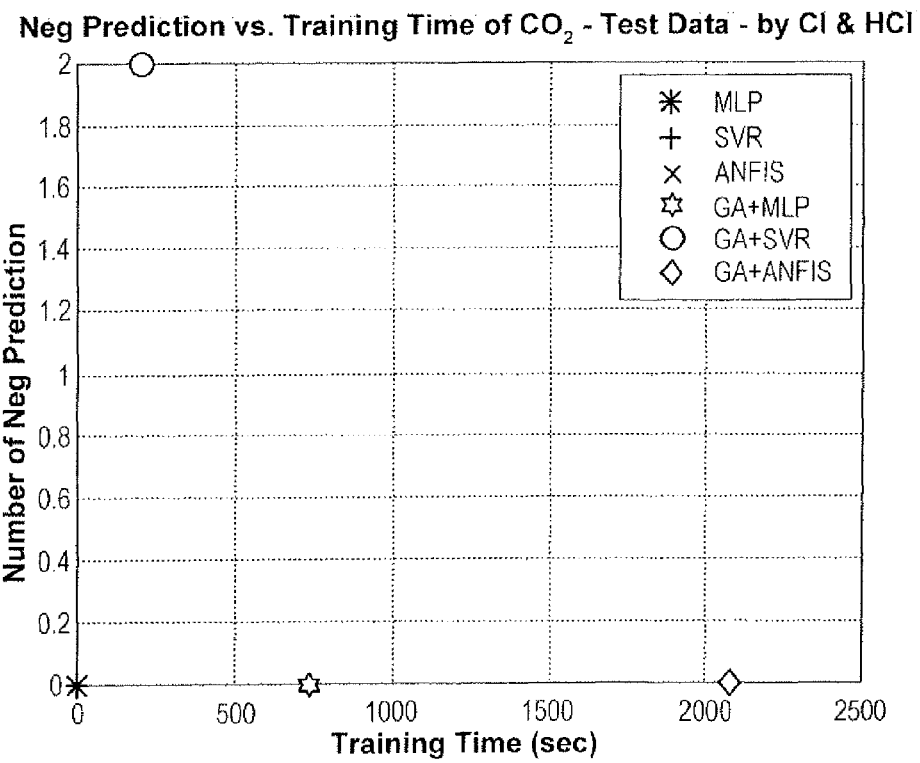
FIG. 15B is a plot of the number of negative predictions vs. training time for carbon dioxide prediction using the method of predicting gas composition for a variety of differing computational intelligence models.
Figure 15C:
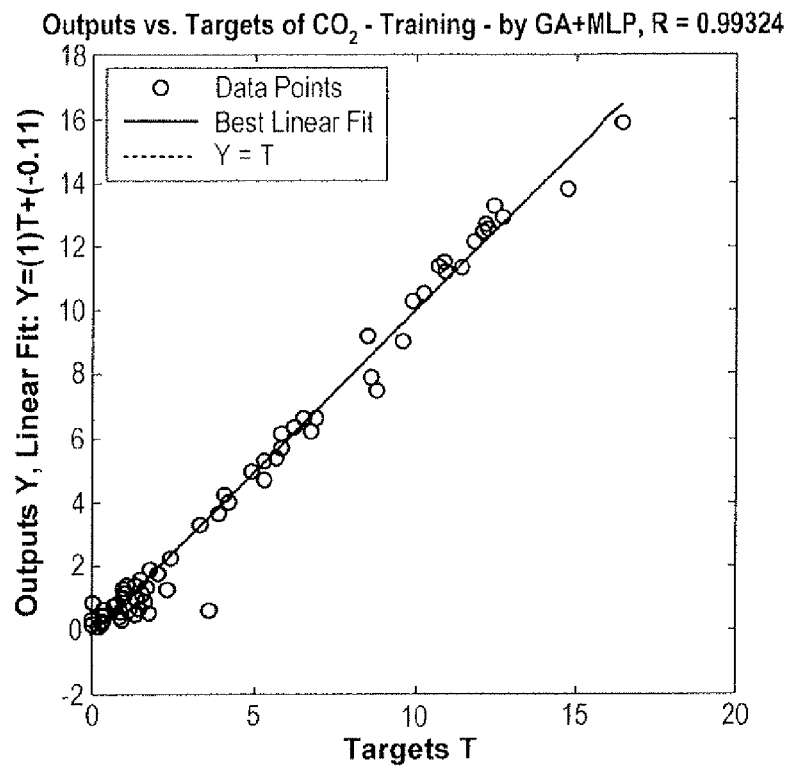
FIG. 15C is a graph of outputs vs. targets for carbon dioxide prediction using the method of predicting gas composition in the training phase.
Figure 15D:
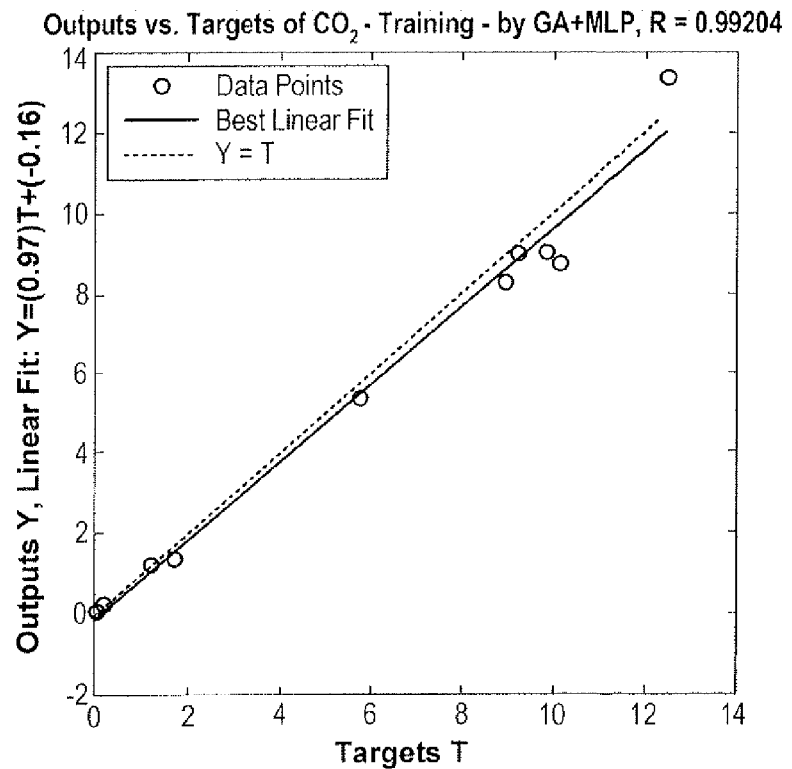
FIG. 15D is a graph of outputs vs. targets for carbon dioxide prediction using the method of predicting gas composition in the testing phase.
Figure 16A:
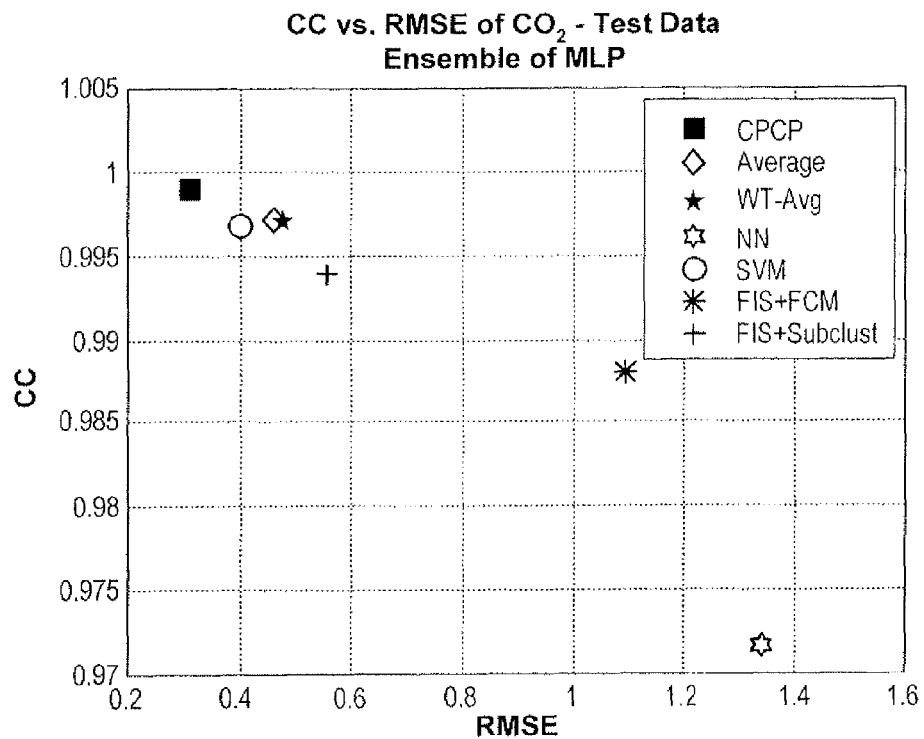
FIG. 16A is a plot of CC vs. RMSE for carbon dioxide prediction using the method of predicting gas composition for an ensemble of MLP models.
Figure 16B:
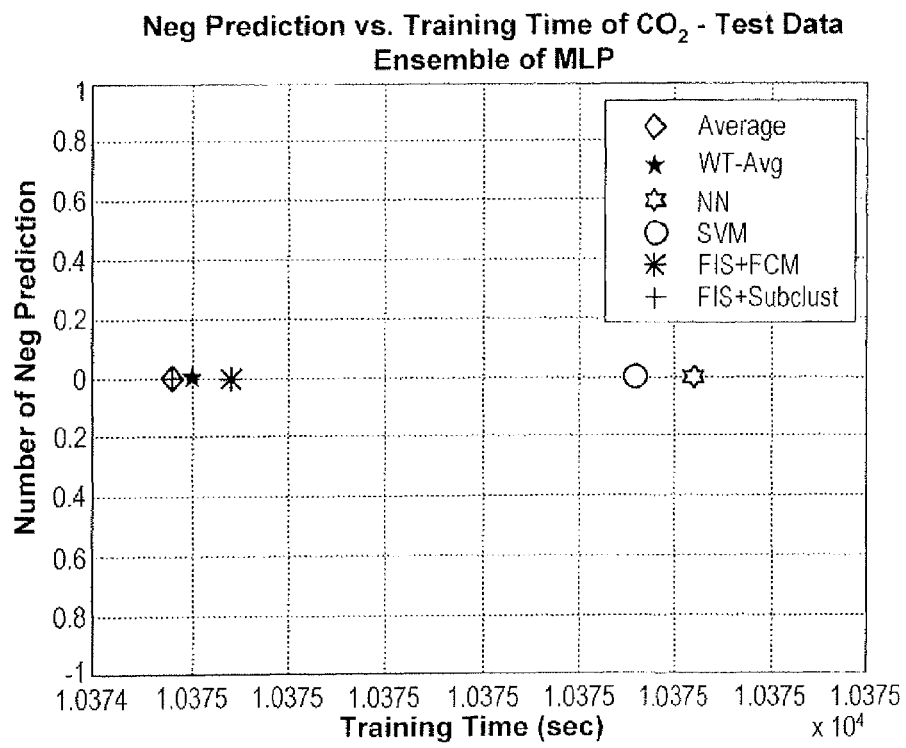
FIG. 16B is a plot of the number of negative predictions vs. training time for carbon dioxide prediction using the method of predicting gas composition for an ensemble of MLP models.
Figure 16C:
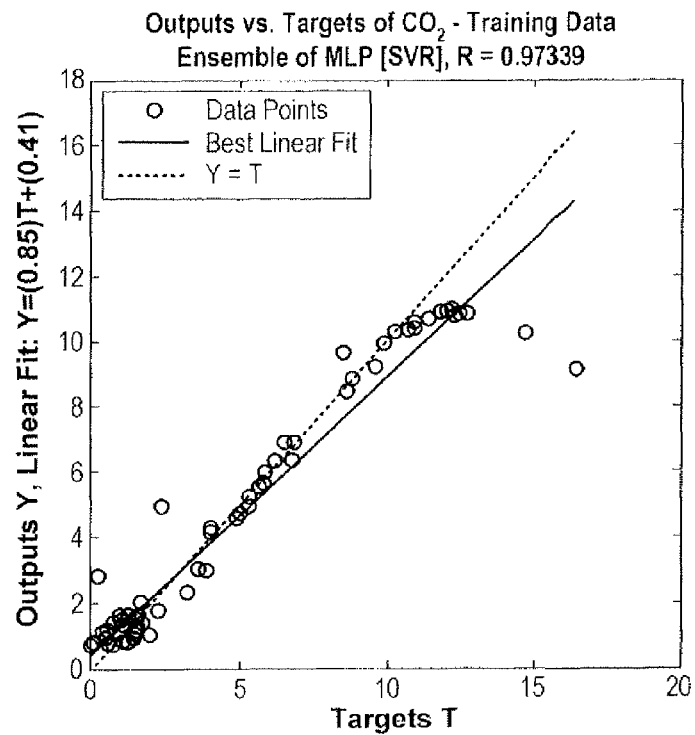
FIG. 16C is a graph of outputs vs. targets for carbon dioxide prediction using the method of predicting gas composition in the training phase for an ensemble of MLP models.
Figure 16D:
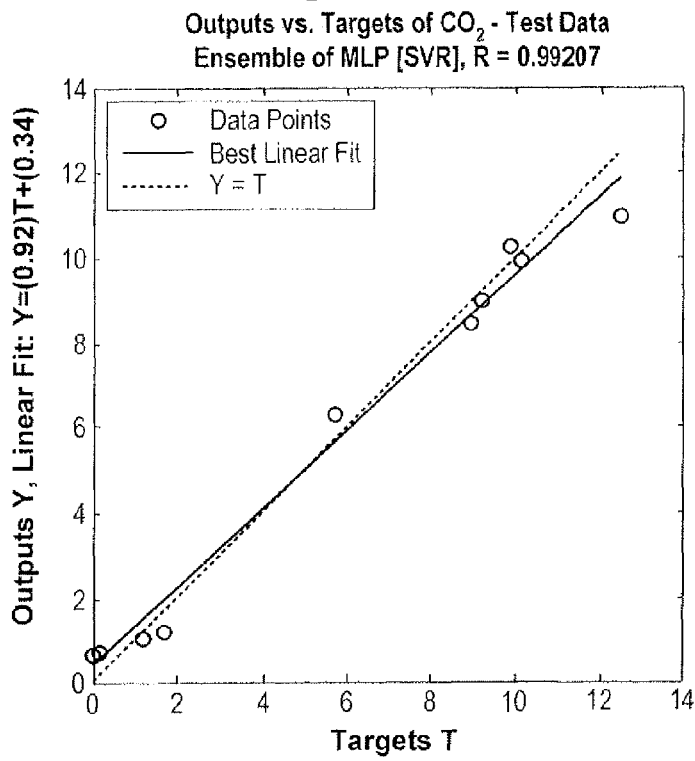
FIG. 16D is a graph of outputs vs. targets for carbon dioxide prediction using the method of predicting gas composition in the testing phase for an ensemble of MLP models.
Figure 17A:
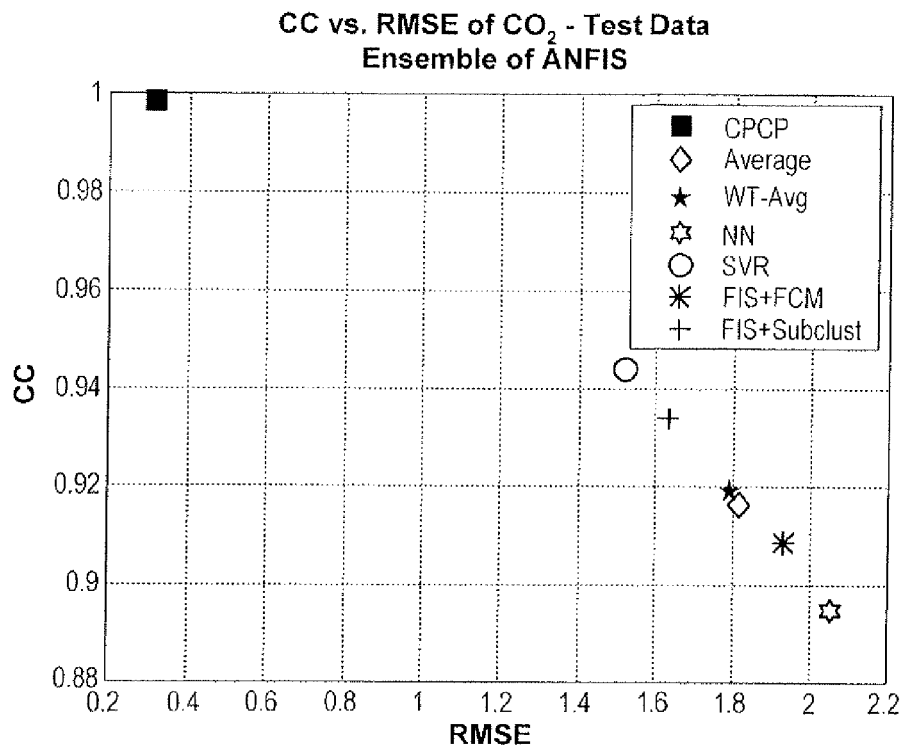
FIG. 17A is a plot of CC vs. RMSE for carbon dioxide prediction using the method of predicting gas composition for an ensemble of ANFIS models.
Figure 17B:
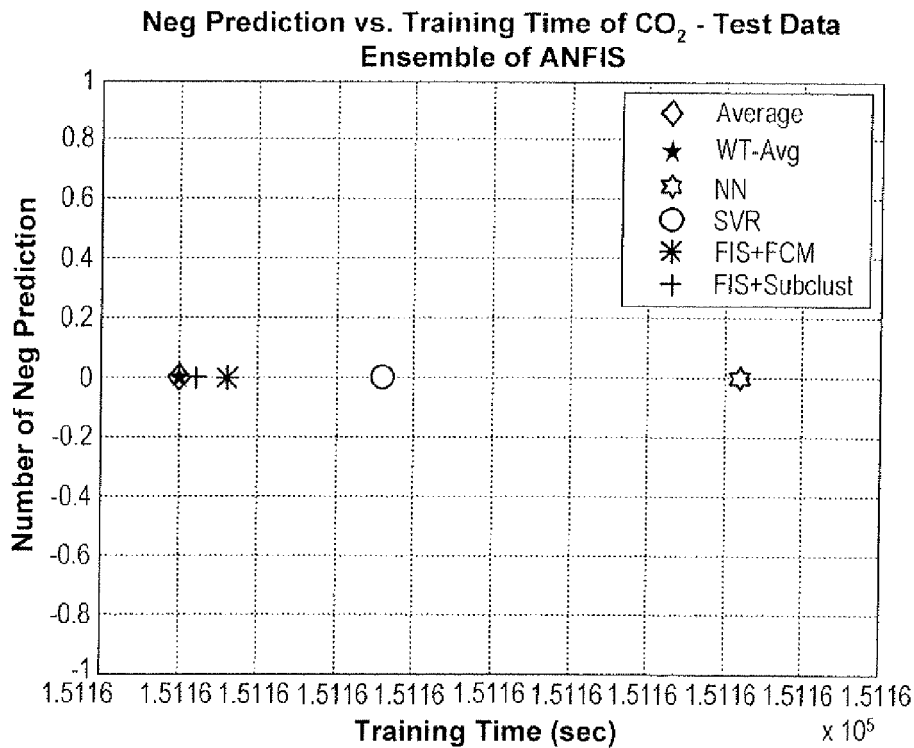
FIG. 17B is a plot of the number of negative predictions vs. training time for carbon dioxide prediction using the method of predicting gas composition for an ensemble of ANFIS models.
Figure 18A:
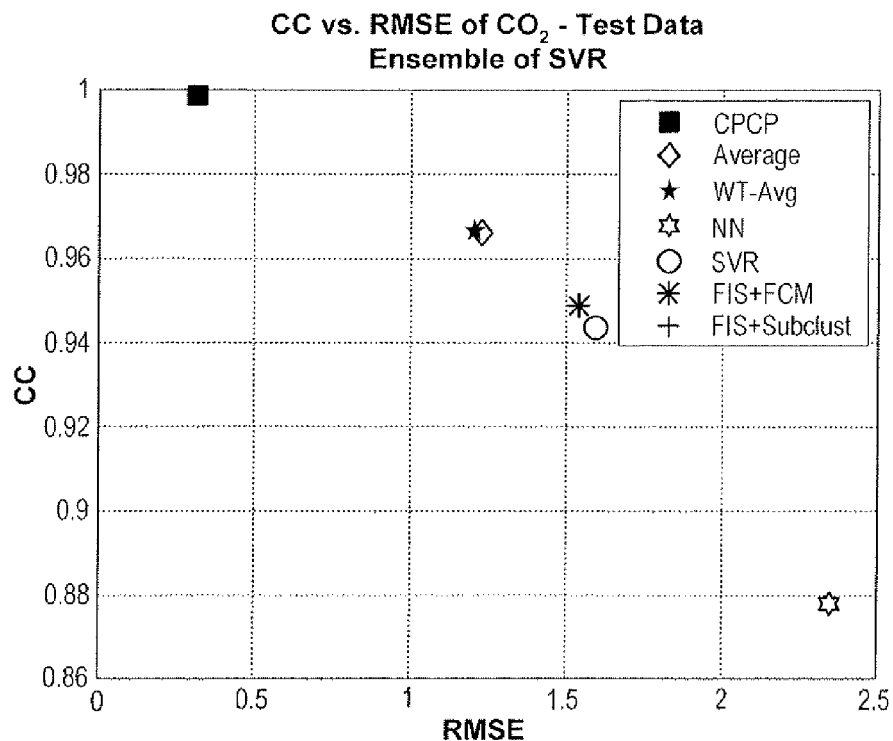
FIG. 18A is a plot of CC vs. RMSE for carbon dioxide prediction using the method of predicting gas composition for an ensemble of SVR models.
Figure 18B:
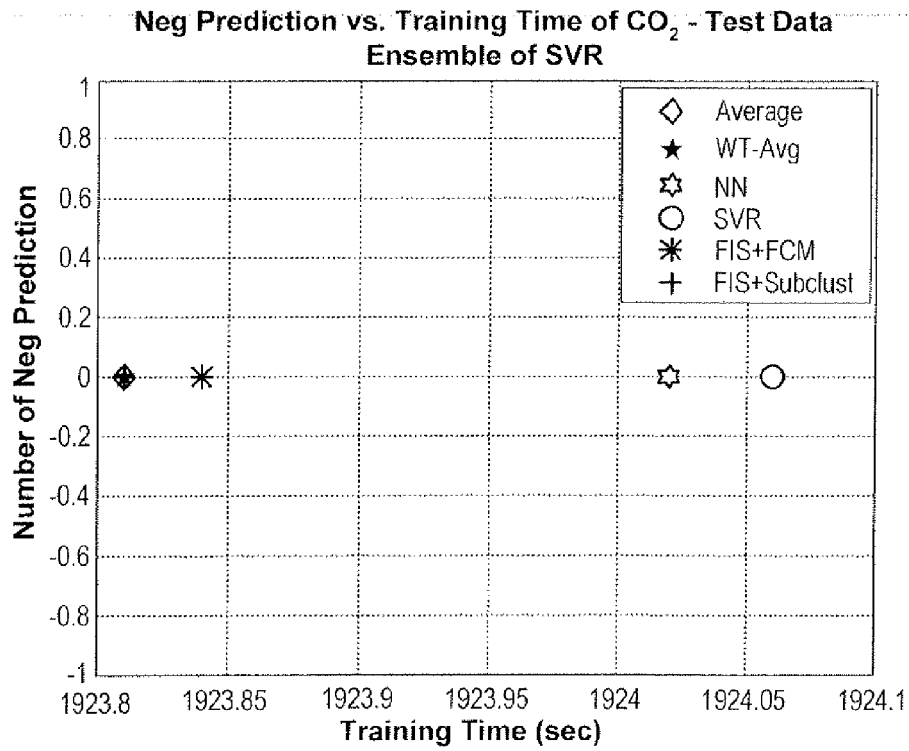
FIG. 18B is a plot of the number of negative predictions vs. training time for carbon dioxide prediction using the method of predicting gas composition for an ensemble of SVR models.
Figure 19A:
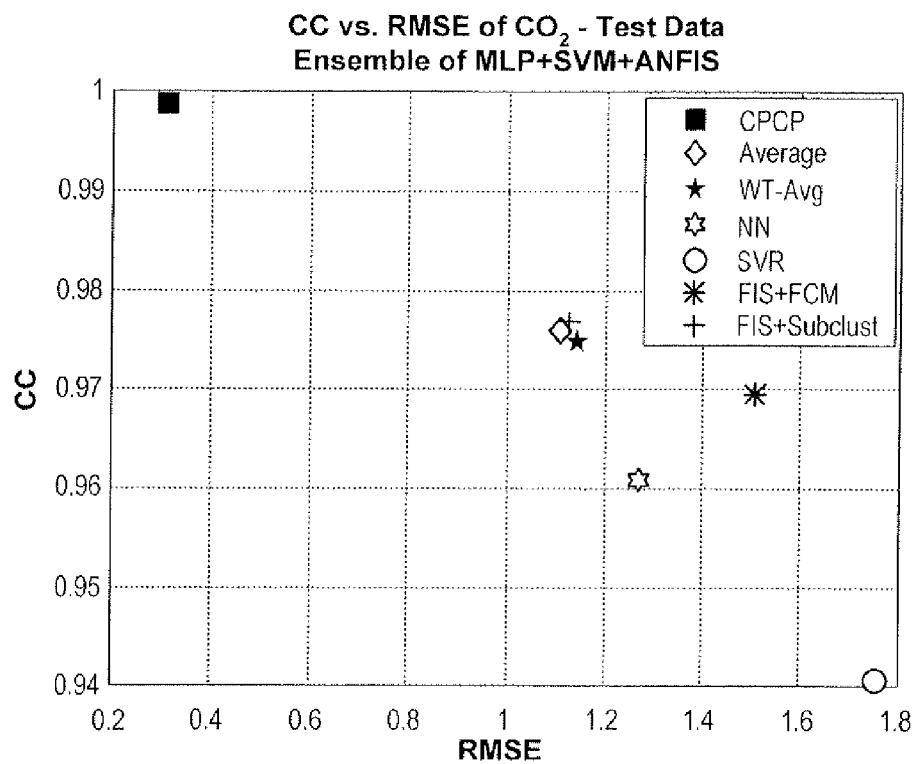
FIG. 19A is a plot of CC vs. RMSE for carbon dioxide prediction using the method of predicting gas composition in the training phase for an ensemble of ANFIS, MLP and SVR models.
Figure 19B:
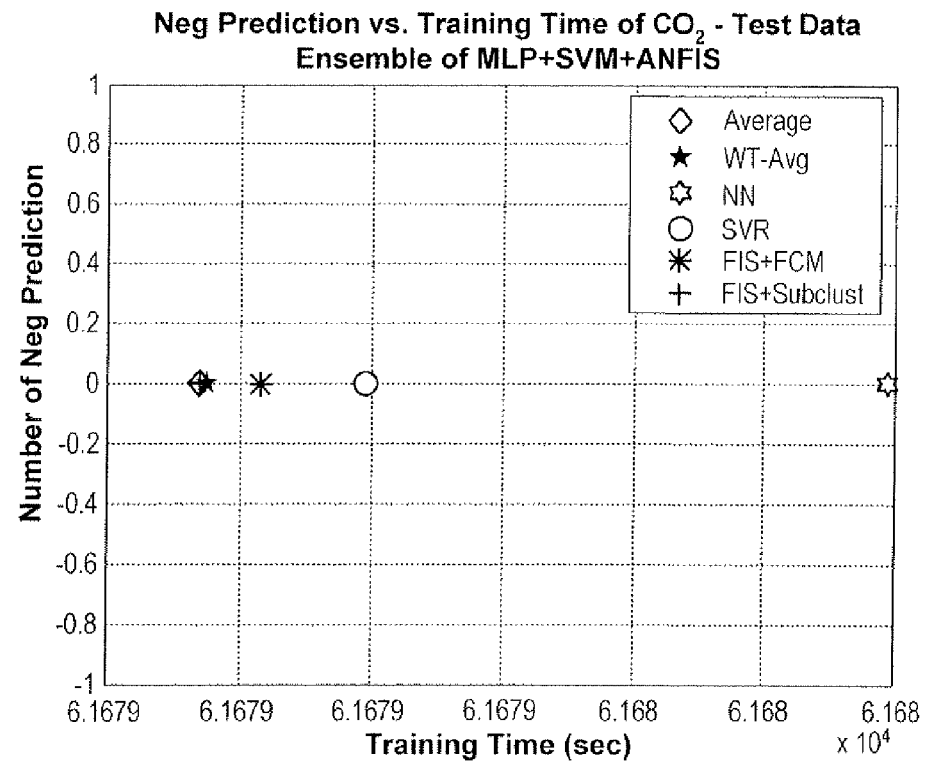
FIG. 19B is a plot of the number of negative predictions vs. training time for carbon dioxide prediction using the method of predicting gas composition in the testing phase for an ensemble of ANFIS, MLP and SVR models.

FIG. 15A shows that the performance of the HCI model GA+MLP outperforms other CI and HCI models for $CO_2$ prediction. It can be seen that the HCI models perform better than the corresponding CI models. FIG. 15B shows that GA+MLP took less time than GA+ANFIS and did not predict any negative values. The regression analysis of GA+MLP in FIGS. 15C and 15D on training and testing data shows that the prediction is strongly correlated with the original values. FIG. 16A shows that the EHCI model of MLP combined with SVR performed better than other combiner. The error RMSE value of the best model GA+MLP in FIG. 15A is above 0.6, whereas the EHCI model of MLP combined with SVR is 0.4. FIGS. 17A, 17B, 18A, 18B, 19A and 19B show the other ECHI models' performance on predicting $CO_2$ in separators gas compositions.

Figure 20A:
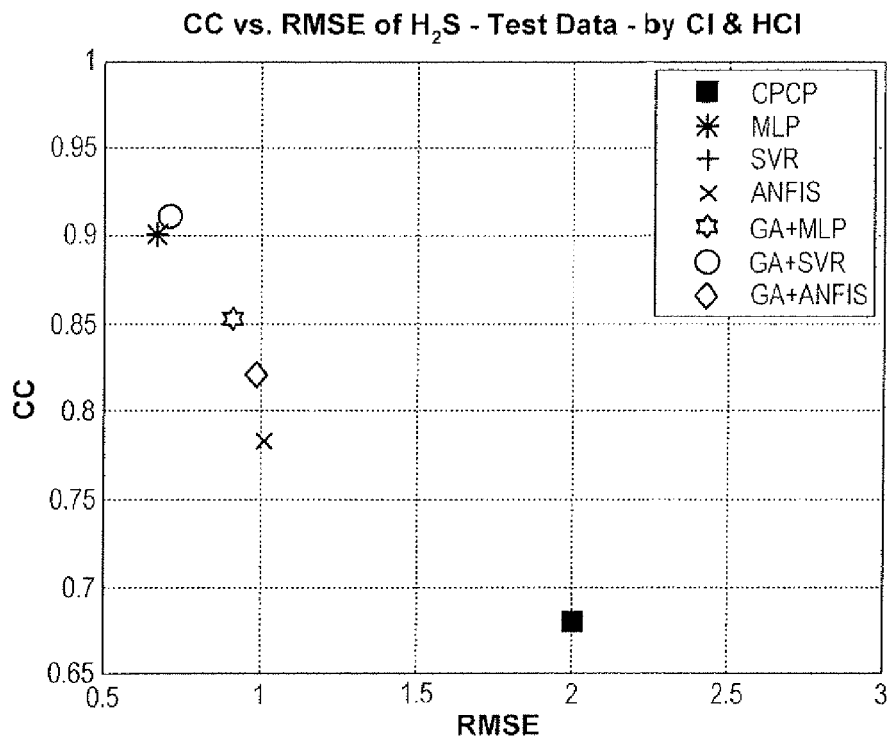
FIG. 20A is a plot of CC vs. RMSE for hydrogen sulfide prediction using the method of predicting gas composition for a variety of differing computational intelligence models.
Figure 20B:
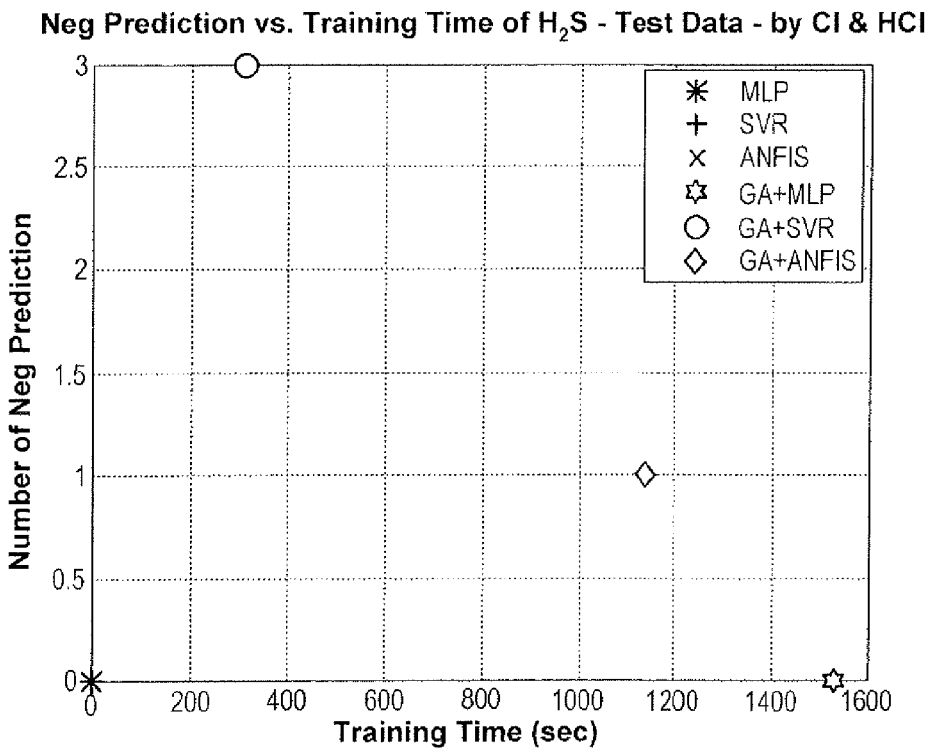
FIG. 20B is a plot of the number of negative predictions vs. training time for hydrogen sulfide prediction using the method of predicting gas composition for a variety of differing computational intelligence models.
Figure 20C:
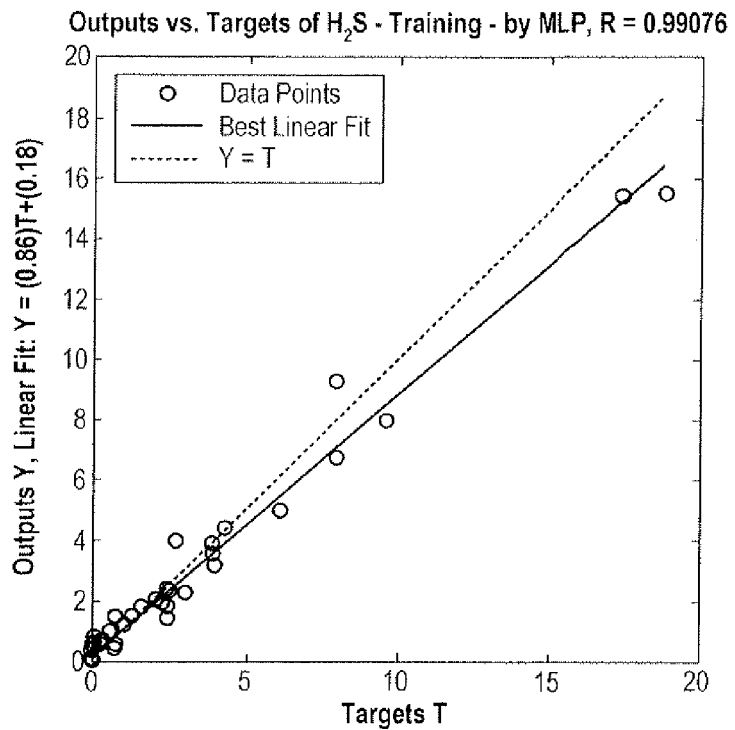
FIG. 20C is a graph of outputs vs. targets for hydrogen sulfide prediction using the method of predicting gas composition in the training phase.
Figure 20D:
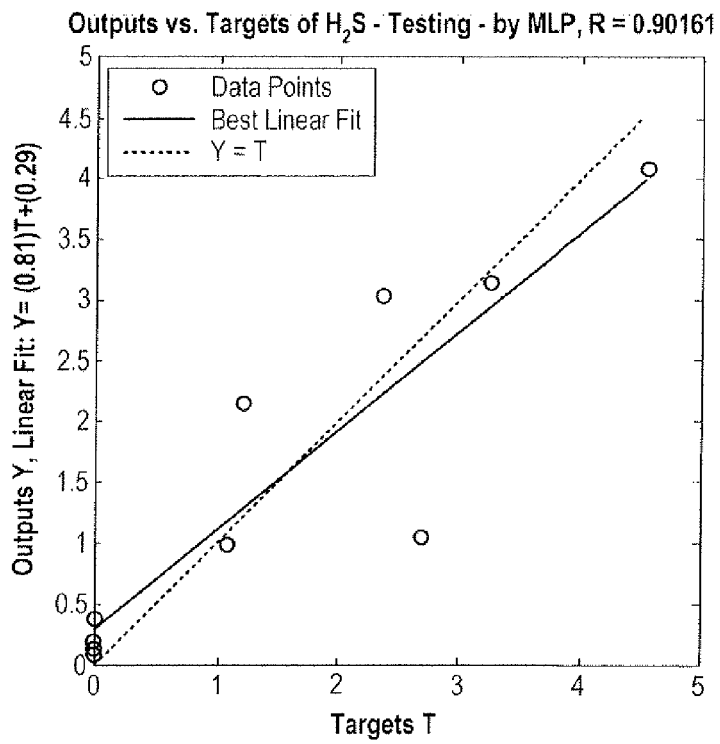
FIG. 20D is a graph of outputs vs. targets for hydrogen sulfide prediction using the method of predicting gas composition in the testing phase.
Figure 21A:
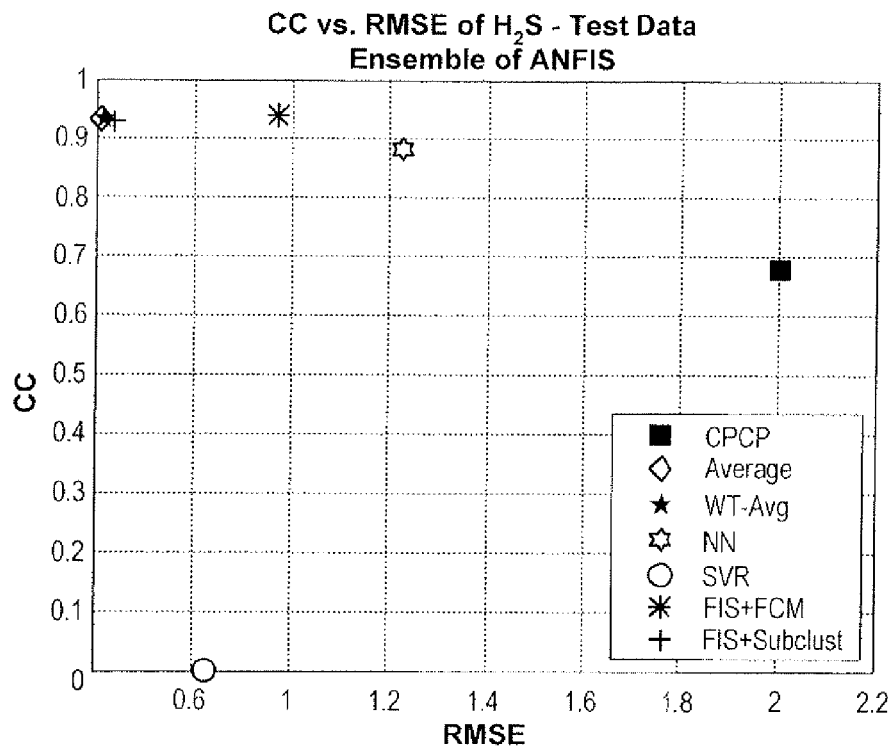
FIG. 21A is a plot of CC vs. RMSE for hydrogen sulfide prediction using the method of predicting gas composition for an ensemble of ANFIS models.
Figure 21B:
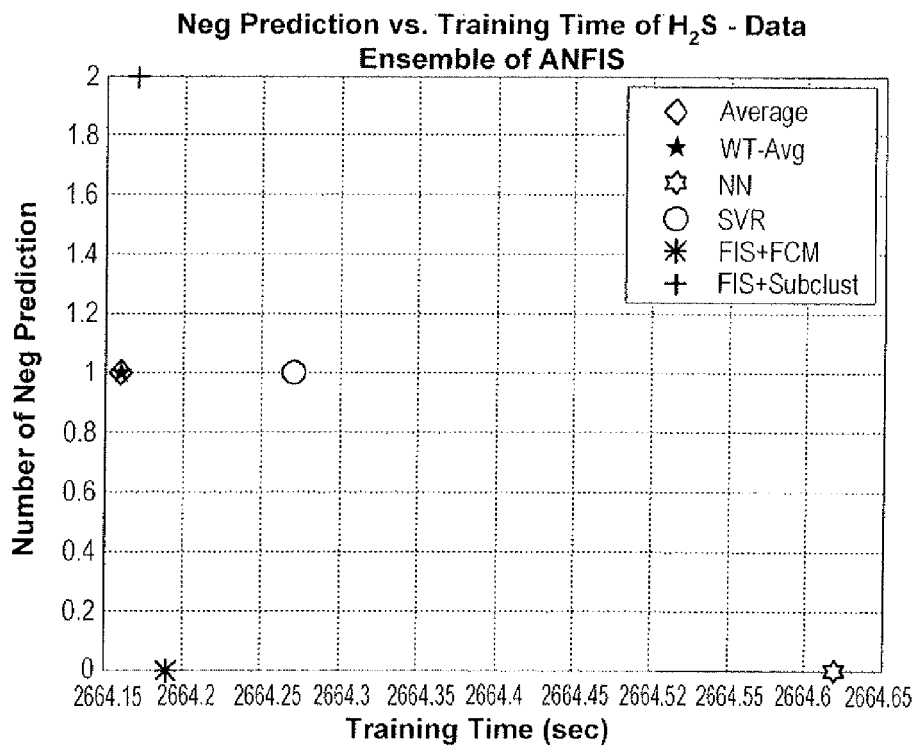
FIG. 21B is a plot of the number of negative predictions vs. training time for hydrogen sulfide prediction using the method of predicting gas composition for an ensemble of ANFIS models.
Figure 21C:
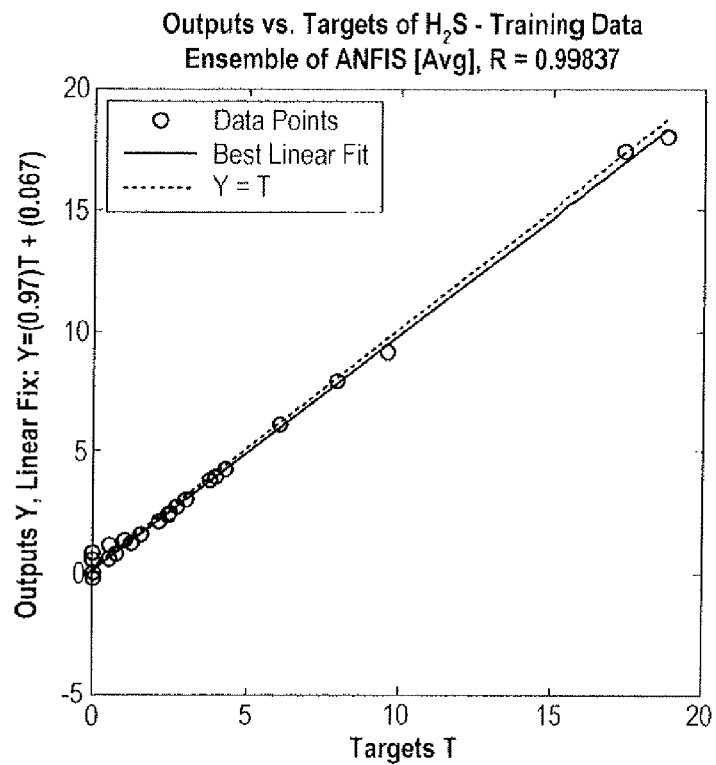
FIG. 21C is a graph of outputs vs. targets for hydrogen sulfide prediction using the method of predicting gas composition in the training phase for an ensemble of ANFIS models.
Figure 21D:
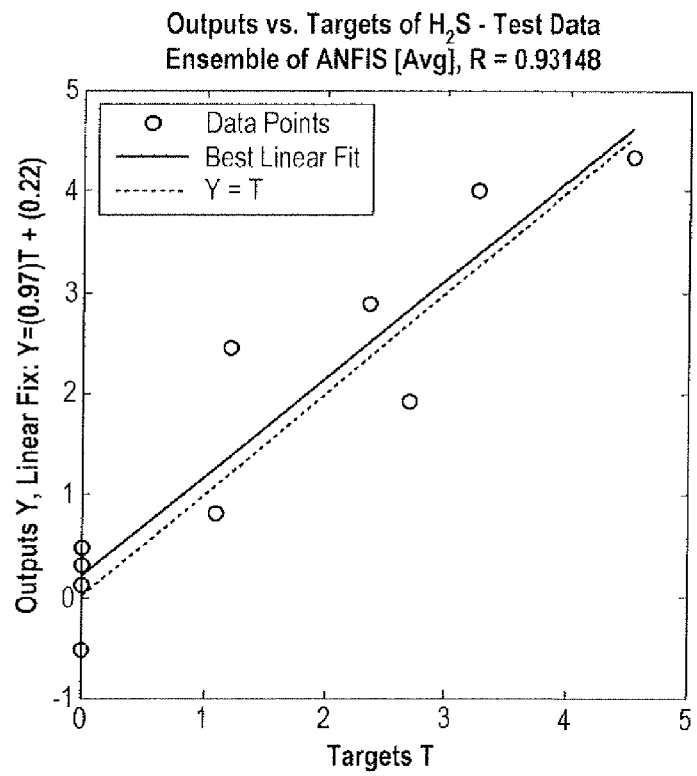
FIG. 21D is a graph of outputs vs. targets for hydrogen sulfide prediction using the method of predicting gas composition in the testing phase for an ensemble of ANFIS models.
Figure 22A:
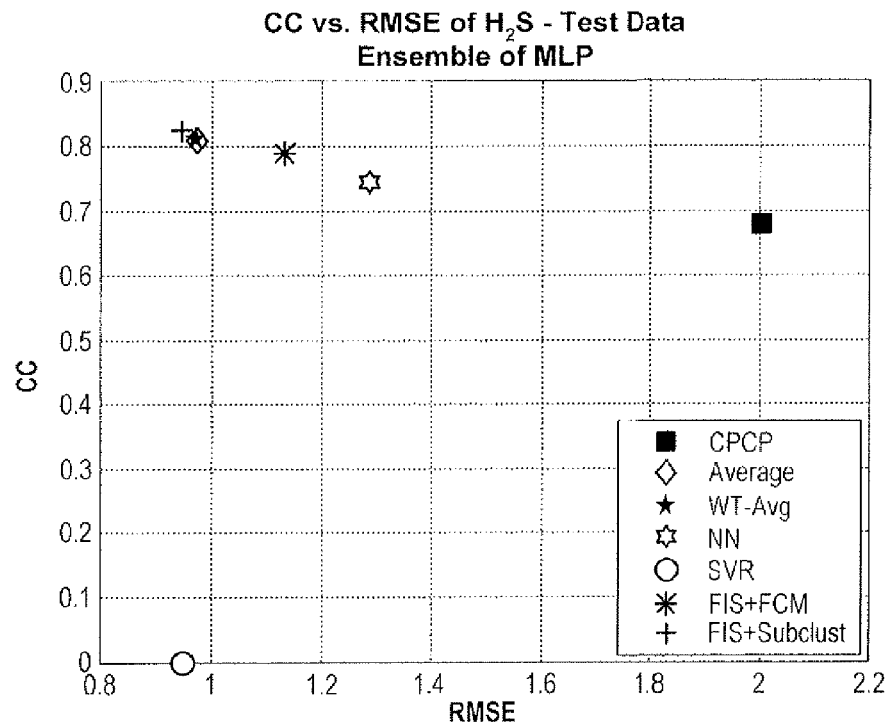
FIG. 22A is a plot of CC vs. RMSE for hydrogen sulfide prediction using the method of predicting gas composition for an ensemble of MLP models.
Figure 22B:
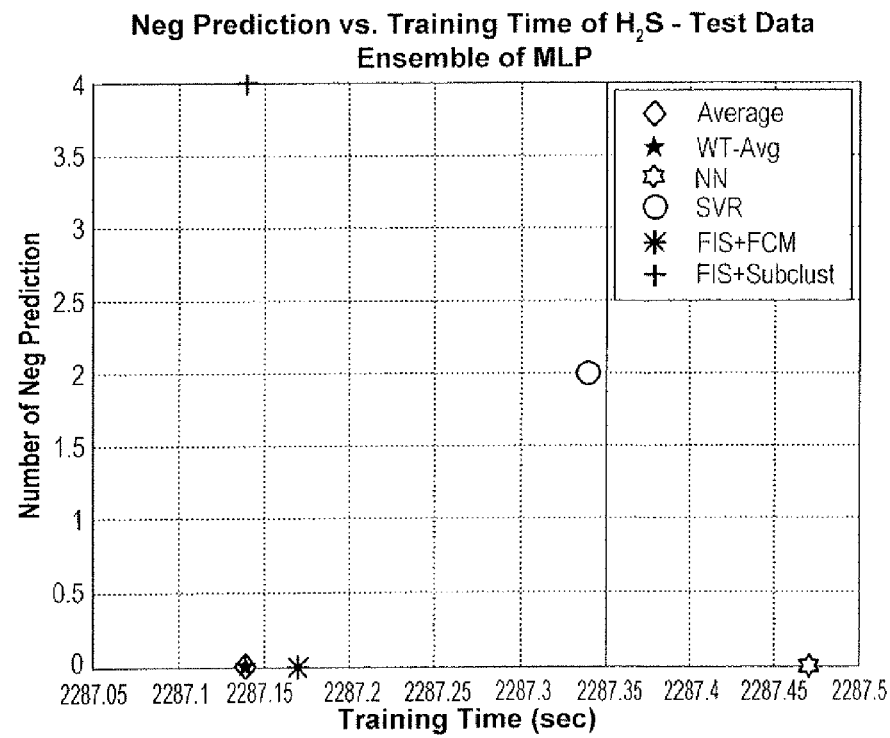
FIG. 22B is a plot of the number of negative predictions vs. training time for hydrogen sulfide prediction using the method of predicting gas composition for an ensemble of MLP models.
Figure 22C:
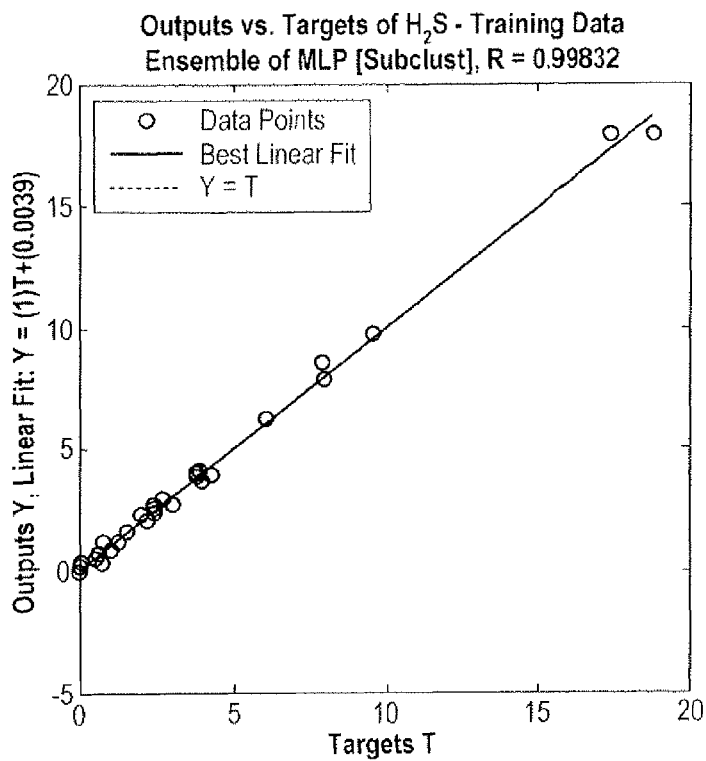
FIG. 22C is a graph of outputs vs. targets for hydrogen sulfide prediction using the method of predicting gas composition in the training phase for an ensemble of MLP models.
Figure 22D:
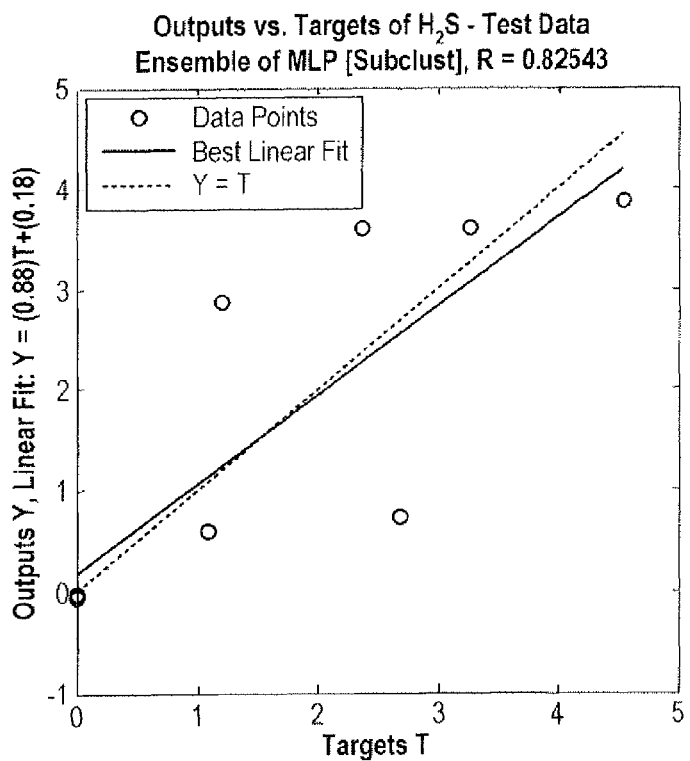
FIG. 22D is a graph of outputs vs. targets for hydrogen sulfide prediction using the method of predicting gas composition in the testing phase for an ensemble of MLP models.
Figure 23A:
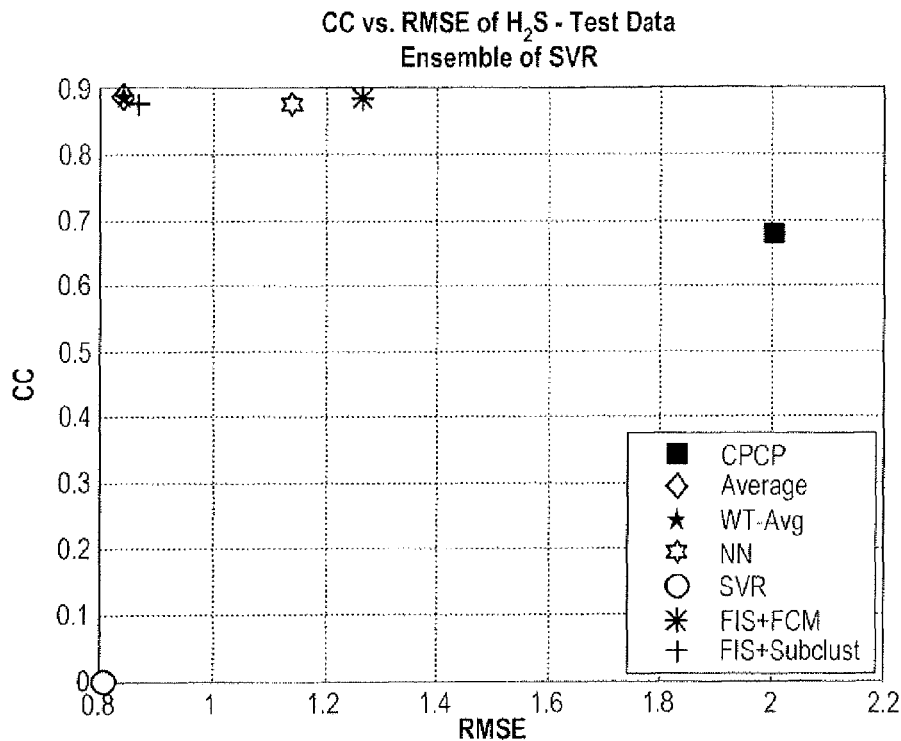
FIG. 23A is a plot of CC vs. RMSE for hydrogen sulfide prediction using the method of predicting gas composition for an ensemble of SVR models.
Figure 23B:
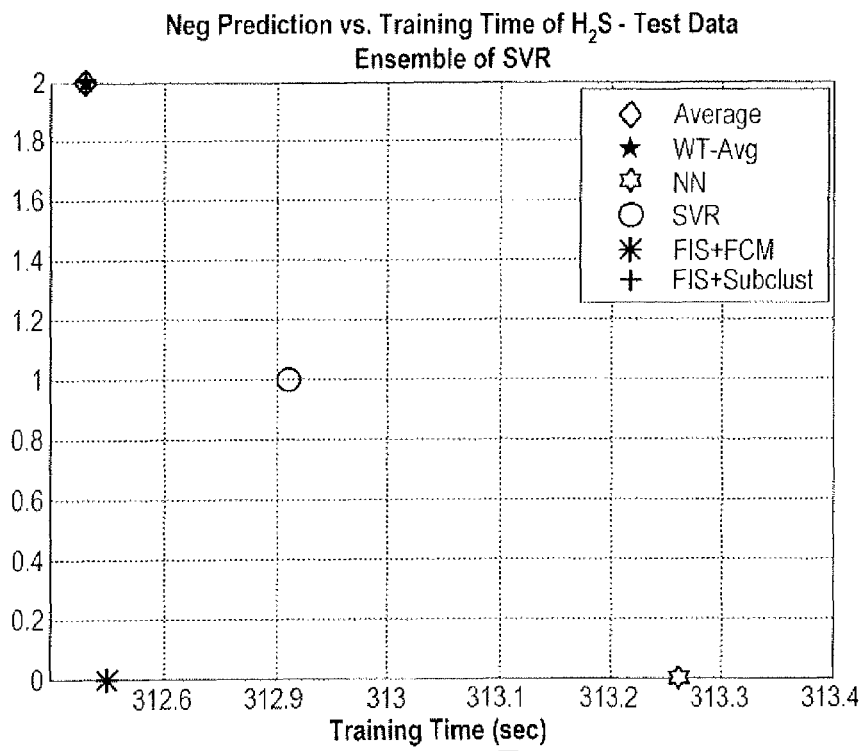
FIG. 23B is a plot of the number of negative predictions vs. training time for hydrogen sulfide prediction using the method of predicting gas composition for an ensemble of SVR models.
Figure 23C:
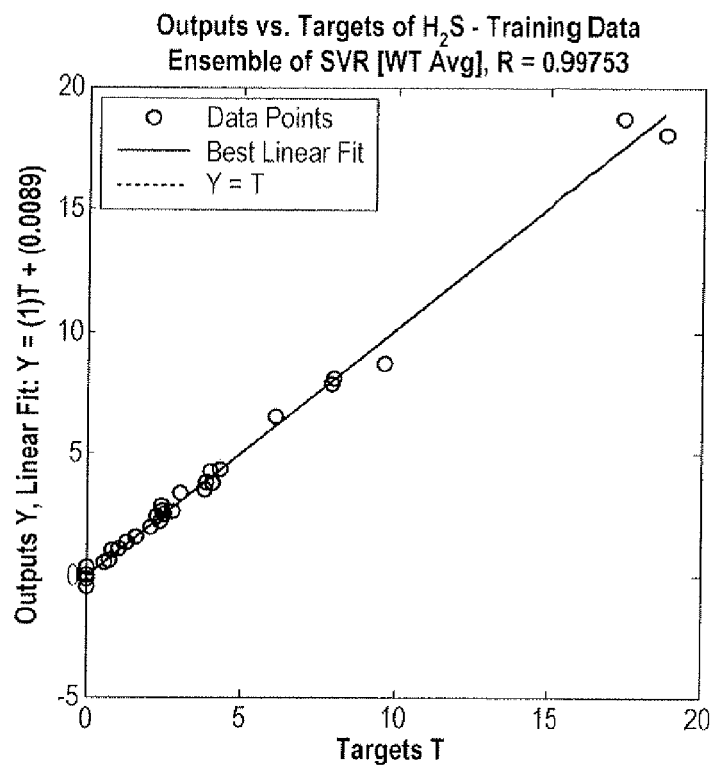
FIG. 23C is a graph of outputs vs. targets for hydrogen sulfide prediction using the method of predicting gas composition in the training phase for an ensemble of SVR models.
Figure 23D:
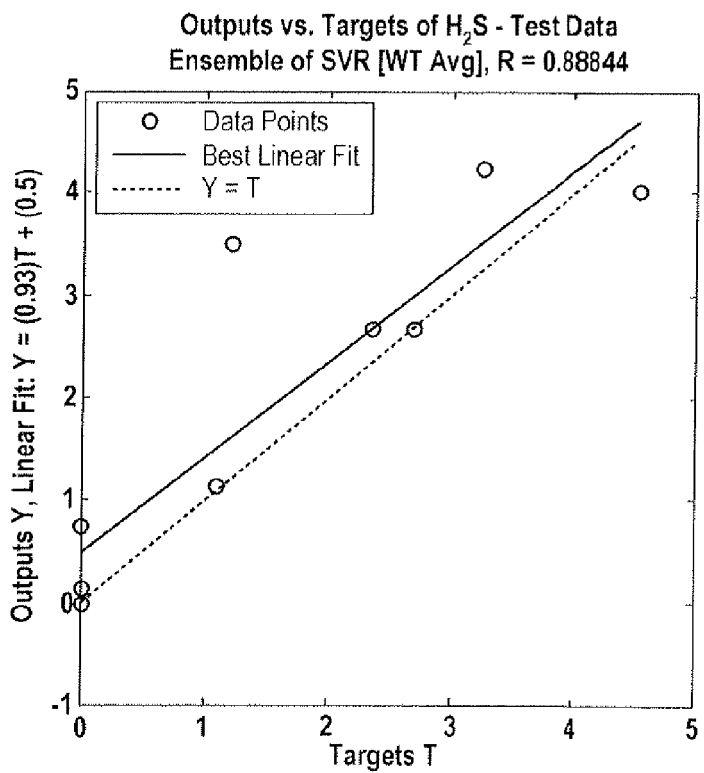
FIG. 23D is a graph of outputs vs. targets for hydrogen sulfide prediction using the method of predicting gas composition in the testing phase for an ensemble of SVR models.
Figure 24A:
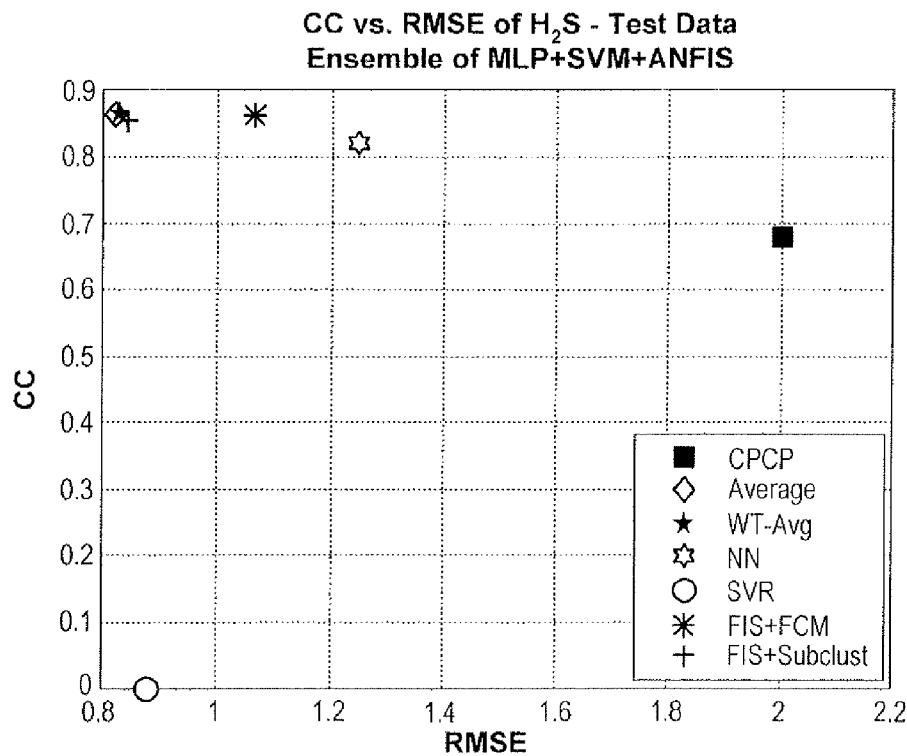
FIG. 24A is a graph of outputs vs. targets for hydrogen sulfide prediction using the method of predicting gas composition in the training phase for an ensemble of ANFIS, MLP and SVR models.
Figure 24B:
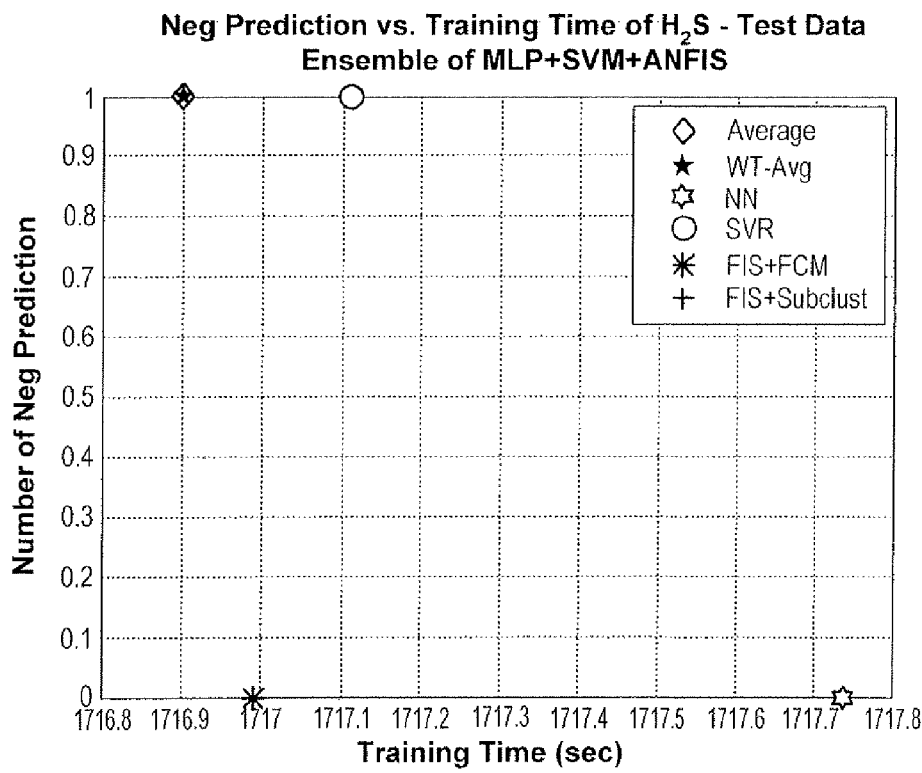
FIG. 24B is a graph of outputs vs. targets for hydrogen sulfide prediction using the method of predicting gas composition in the testing phase for an ensemble of ANFIS, MLP and SVR models.
Figure 24C:
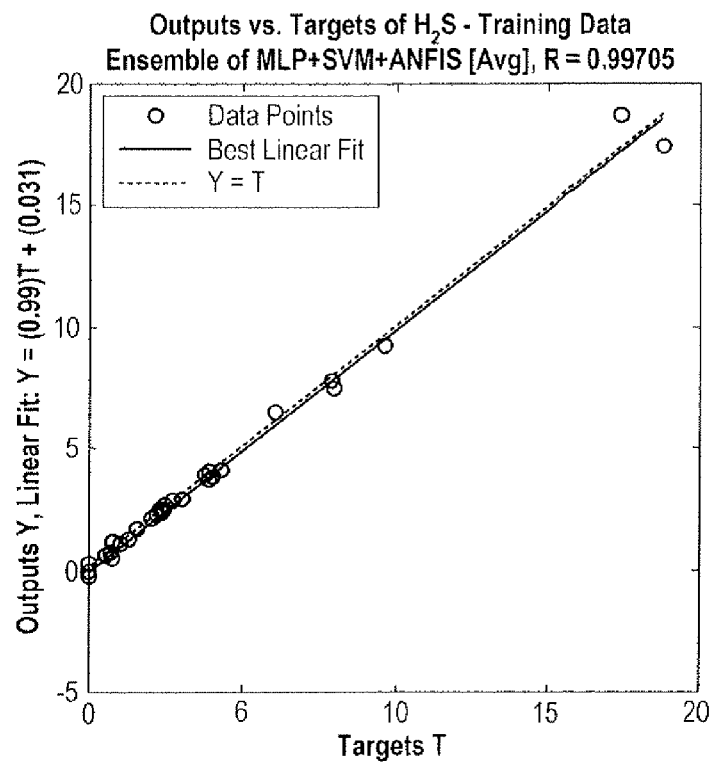
FIG. 24C is a graph of outputs vs. targets for hydrogen sulfide prediction using the method of predicting gas composition in the training phase for an ensemble of ANFIS, MLP and SVR models.
Figure 24D:
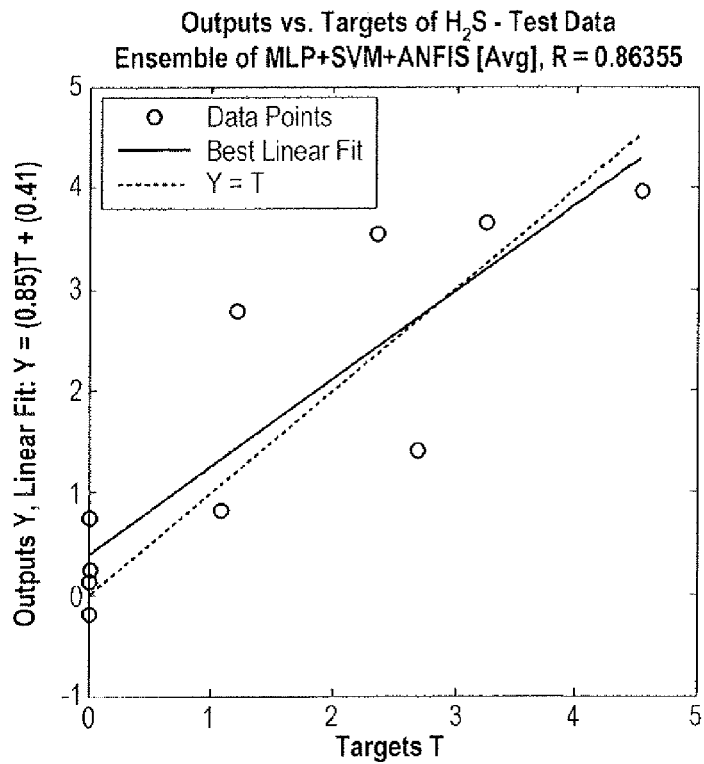
FIG. 24D is a graph of outputs vs. targets for hydrogen sulfide prediction using the method of predicting gas composition in the testing phase for an ensemble of ANFIS, MLP and SVR models.

FIG. 20A shows that the performance of the CI model MLP outperforms other CI, HCI and CPCP models for $H_2S$ prediction. HCI models, except GA+MLP, perform better than the corresponding CI models. FIG. 20B shows that the CI model MLP took minimal time, compared to the other CI and HCI models, and did not predict any negative values. The regression analysis of MLP in FIGS. 20C and 20D on training and testing data shows that the prediction is strongly correlated with the original values. FIG. 21A shows that the EHCI model of ANFIS combined with the simple average method performed better than other combiners, as well as CPCP. The error RMSE value of the best CI model MLP in FIG. 20A is near 0.7, whereas the EHCI model of ANFIS is about 0.6 with one negative prediction (shown in FIG. 21B). On the other hand, the EHCI model of MLP with the FIS-Subclust combining method in FIG. 22A, the EHCI model of SVR with the weighted average method (FIG. 23A) and the heterogeneous EHCI model (FIG. 24A) show performances where were not as good as the EHCI model of ANFIS, though all of the models performed better than CPCP.

Figure 25A:
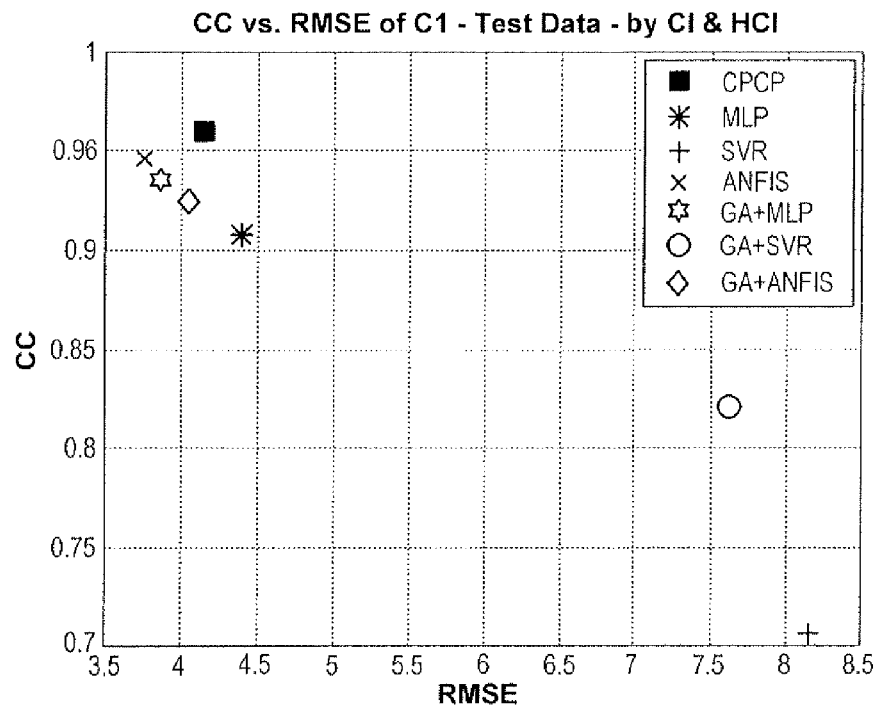
FIG. 25A is a plot of CC vs. RMSE for methane prediction using the method of predicting gas composition for a variety of differing computational intelligence models.
Figure 25B:
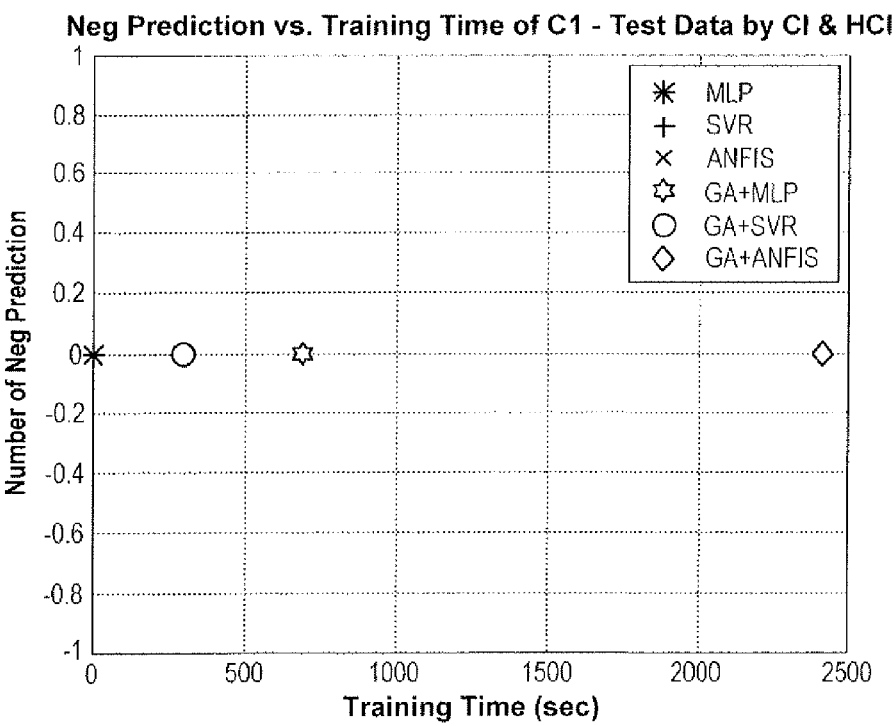
FIG. 25B is a plot of the number of negative predictions vs. training time for methane prediction using the method of predicting gas composition for a variety of differing computational intelligence models.
Figure 25C:
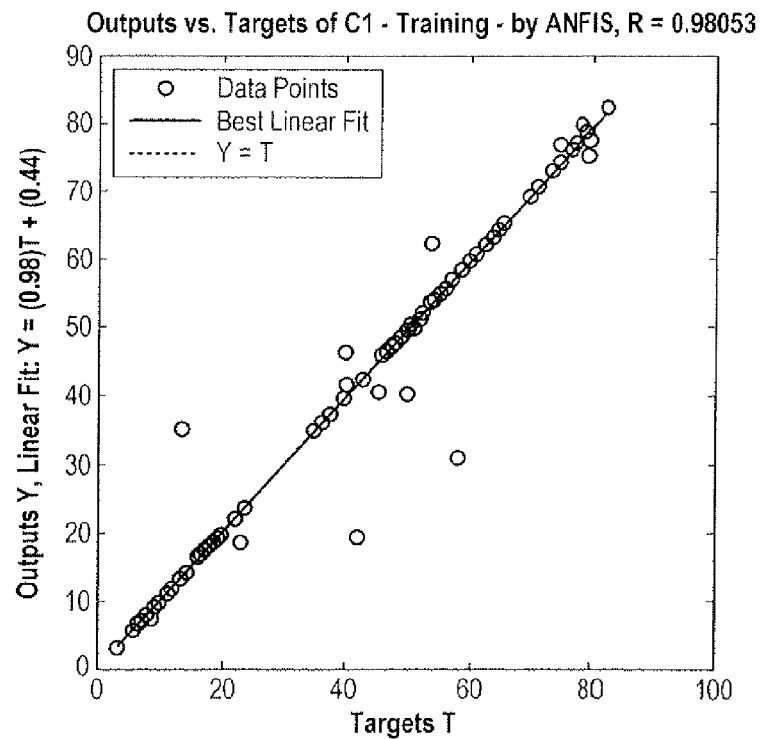
FIG. 25C is a graph of outputs vs. targets for methane prediction using the method of predicting gas composition in the training phase.
Figure 25D:
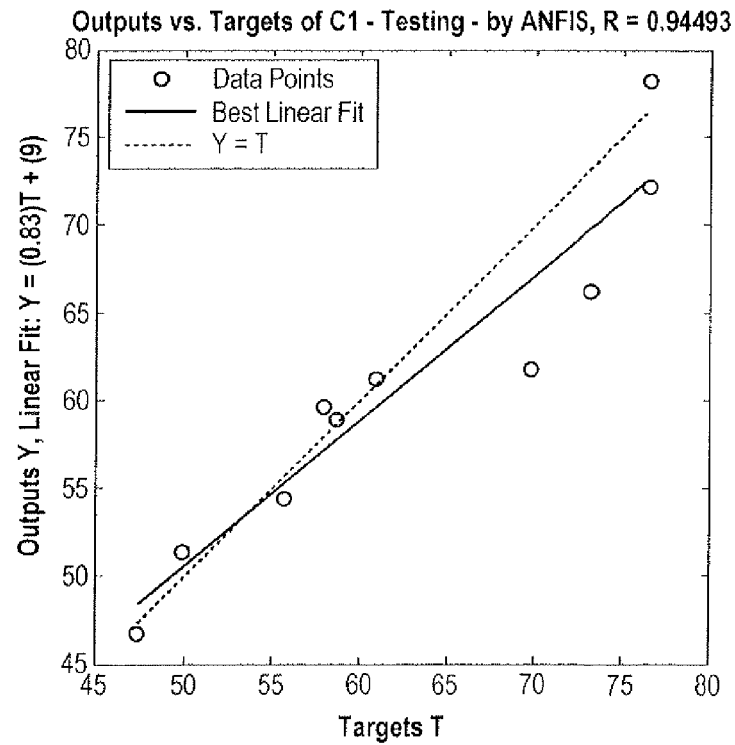
FIG. 25D is a graph of outputs vs. targets for methane prediction using the method of predicting gas composition in the testing phase.
Figure 26A:
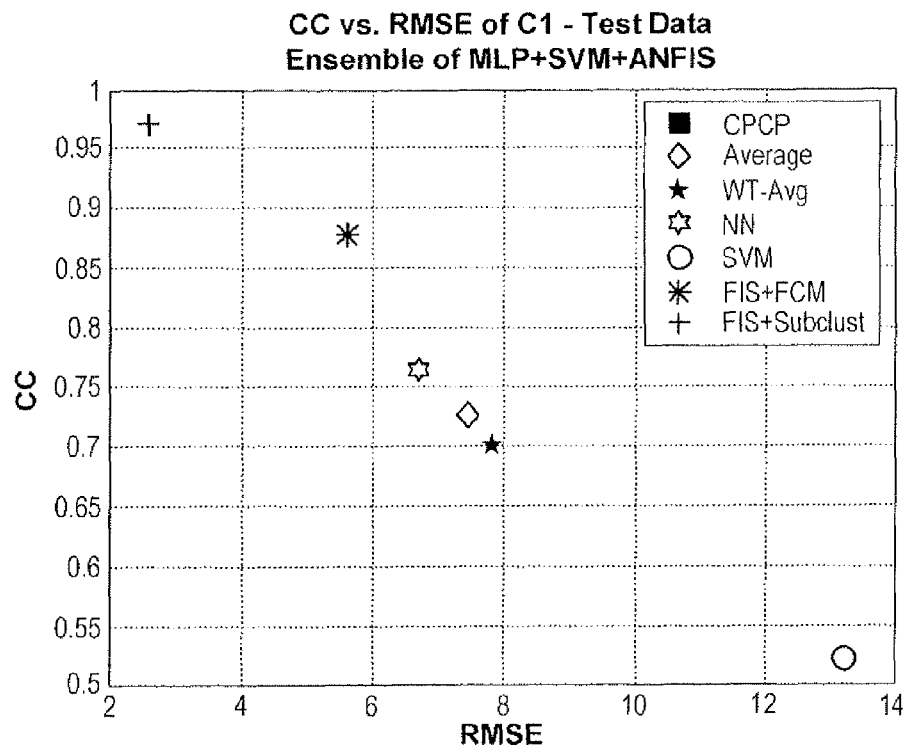
FIG. 26A is a plot of CC vs. RMSE for methane prediction using the method of predicting gas composition for an ensemble of ANFIS, MLP and SVR models.
Figure 26B:
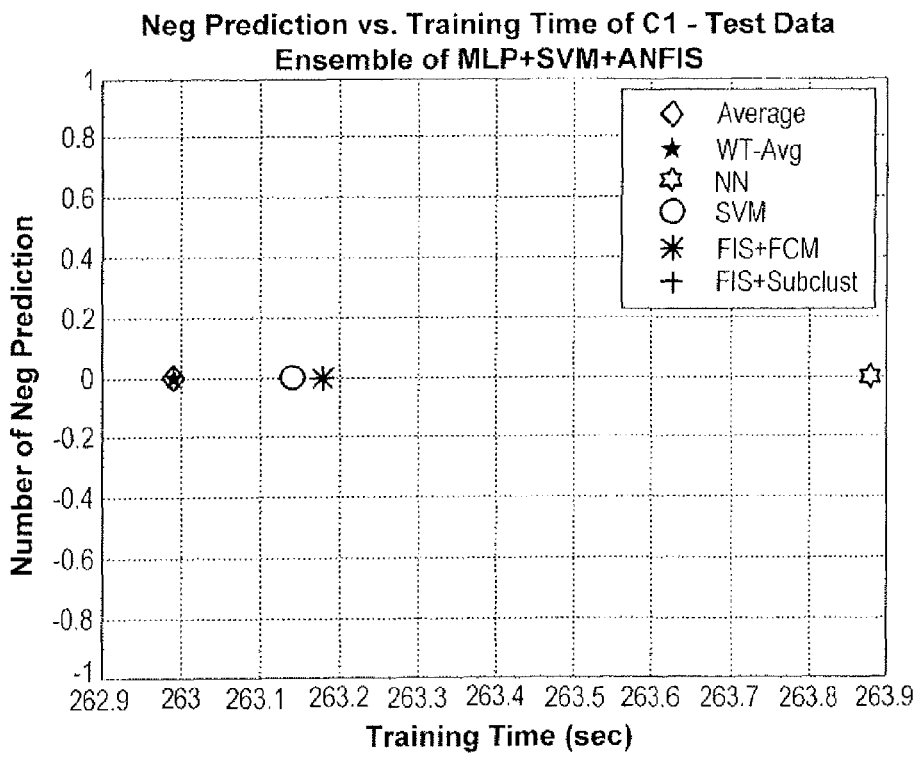
FIG. 26B is a plot of the number of negative predictions vs. training time for methane prediction using the method of predicting gas composition for an ensemble of ANFIS, MLP and SVR models.
Figure 26C:
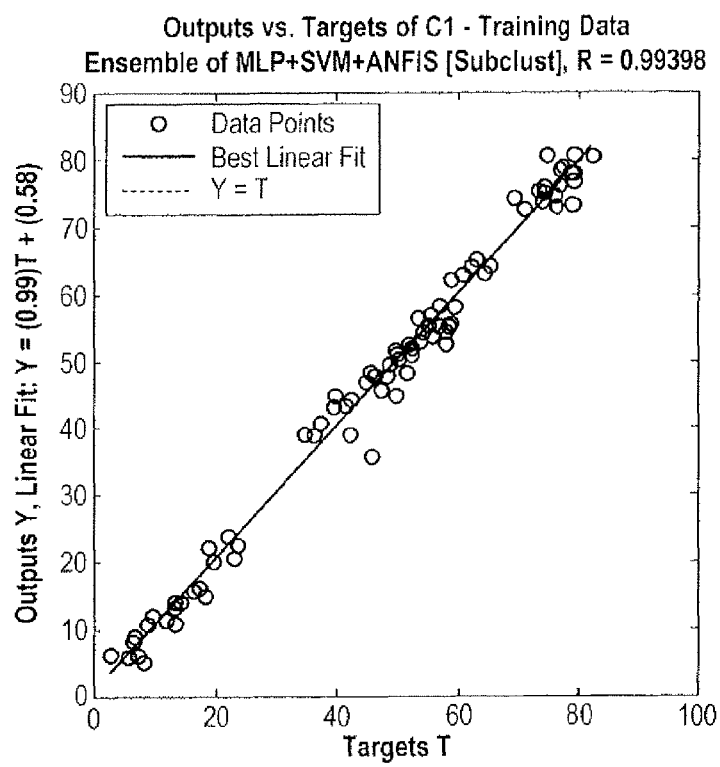
FIG. 26C is a graph of outputs vs. targets for methane prediction using the method of predicting gas composition in the training phase for an ensemble of ANFIS, MLP and SVR models.
Figure 26D:
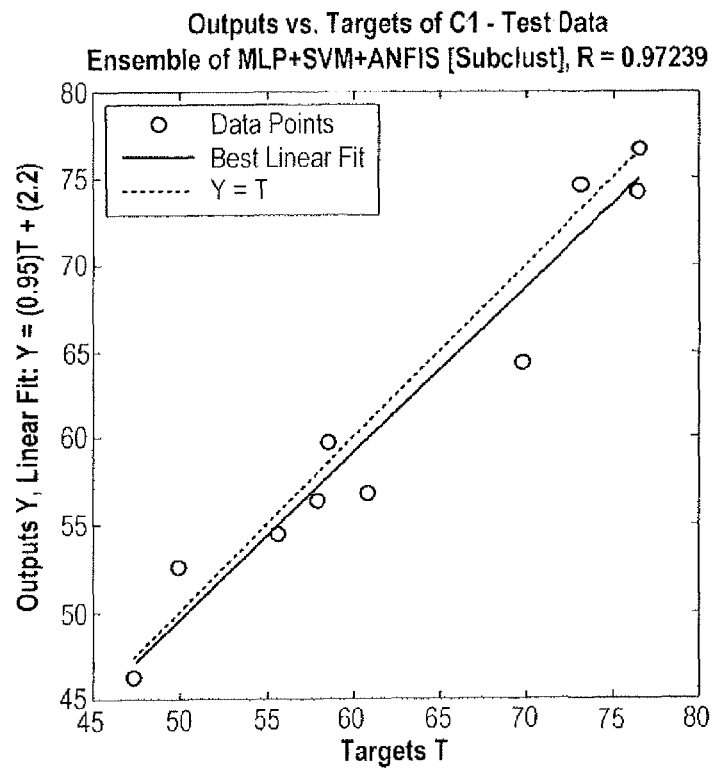
FIG. 26D is a graph of outputs vs. targets for methane prediction using the method of predicting gas composition in the testing phase for an ensemble of ANFIS, MLP and SVR models.
Figure 27A:
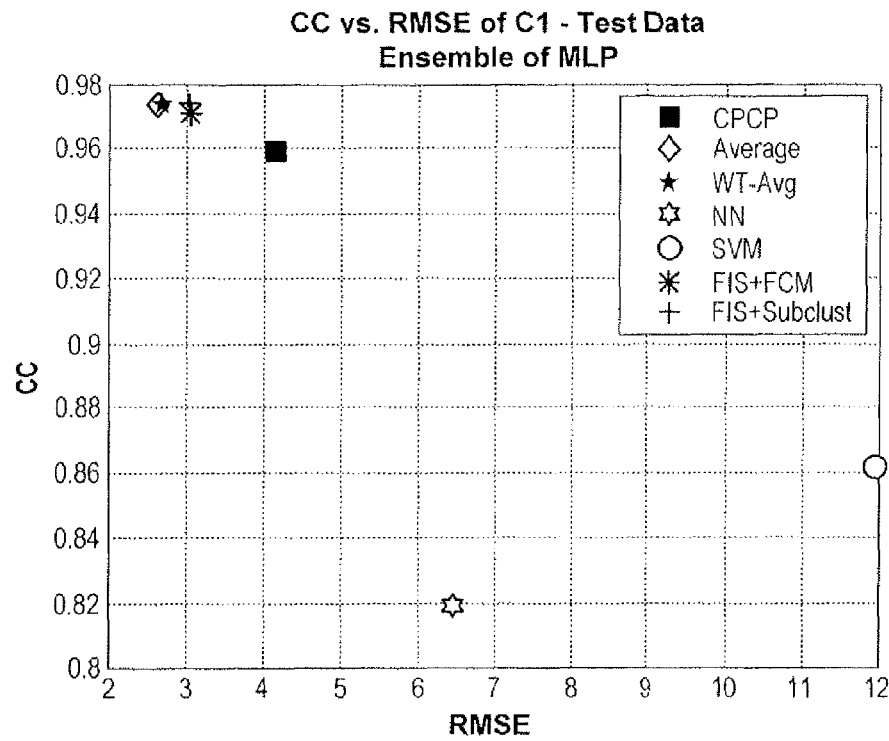
FIG. 27A is a plot of CC vs. RMSE for methane prediction using the method of predicting gas composition for an ensemble of MLP models.
Figure 27B:
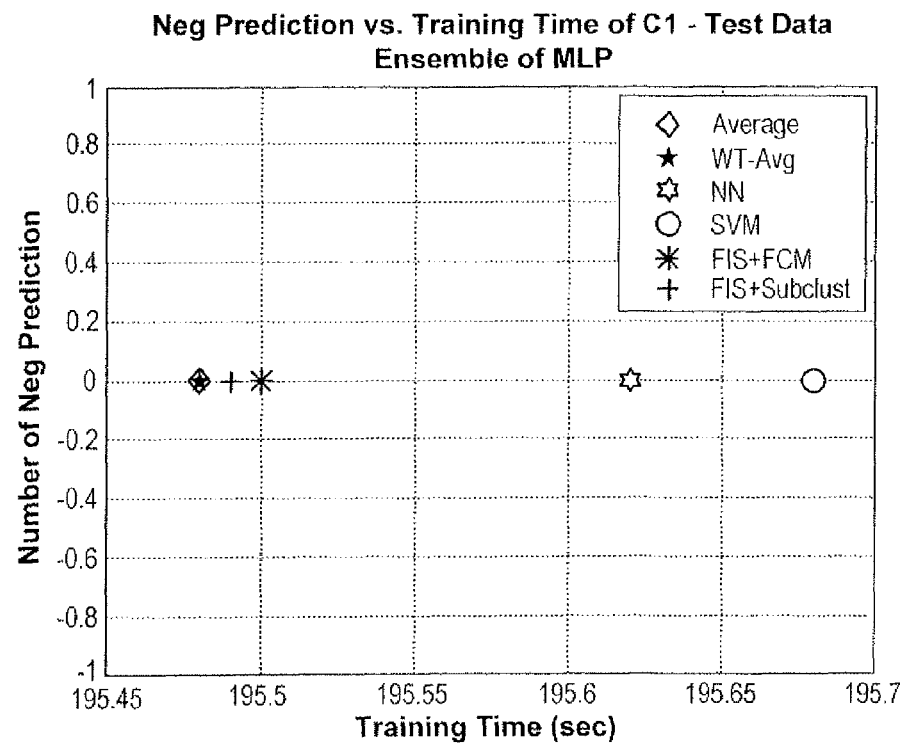
FIG. 27B is a plot of the number of negative predictions vs. training time for methane prediction using the method of predicting gas composition for an ensemble of MLP models.
Figure 27C:
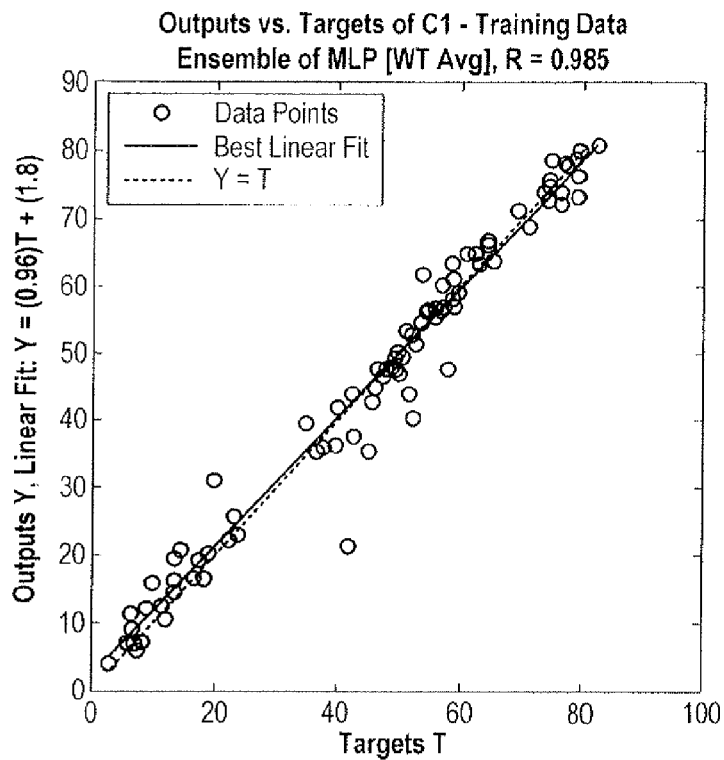
FIG. 27C is a graph of outputs vs. targets for methane prediction using the method of predicting gas composition in the training phase for an ensemble of MLP models.
Figure 27D:
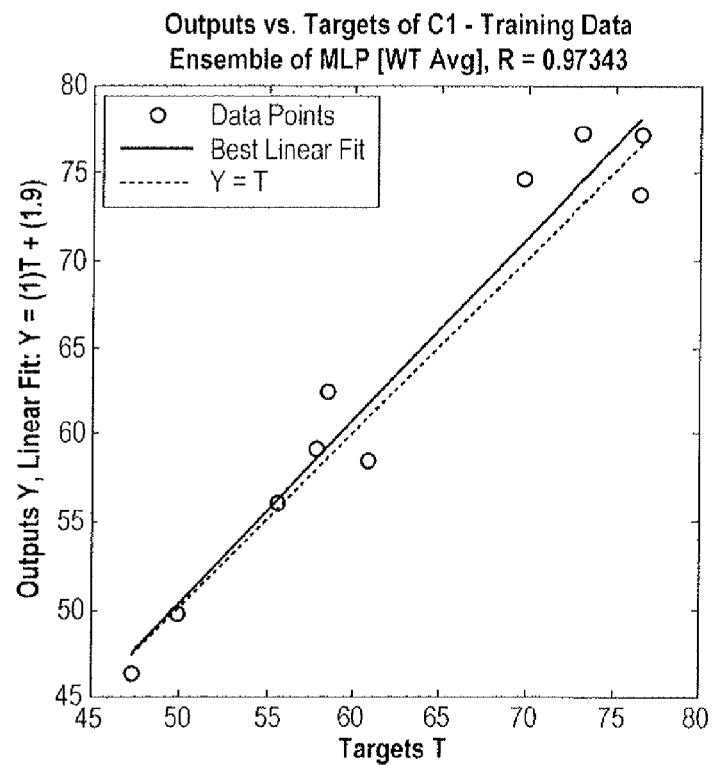
FIG. 27D is a graph of outputs vs. targets for methane prediction using the method of predicting gas composition in the testing phase for an ensemble of MLP models.
Figure 28A:
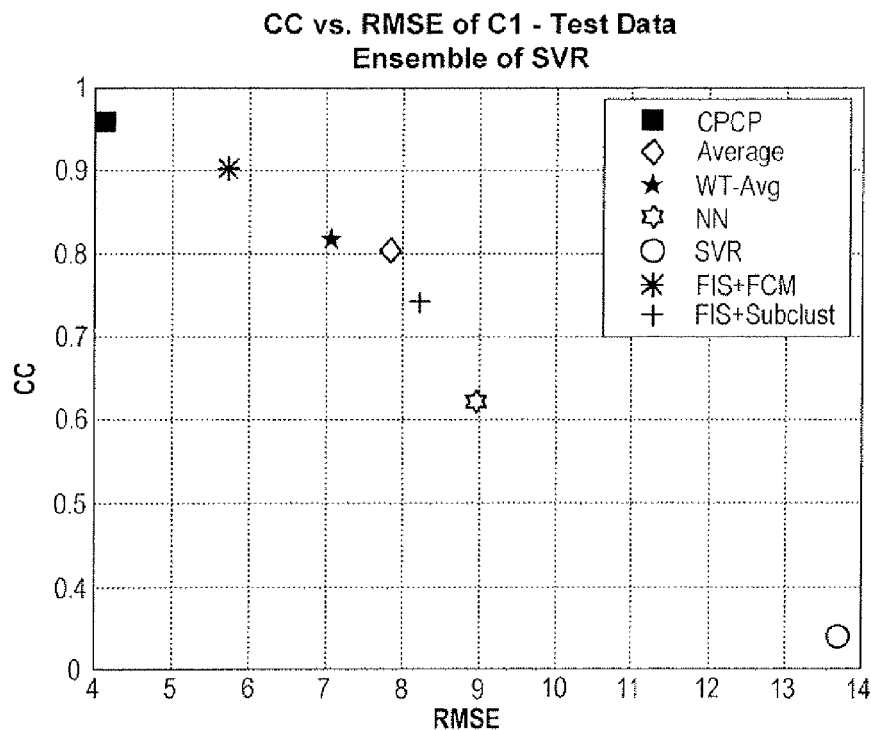
FIG. 28A is a plot of CC vs. RMSE for methane prediction using the method of predicting gas composition for an ensemble of SVR models.
Figure 28B:
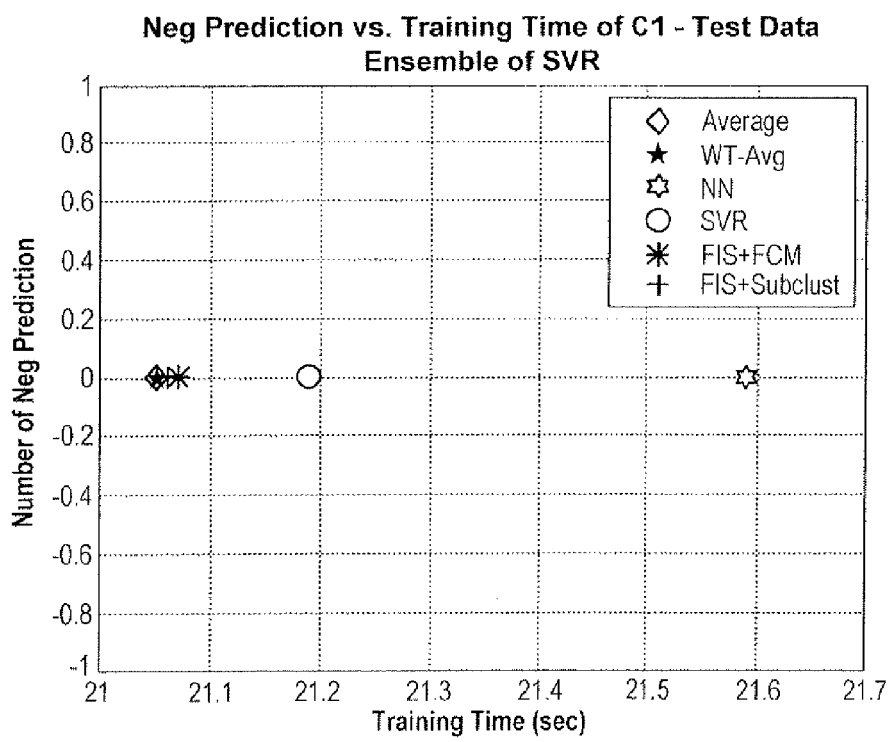
FIG. 28B is a plot of the number of negative predictions vs. training time for methane prediction using the method of predicting gas composition for an ensemble of SVR models.
Figure 29A:
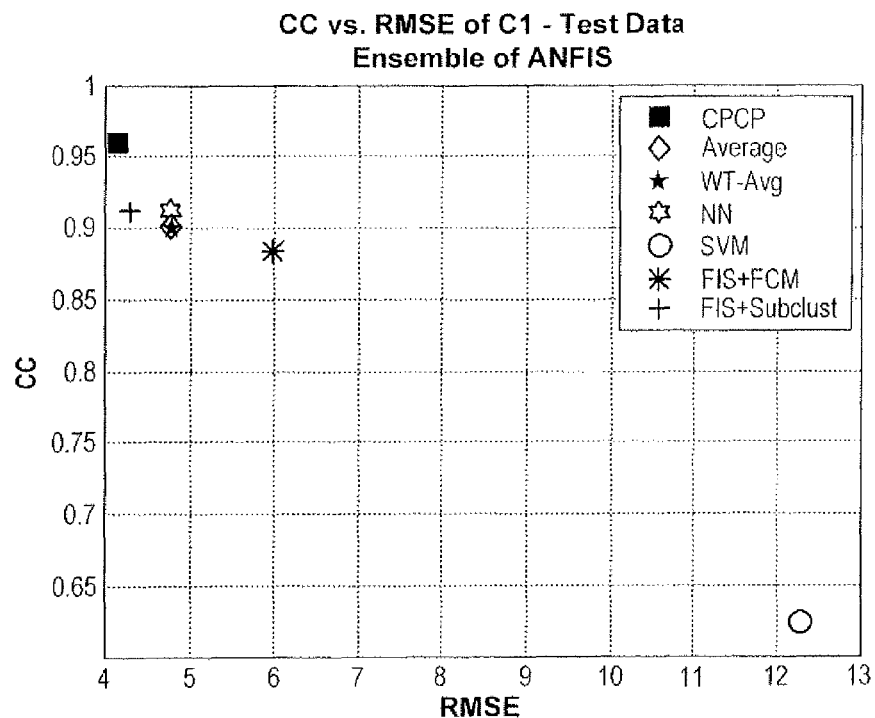
FIG. 29A is a graph of outputs vs. targets for methane prediction using the method of predicting gas composition in the training phase for an ensemble of ANFIS models.
Figure 29B:
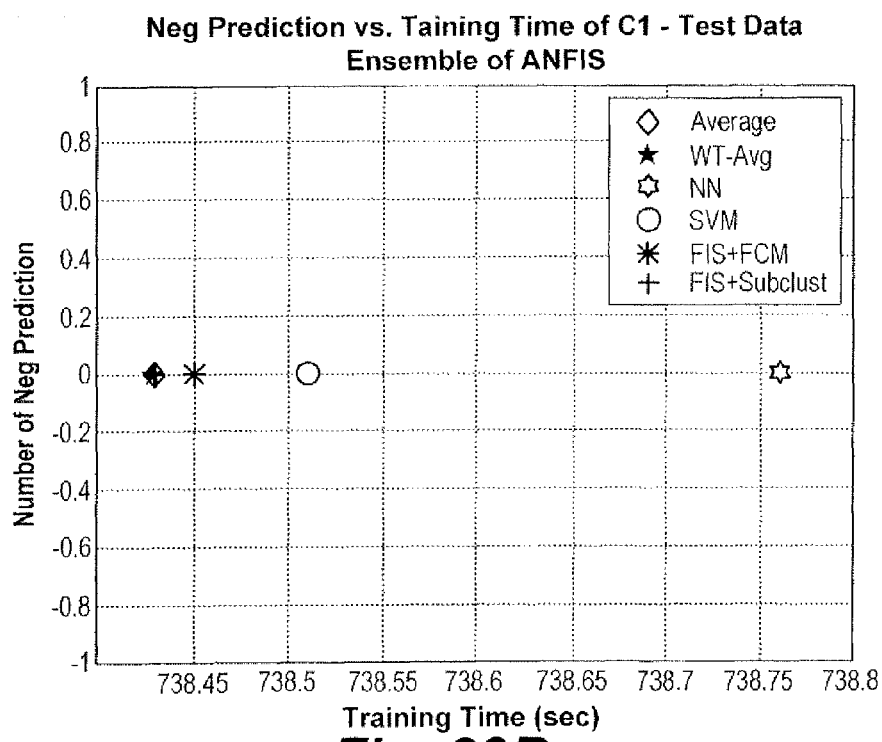
FIG. 29B is a graph of outputs vs. targets for methane prediction using the method of predicting gas composition in the testing phase for an ensemble of ANFIS models.

FIG. 25A shows that the performance of the CI model ANFIS, which outperforms all of the CI, HCI and CPCP models for C1 prediction. It can be seen that the HCI models perform better than the corresponding CI models, except ANFIS. FIG. 25B shows that ANFIS took less time, along with MLP and SVR, than the HCI models with no negative predictions. The regression analysis of GA+ANFIS in FIGS. 25C and 25D on training and testing data shows that the prediction is strongly correlated with the original values. FIG. 26A shows that the heterogeneous EHCI model combined with FIS-Subclust performed better than any other combiner, as well as CPCP. The error RMSE value of the best model ANFIS in FIG. 25A is near 3.75, whereas the RMSE of the heterogeneous EHCI model is about 2.5 (FIG. 26A). Nevertheless, the EHCI model of MLP with the weighted average combining method in FIG. 27A shows that the RMSE value is near 2.5. FIGS. 28A, 28B, 29A and 29B show the other ECHI models' performance on predicting CI in separator gas compositions.

Figure 30A:
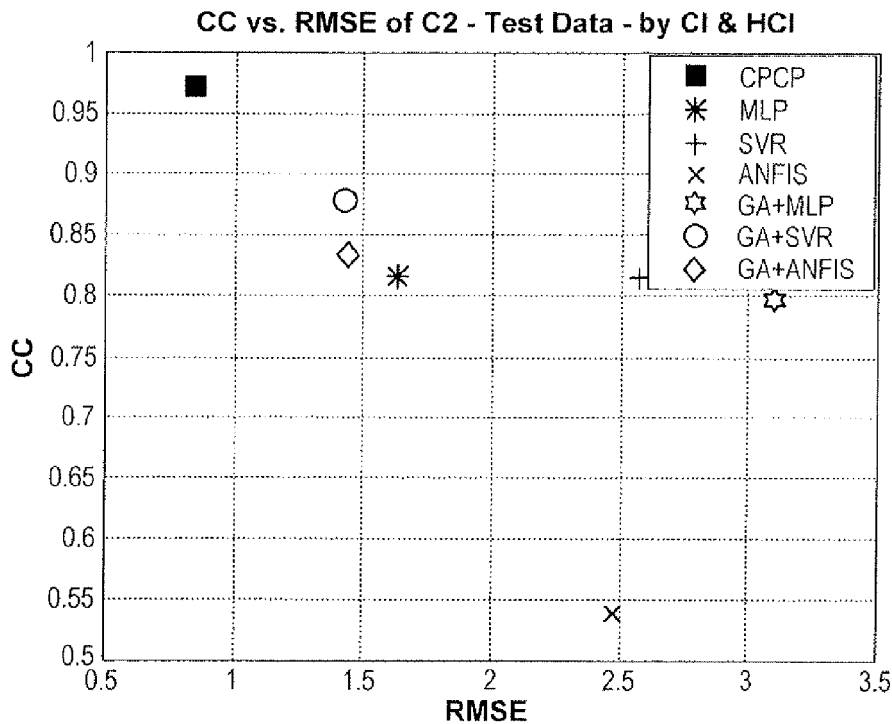
FIG. 30A is a plot of CC vs. RMSE for ethane prediction using the method of predicting gas composition for a variety of differing computational intelligence models.
Figure 30B:
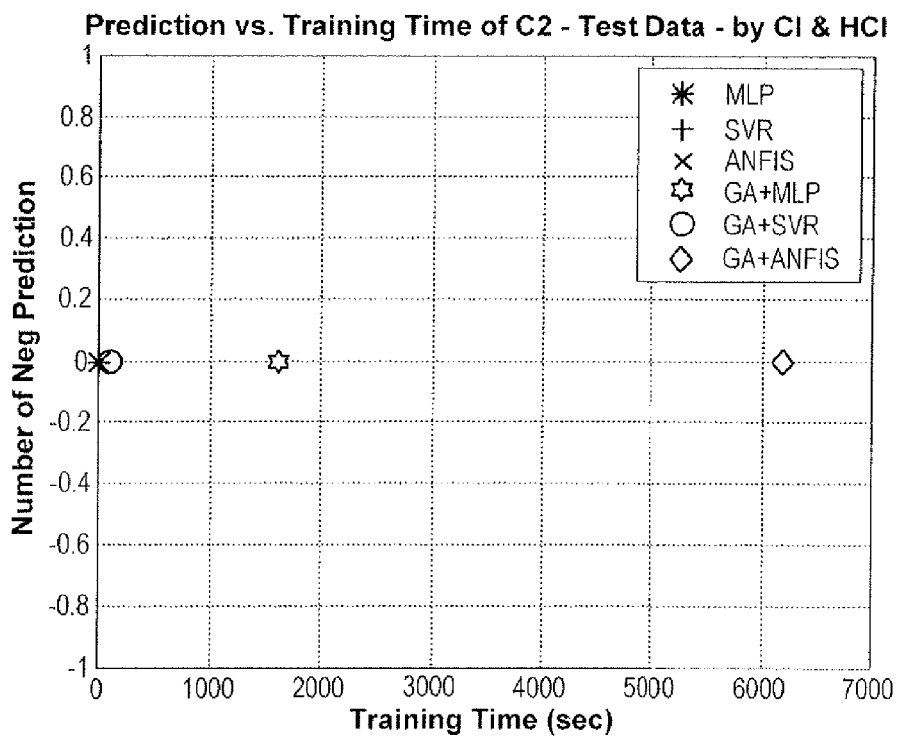
FIG. 30B is a plot of the number of negative predictions vs. training time for ethane prediction using the method of predicting gas composition for a variety of differing computational intelligence models.
Figure 30C:
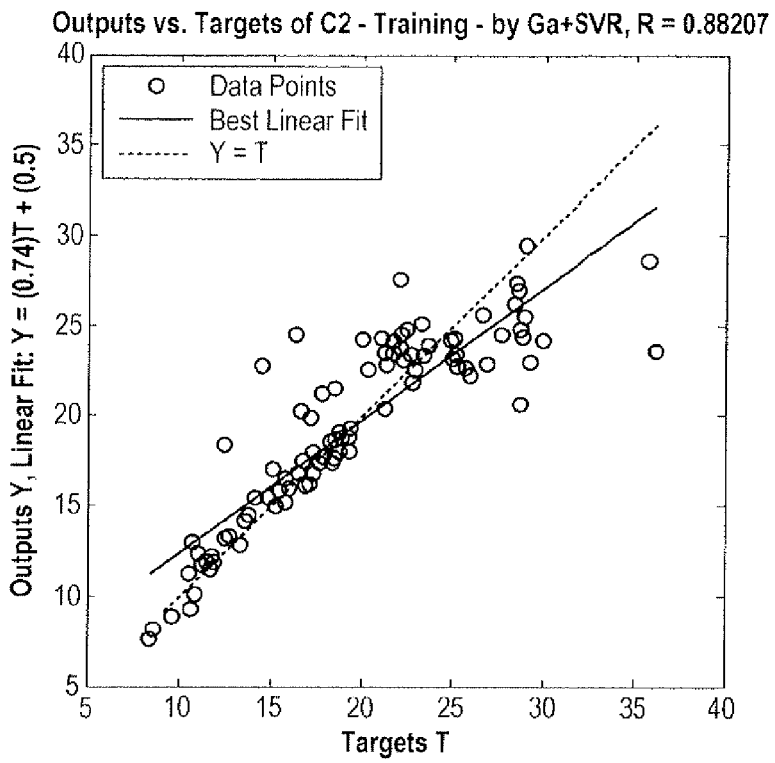
FIG. 30C is a graph of outputs vs. targets for ethane prediction using the method of predicting gas composition in the training phase.
Figure 30D:
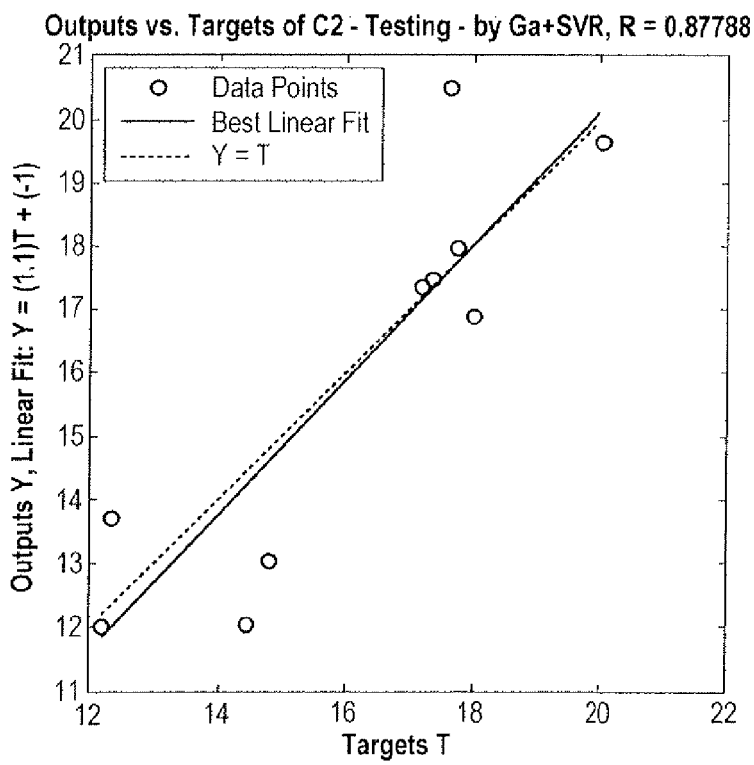
FIG. 30D is a graph of outputs vs. targets for ethane prediction using the method of predicting gas composition in the testing phase.
Figure 31A:
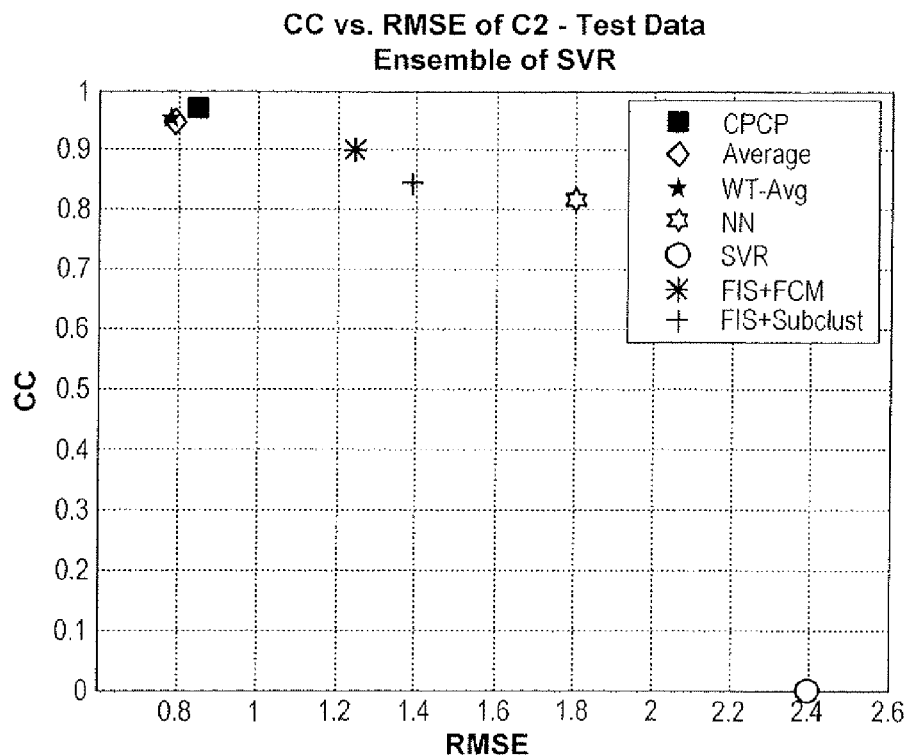
FIG. 31A is a plot of CC vs. RMSE for ethane prediction using the method of predicting gas composition for an ensemble of SVR models.
Figure 31B:
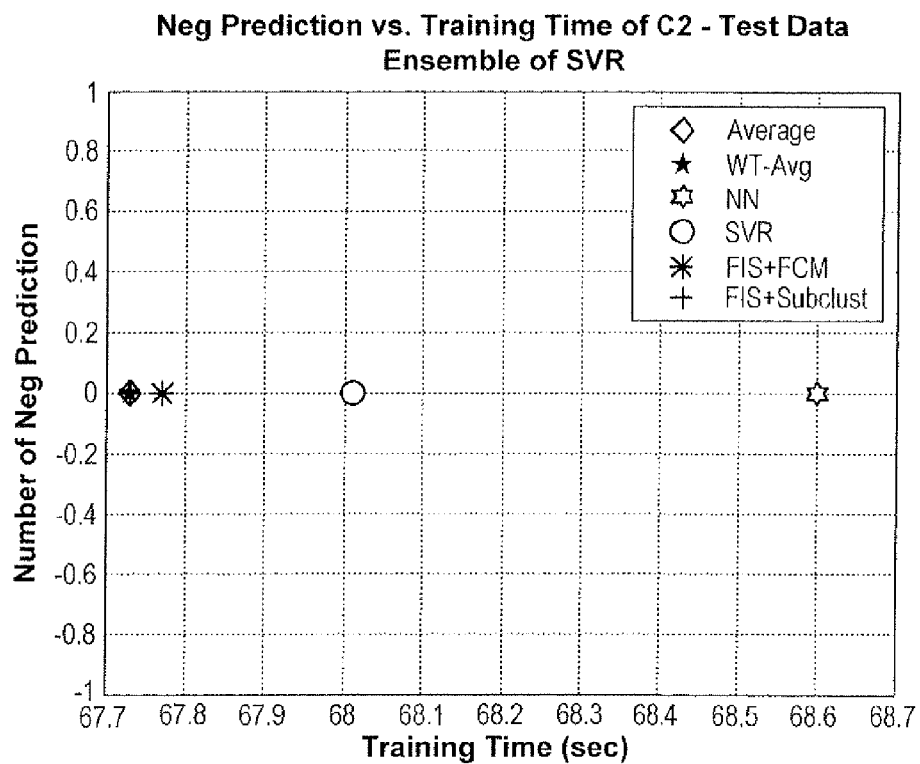
FIG. 31B is a plot of the number of negative predictions vs. training time for ethane prediction using the method of predicting gas composition for an ensemble of SVR models.
Figure 31C:
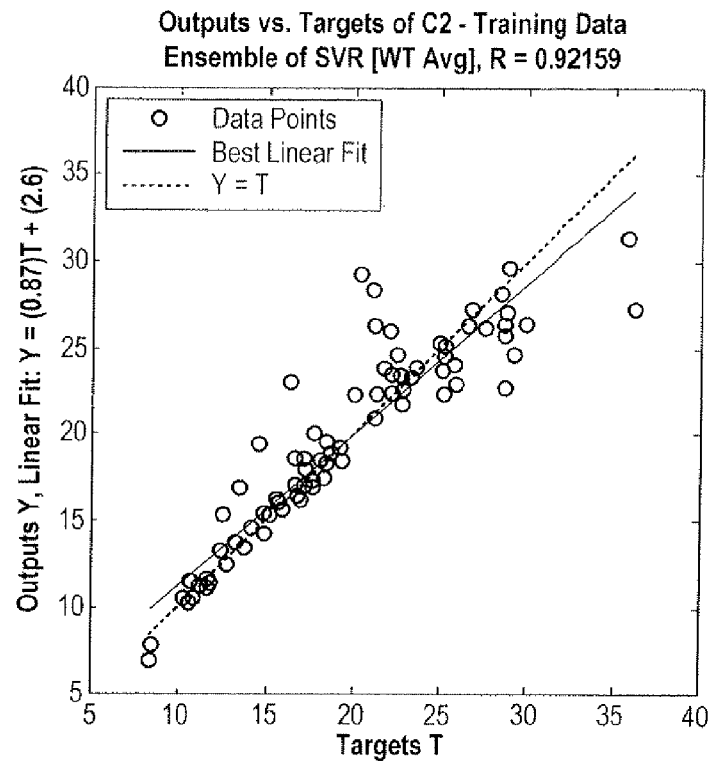
FIG. 31C is a graph of outputs vs. targets for ethane prediction using the method of predicting gas composition in the training phase for an ensemble of SVR models.
Figure 31D:
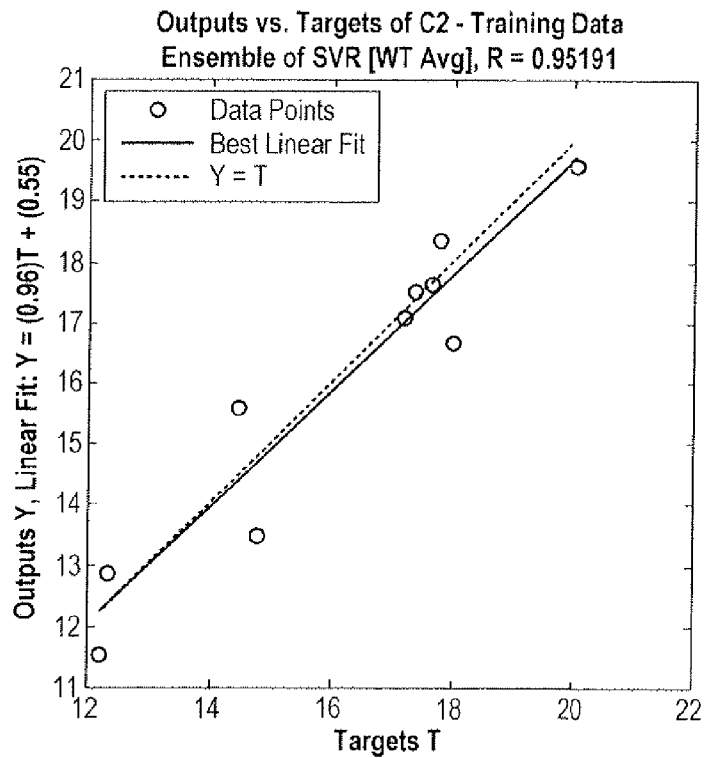
FIG. 31D is a graph of outputs vs. targets for ethane prediction using the method of predicting gas composition in the testing phase for an ensemble of SVR models.
Figure 32A:
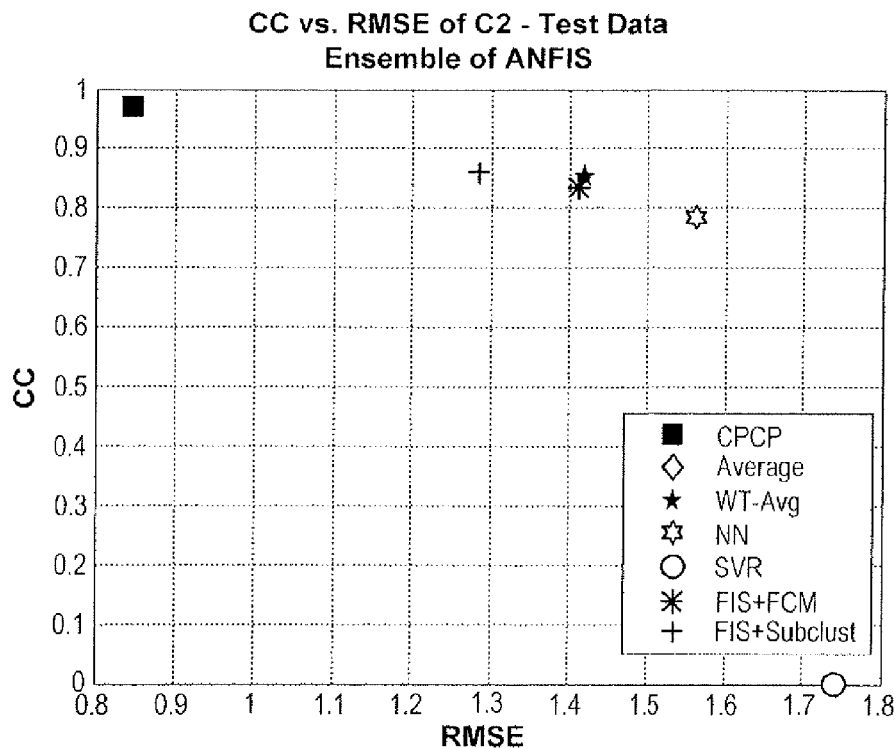
FIG. 32A is a plot of CC vs. RMSE for ethane prediction using the method of predicting gas composition for an ensemble of ANFIS models.
Figure 32B:
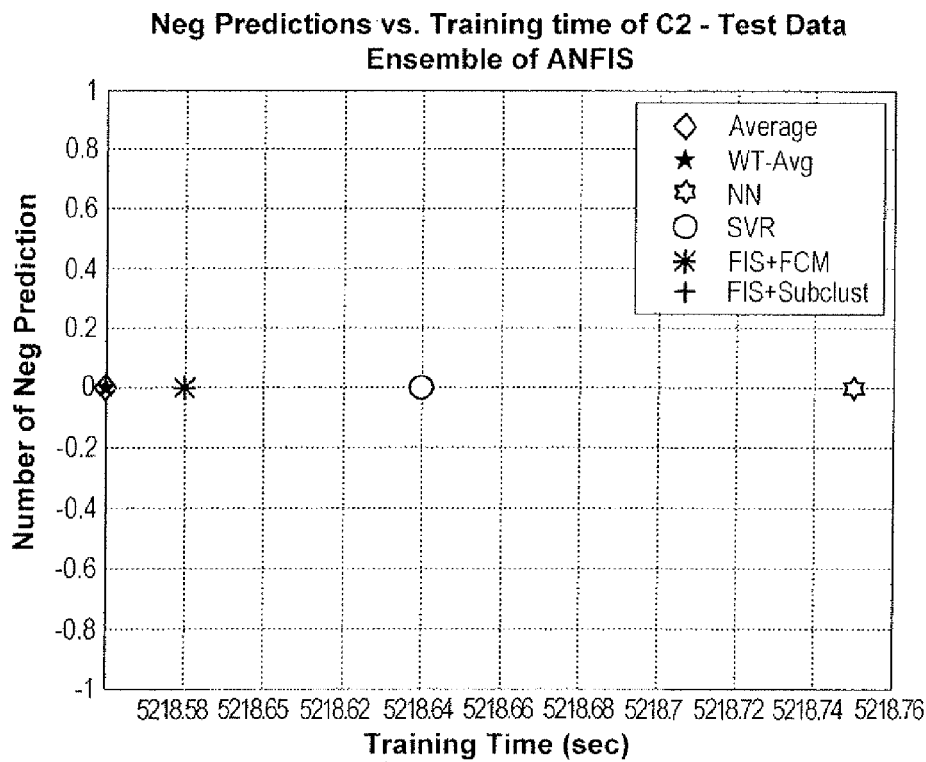
FIG. 32B is a plot of the number of negative predictions vs. training time for ethane prediction using the method of predicting gas composition for an ensemble of ANFIS models.
Figure 33A:
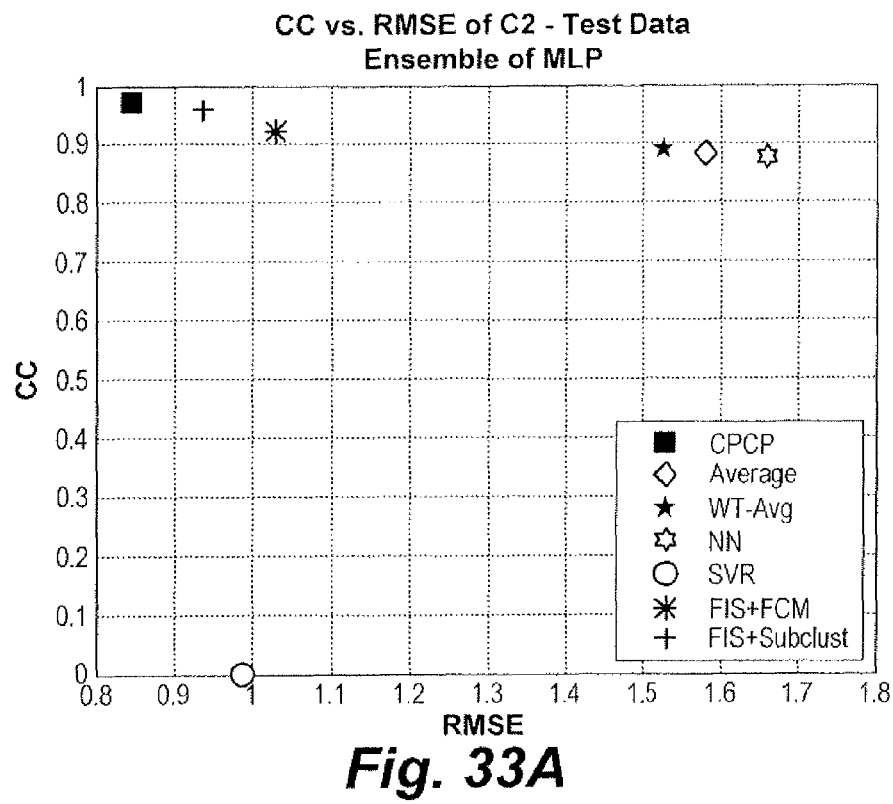
FIG. 33A is a plot of CC vs. RMSE for ethane prediction using the method of predicting gas composition for an ensemble of MLP models.
Figure 33B:
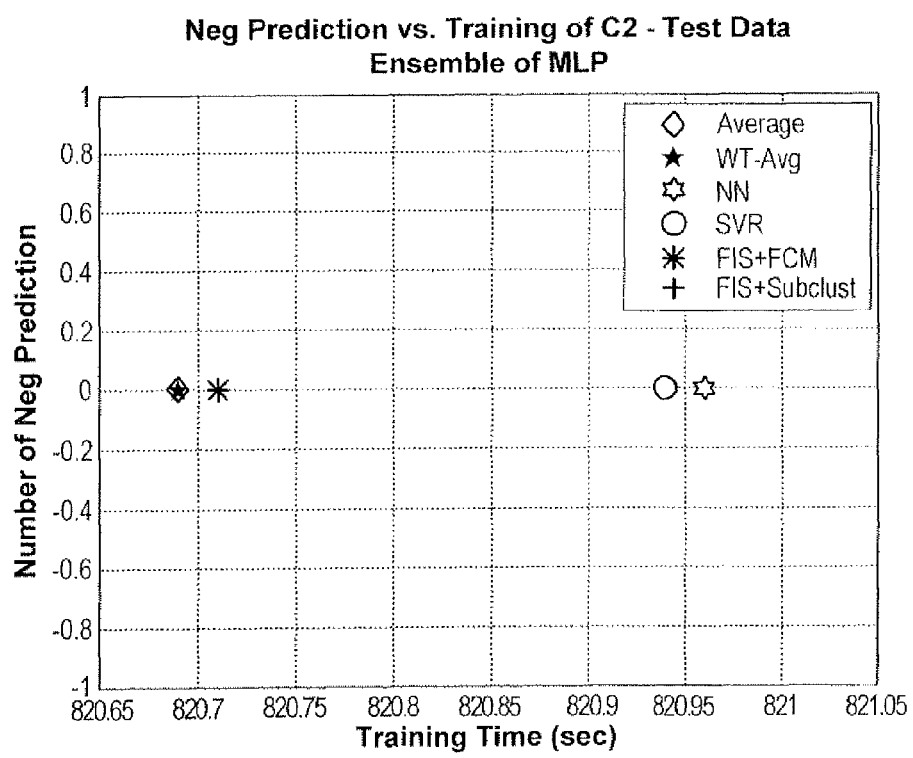
FIG. 33B is a plot of the number of negative predictions vs. training time for ethane prediction using the method of predicting gas composition for an ensemble of MLP models.
Figure 34A:
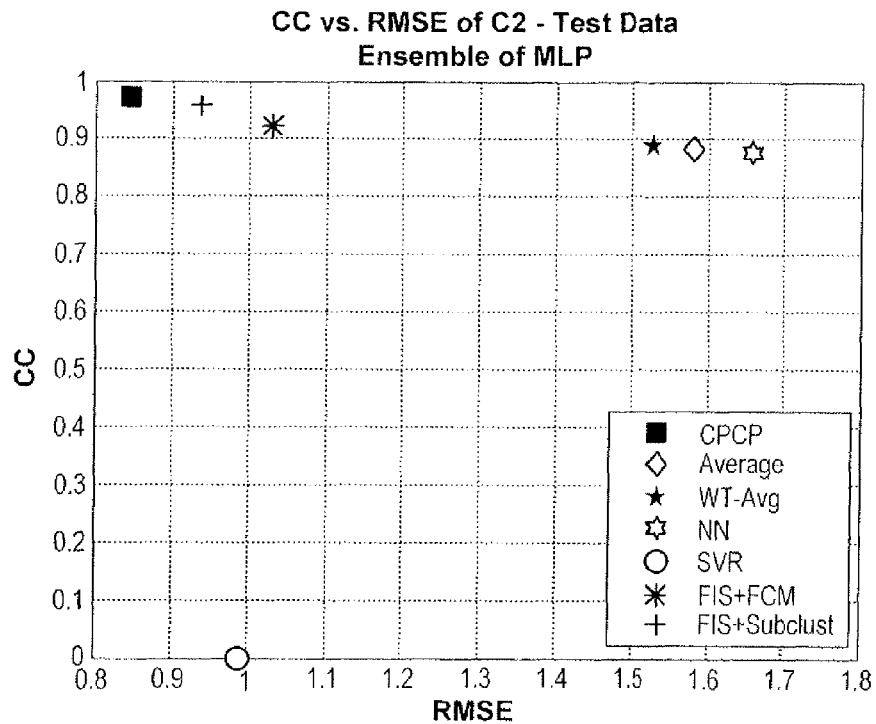
FIG. 34A is a plot of CC vs. RMSE for ethane prediction using the method of predicting gas composition for an ensemble of ANFIS, MLP and SVR models.
Figure 34B:
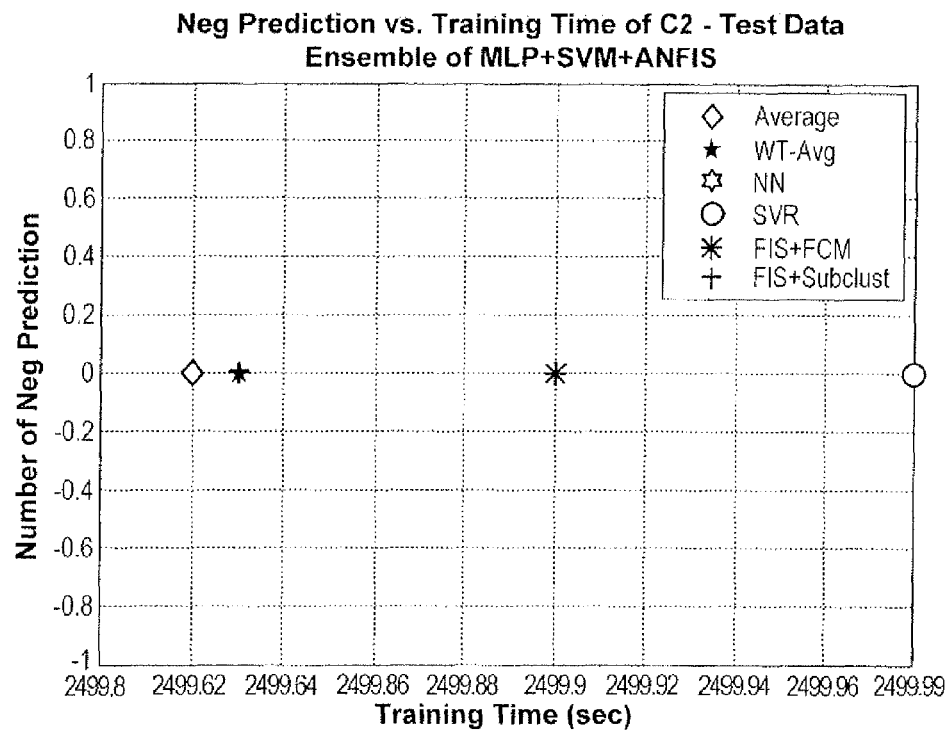
FIG. 34B is a plot of the number of negative predictions vs. training time for ethane prediction using the method of predicting gas composition for an ensemble of ANFIS, MLP and SVR models.

FIG. 30A shows that the performance of the HCI model GA+SVR outperforms the other CI and HCI models for C2 prediction. It can be seen that the HCI models perform better than the corresponding CI models, except for GA+MLP. FIG. 30B shows that GA+SVR took less time than other HCI models and did not predict any negative values. The regression analysis of GA+SVR in FIGS. 30C and 30D on training and testing data shows that the prediction is strongly correlated with the original values. FIG. 31A shows that the EHCI model of SVR combined with the weighted average method performed better than any other combiner. The error RMSE value of the best model GA+SVR in FIG. 30A is near 1.5, whereas the EHCI model of SVR has an RMSE of about 0.8. FIGS. 32A, 32B, 33A, 33B, 34A and 34B show the other ECHI models' performance on predicting $CO_2$ in separator gas compositions.

Figure 35A:
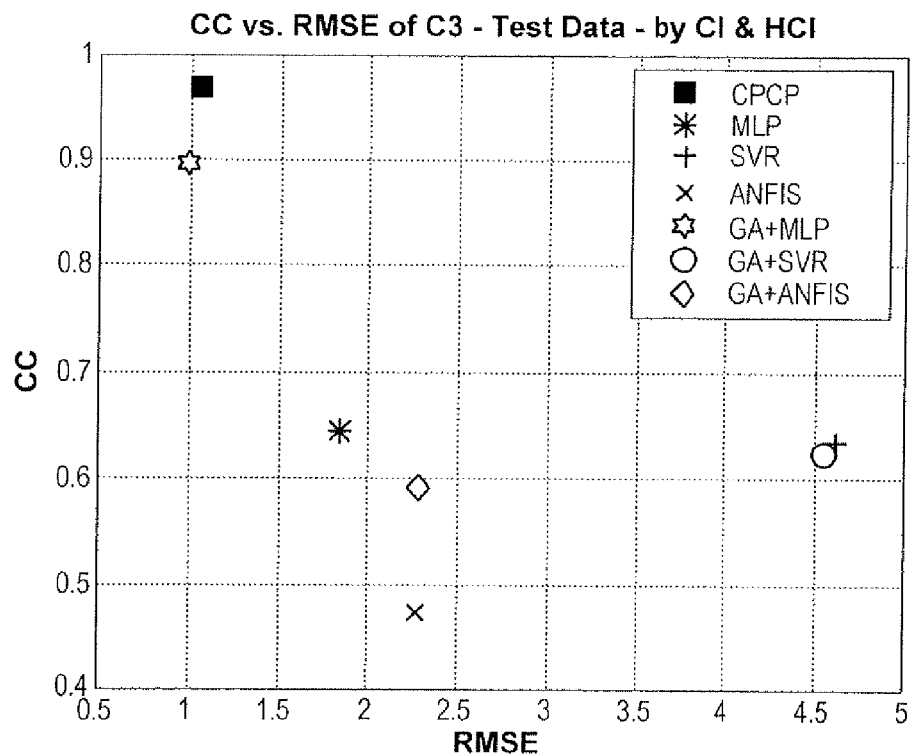
FIG. 35A is a plot of CC vs. RMSE for propane prediction using the method of predicting gas composition for a variety of differing computational intelligence models.
Figure 35B:
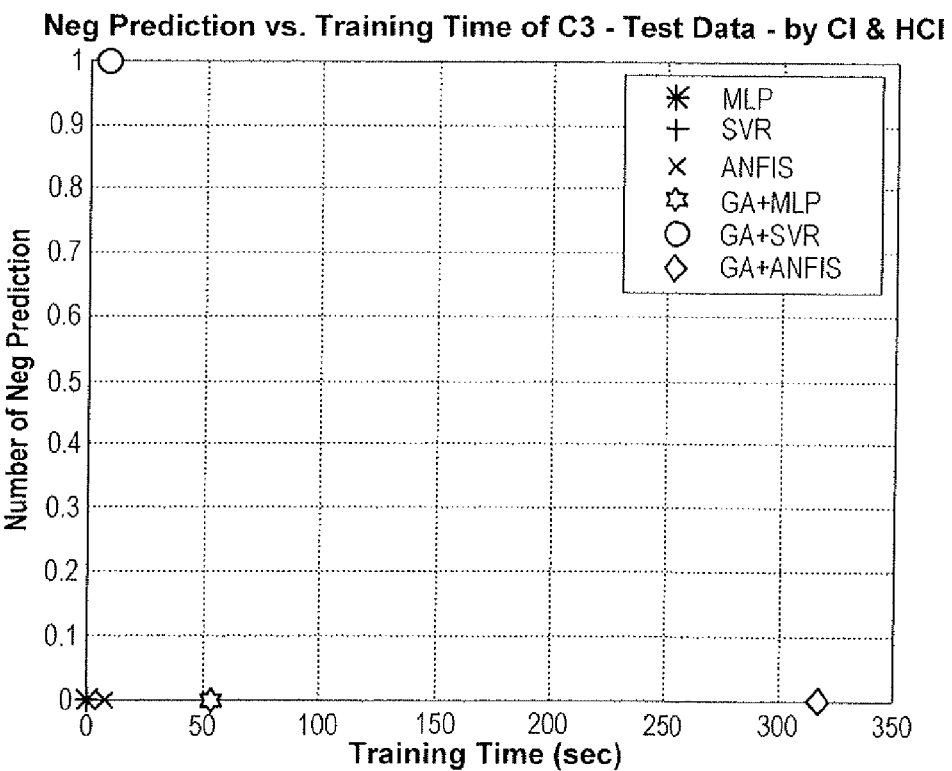
FIG. 35B is a plot of the number of negative predictions vs. training time for propane prediction using the method of predicting gas composition for a variety of differing computational intelligence models.
Figure 35C:
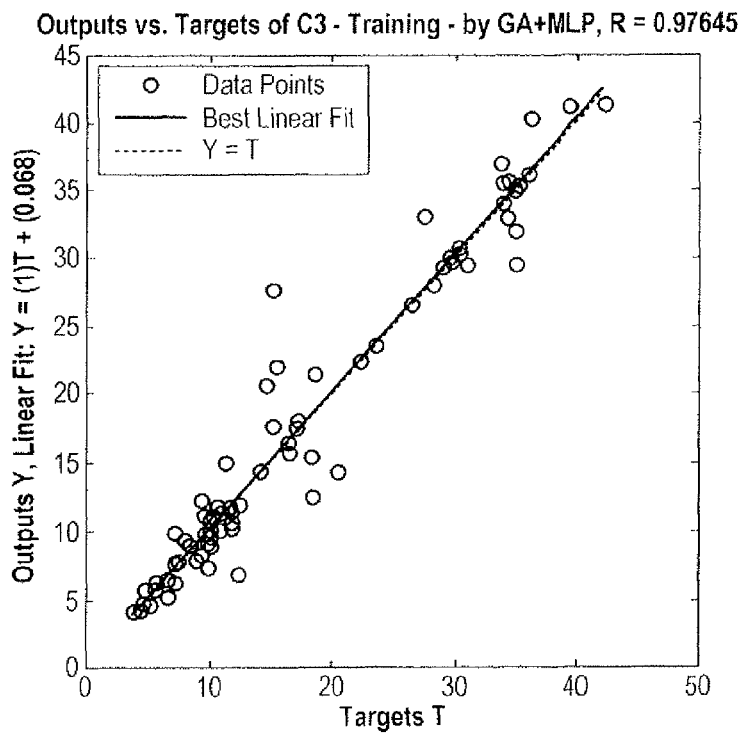
FIG. 35C is a graph of outputs vs. targets for propane prediction using the method of predicting gas composition in the training phase.
Figure 35D:
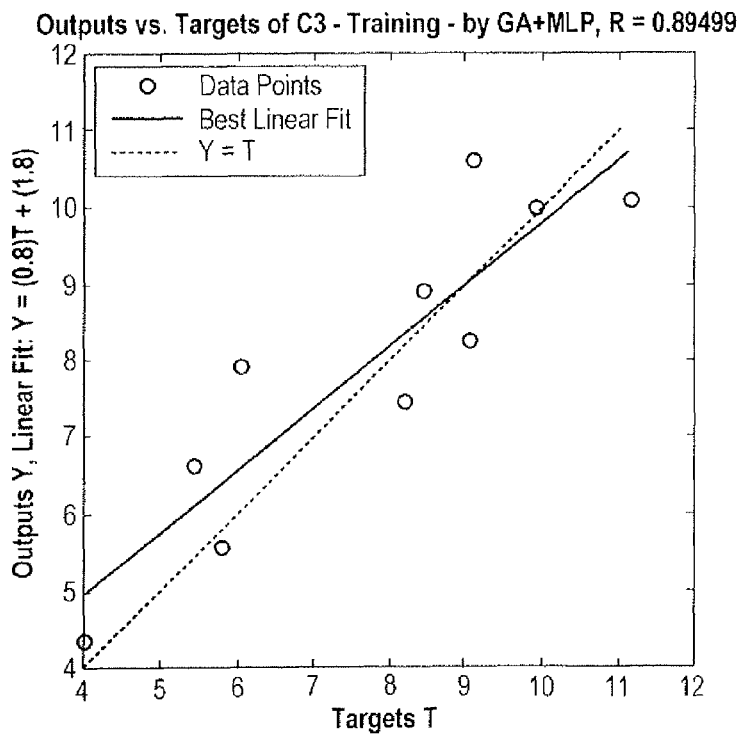
FIG. 35D is a graph of outputs vs. targets for propane prediction using the method of predicting gas composition in the testing phase.
Figure 36A:
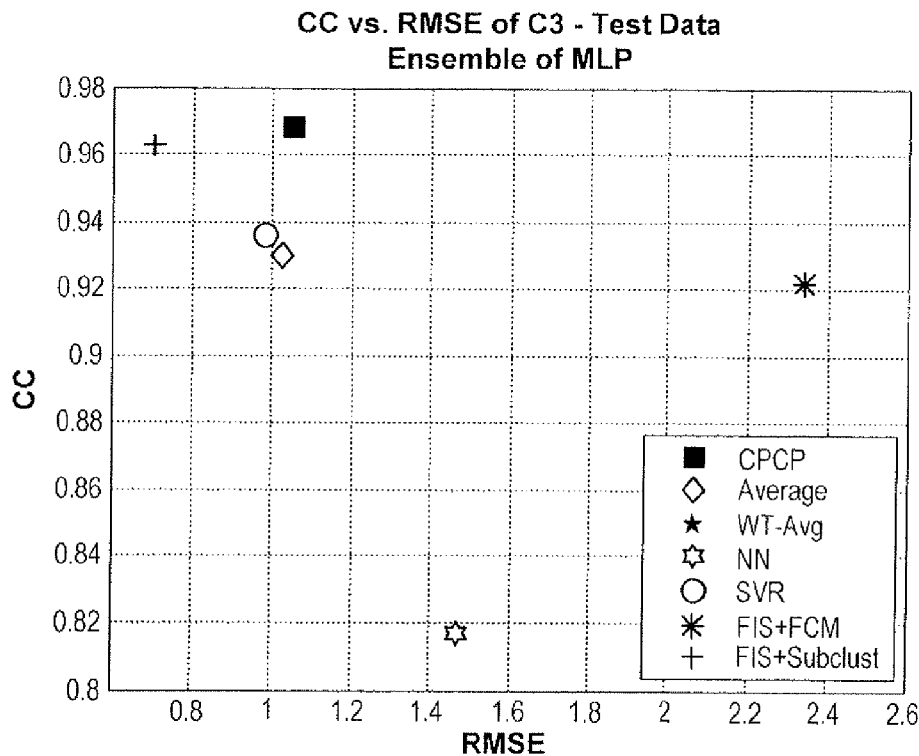
FIG. 36A is a plot of CC vs. RMSE for propane prediction using the method of predicting gas composition for an ensemble of MLP models.
Figure 36B:
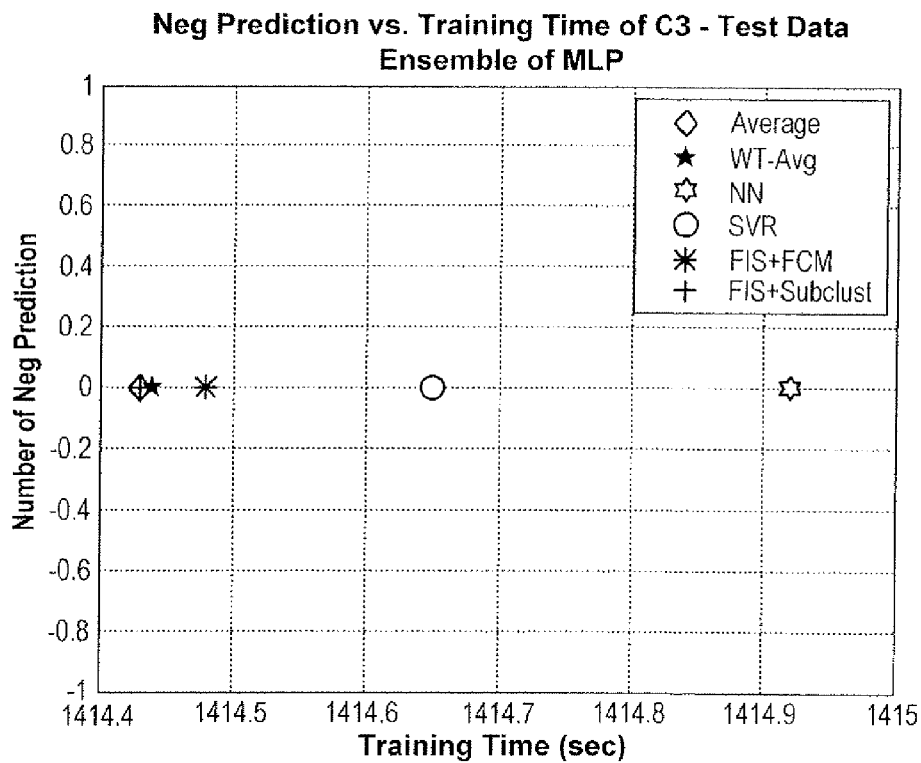
FIG. 36B is a plot of the number of negative predictions vs. training time for propane prediction using the method of predicting gas composition for an ensemble of MLP models.
Figure 36C:
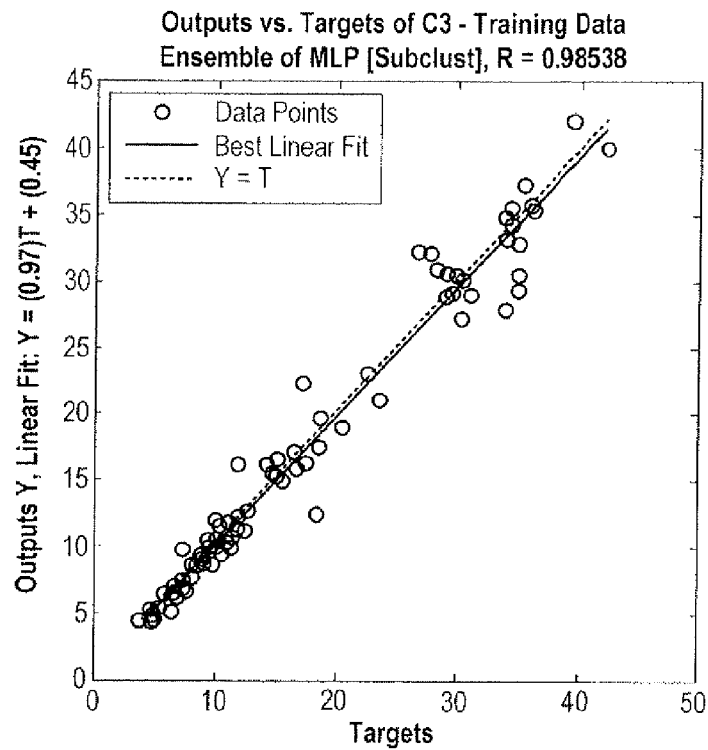
FIG. 36C is a graph of outputs vs. targets for propane prediction using the method of predicting gas composition in the training phase for an ensemble of MLP models.
Figure 36D:
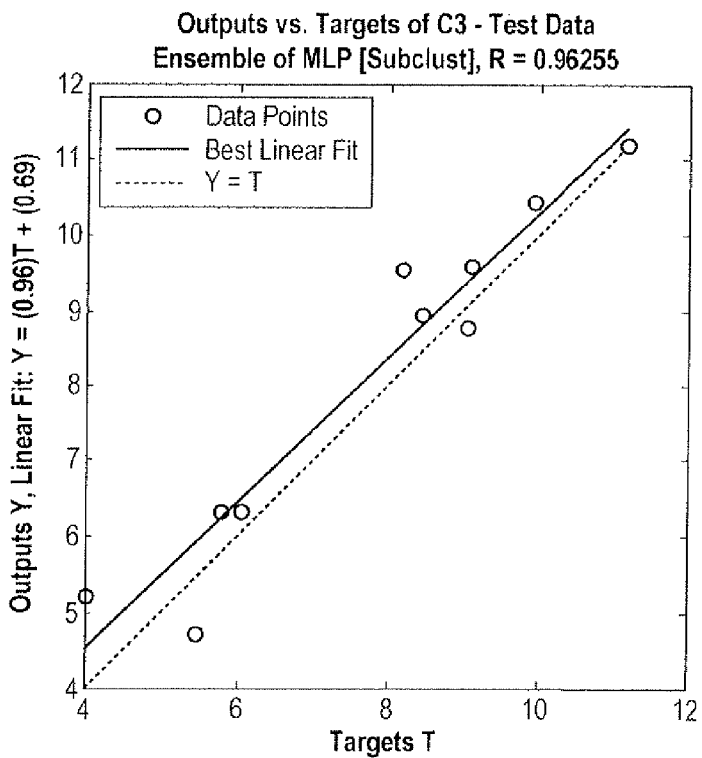
FIG. 36D is a graph of outputs vs. targets for propane prediction using the method of predicting gas composition in the testing phase for an ensemble of MLP models.
Figure 37A:
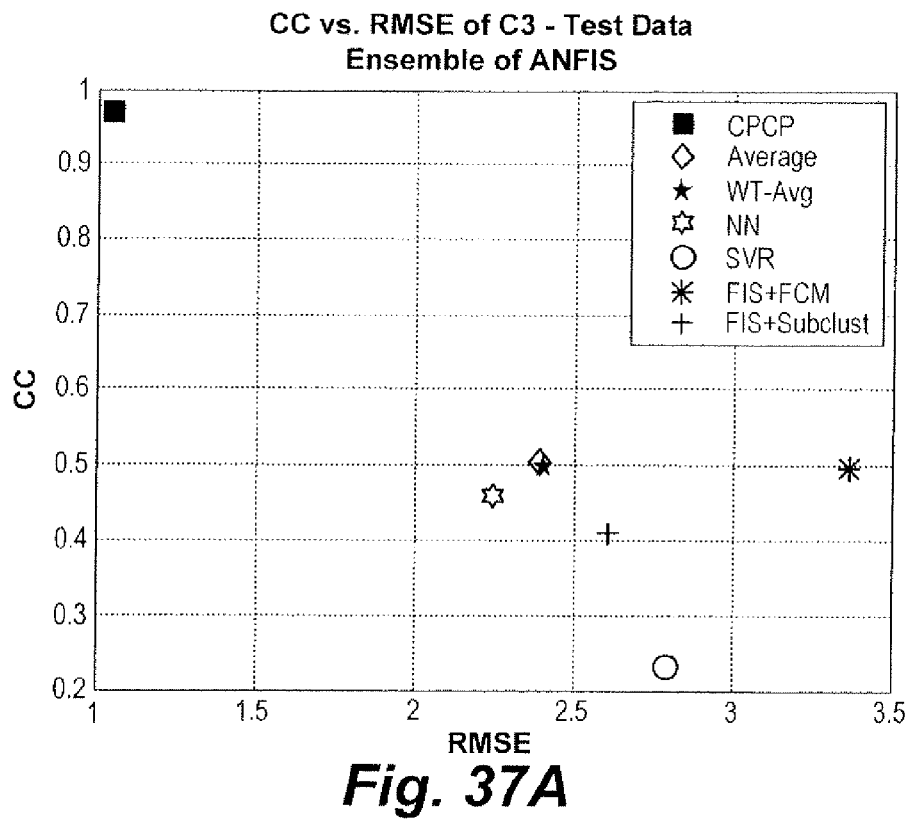
FIG. 37A is a plot of CC vs. RMSE for propane prediction using the method of predicting gas composition for an ensemble of ANFIS models.
Figure 37B:
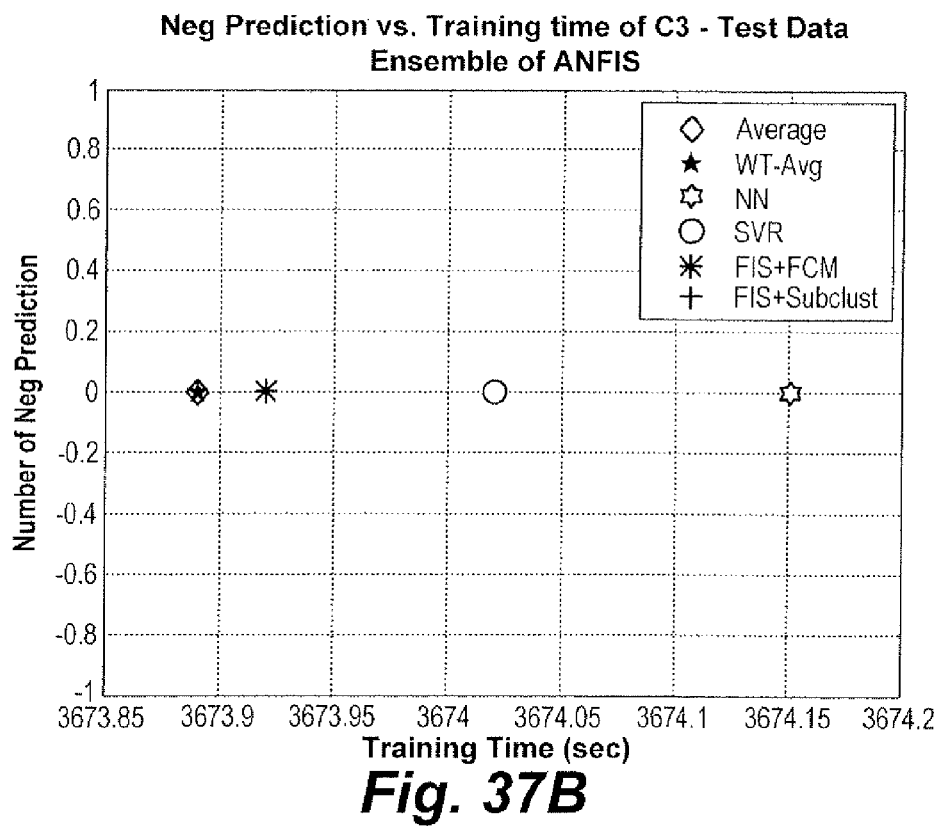
FIG. 37B is a plot of the number of negative predictions vs. training time for propane prediction using the method of predicting gas composition for an ensemble of ANFIS models.
Figure 38A:
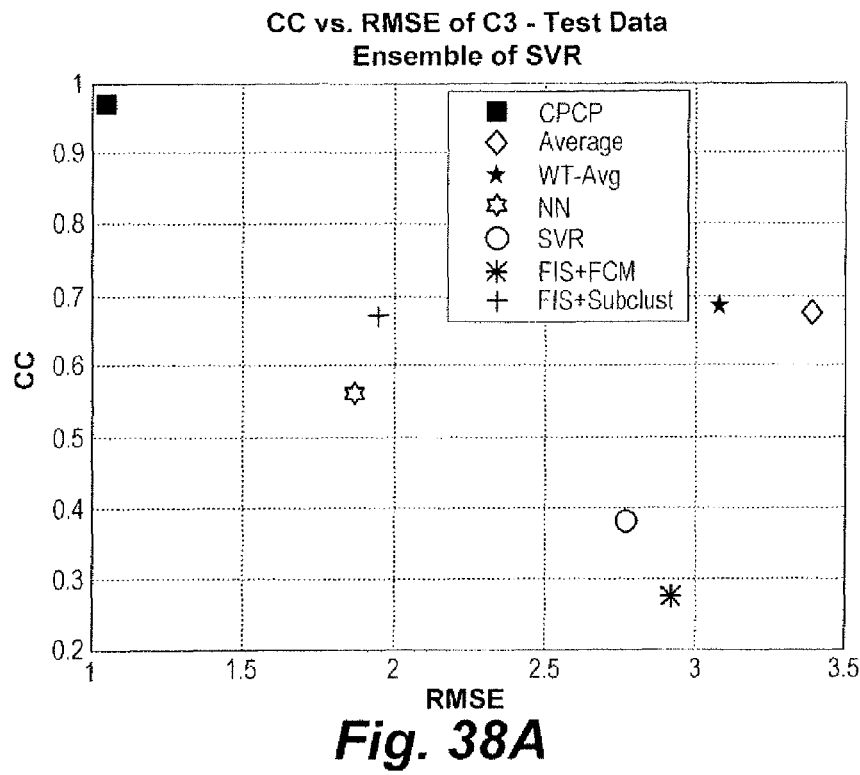
FIG. 38A is a plot of CC vs. RMSE for propane prediction using the method of predicting gas composition for an ensemble of SVR models.
Figure 38B:
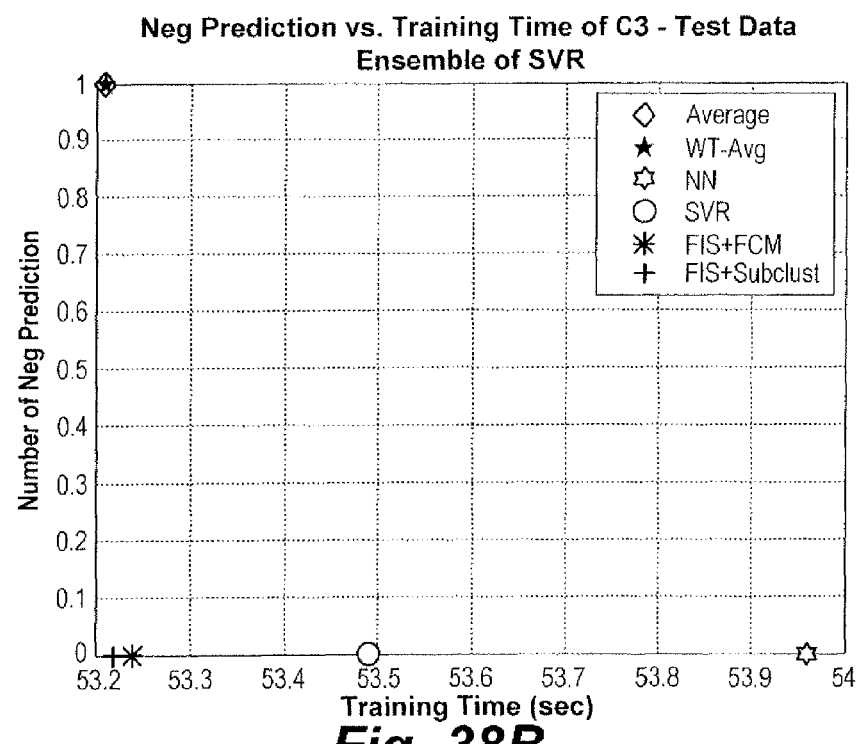
FIG. 38B is a plot of the number of negative predictions vs. training time for propane prediction using the method of predicting gas composition for an ensemble of SVR models.
Figure 39A:
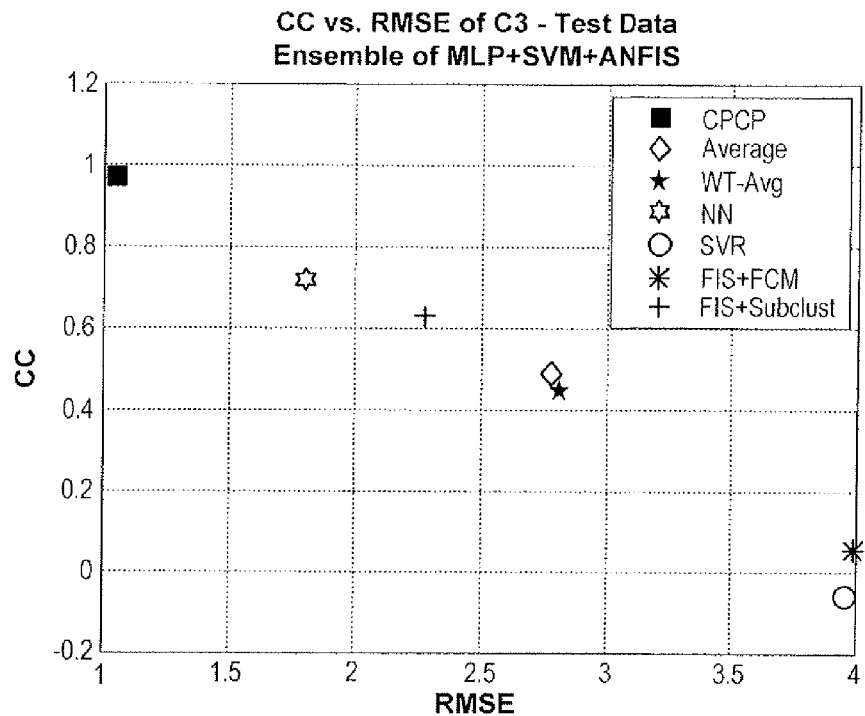
FIG. 39A is a plot of CC vs. RMSE for propane prediction using the method of predicting gas composition for an ensemble of ANFIS, MLP and SVR models.
Figure 39B:
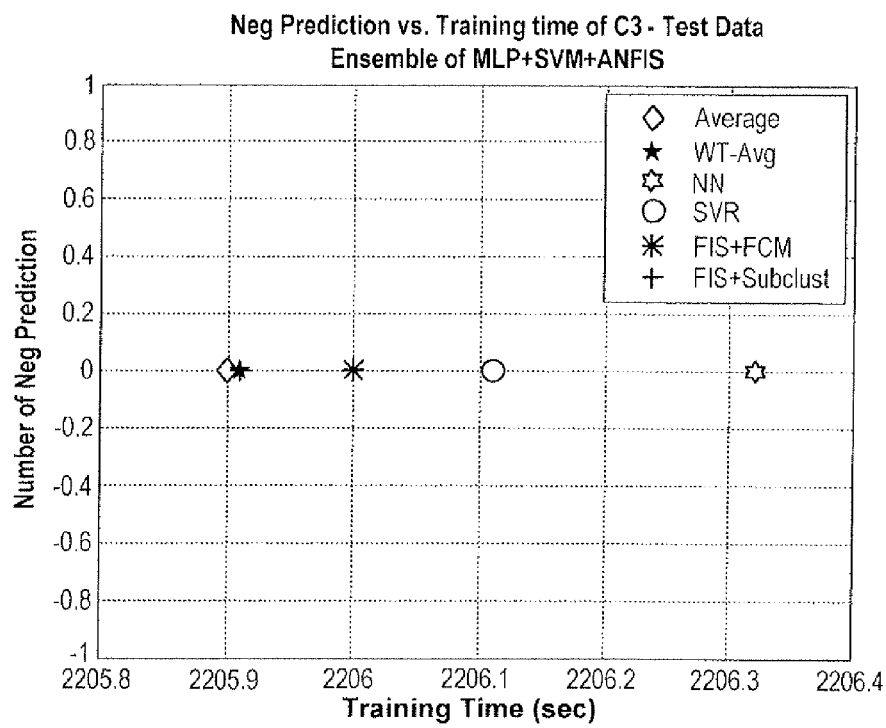
FIG. 39B is a plot of the number of negative predictions vs. training time for propane prediction using the method of predicting gas composition for an ensemble of ANFIS, MLP and SVR models.

FIG. 35A shows that the performance of the HCI model GA+MLP outperforms the other CI and HCI models for C3 prediction. It can be seen that the HCI models perform better than the corresponding CI models. FIG. 35B shows that GA+MLP took less time than GA+ANFIS and did not predict any negative values. The regression analysis of GA+SVR in FIGS. 35C and 35D on training and testing data shows that the prediction is strongly correlated with the original values. FIG. 36A shows that the EHCI model of MLP combined with FIS-Subclust method performed better than any other combiner. The error RMSE value of the best model GA+MLP, shown in FIG. 35A, is near 1, whereas the EHCI model of MLP has an RMSE about 0.7. FIGS. 37A, 37B, 38A, 38B, 39A and 39B show the other ECHI models' performance on predicting $CO_2$ in separator gas compositions.

Figure 40:
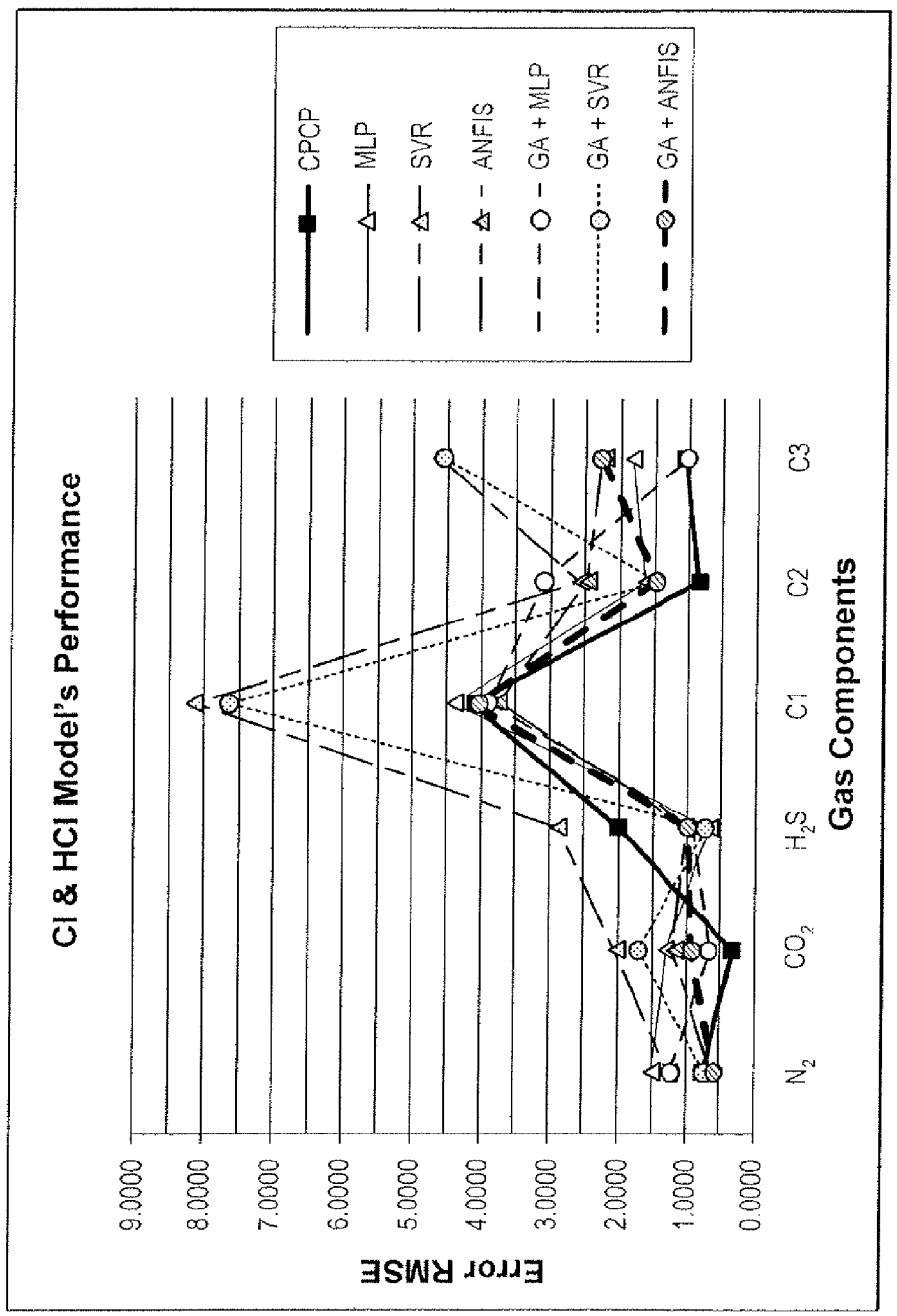
FIG. 40 is a graph illustrating RMSE error for individual gas components predicted by the individual computational intelligence models.

FIG. 40 shows the performance of gas component prediction in terms of RMSE. The black square represents the performance of CPCP, used as a benchmark for comparison. The triangular symbol represents CI models' performance and the circular symbols represent the performance of HCI models. It is expected that the circular symbols should appear in the lower part of the graph. In the case of $H_2S$, for example, the performance of the CI models is better than HCI models. However, in most of the cases, the performances of HCI models are better than those of the CI models. Some CI models may perform better than other HCI models, but it is expected that, on average, the HCI models' accuracy would be higher than that of the CI models.

Figure 41:
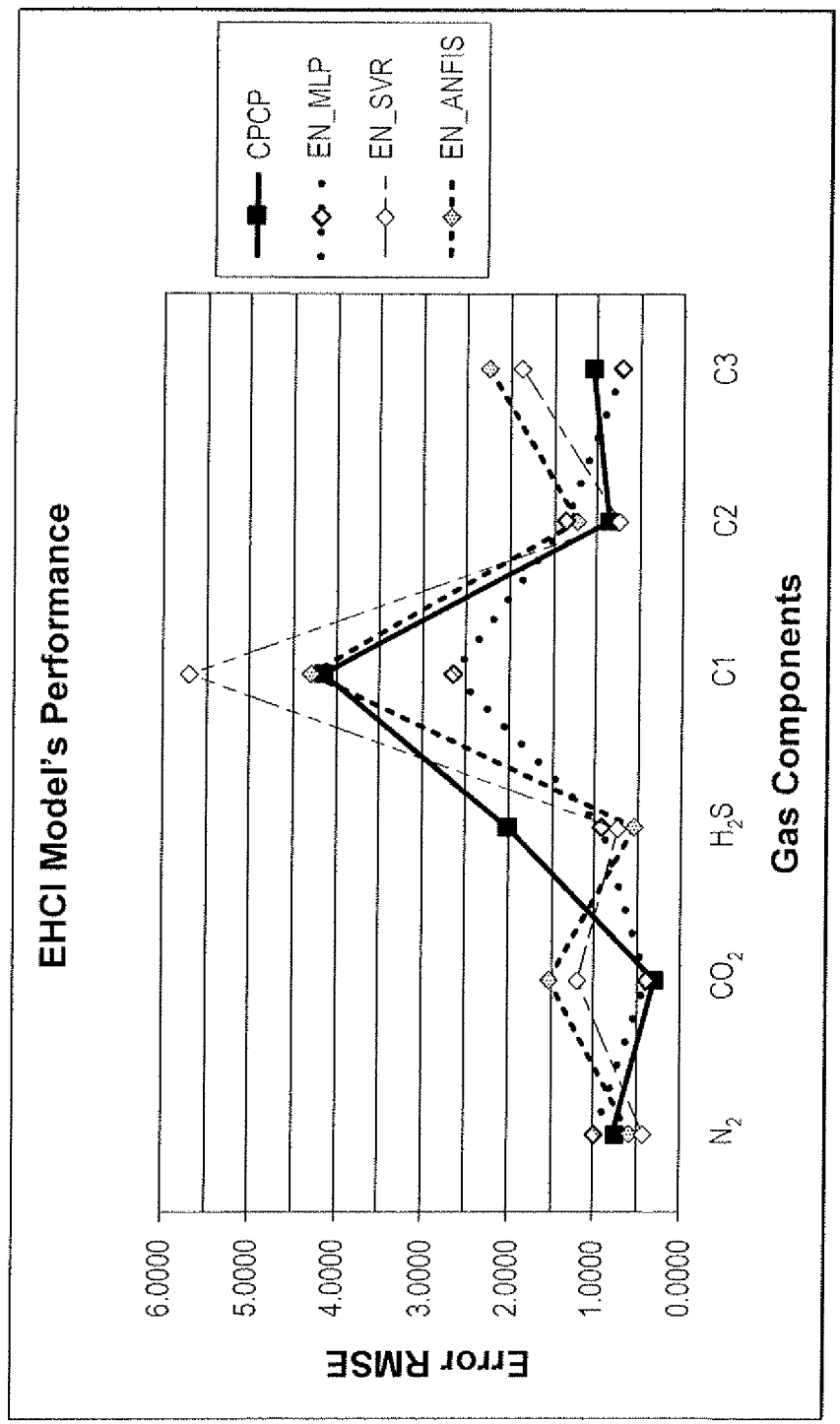
FIG. 41 is a graph illustrating RMSE error for individual gas components predicted by the method of predicting gas composition.

FIG. 41 demonstrates the EHCI models' performance. By comparing FIG. 41 against FIG. 40, it can be seen that the EHCI models' RMSE values are much lower than those of the corresponding CI and HCI models. In the case of $CO_2$ prediction, the performance of CI and HCI (shown in FIG. 40) are far from the expected values, but in the case of EHCI, the RMSE value is closer to that of CPCP. In the case of C2 (shown in FIG. 40), the performance of CI and HCI could not outperform CPCP, but the EHCI model of SVR outperforms CPCP (FIG. 41). For all other components, the RMSE is much lower in the ECHI models.

Tables 6 to 13, shown in FIGS. 42 to 49, show the numerical values of the CC, RMSE and P-values of all of the models. The CC value represents how good the prediction is and the P-value shows how significant the prediction is. A CC value above 0.75 represents statistically acceptable correlation, and a P-value of less than or equal to 0.05 means that the significance level is within 5%. In Tables 6 to 13, it can be seen that the P-value is less than 0.05 in most cases, thus showing that the prediction of models are significant and accurate.

It is to be understood that the present invention is not limited to the embodiments described above, but encompasses any and all embodiments within the scope of the following claims.

We claim:

1. A method of predicting gas composition, comprising the steps of:
   (a) receiving a set of input parameters related to a fluid mixture of hydrocarbons and non-hydrocarbons fed into a multistage separator;
   (b) providing a training dataset;
   (c) randomly selecting a first set percentage of the training dataset;
   (d) establishing an ensemble of N empirical models, wherein N is an integer;
   (e) optimizing each empirical model with a genetic algorithm;
   (f) training each optimized empirical model with the selected first set percentage of the training dataset;
   (g) predicting a mole percentage of the non-hydrocarbons in said fluid mixture;
   (h) comparing the predicted mole percentage with the input parameters and selecting a second set percentage of badly predicted training datasets based upon a pre-set threshold error value; and
   (i) repeating the steps (e) through (g) N times on the second set percentage of badly predicted training datasets.

2. The method of predicting gas composition as recited in claim 1, wherein the first set percentage is equal to the second set percentage.

3. The method of predicting gas composition as recited in claim 2, wherein the empirical model is selected from the group consisting of multilayer perceptron, support vector regression, adaptive neuro-fuzzy inference system, and combinations thereof.

4. A computer software product that includes a non-transitory computer readable storage medium readable by a processor, the non-transitory computer readable storage medium having stored thereon a set of instructions for predicting gas composition, the instructions comprising:
   (a) a first sequence of instructions which, when executed by the processor, causes the processor to receive a set of input parameters related to a fluid mixture of hydrocarbons and non-hydrocarbons fed into a multistage separator;
   (b) a second sequence of instructions which, when executed by the processor, causes the processor to receive a training dataset;
   (c) a third sequence of instructions which, when executed by the processor, causes the processor to randomly select a first set percentage of the training dataset;
   (d) a fourth sequence of instructions which, when executed by the processor, causes the processor to establish an ensemble of N empirical models, wherein N is an integer;
   (e) a fifth sequence of instructions which, when executed by the processor, causes the processor to optimize each empirical model with a genetic algorithm;
   (f) a sixth sequence of instructions which, when executed by the processor, causes the processor to train each optimized empirical model with the selected first set percentage of the training dataset;
   (g) a seventh sequence of instructions which, when executed by the processor, causes the processor to predict a mole percentage of the non-hydrocarbons in said fluid mixture;
   (h) an eighth sequence of instructions which, when executed by the processor, causes the processor to compare the predicted mole percentage with the input parameters and select a second set percentage of badly predicted training datasets based upon a pre-set threshold error value; and
   (i) a seventh sequence of instructions which, when executed by the processor, causes the processor to repeating the fifth through seventh sequences of instructions N times on the second set percentage of badly predicted training datasets.

* * * * *